United States Patent
Kubota

(10) Patent No.: US 9,297,983 B2
(45) Date of Patent: Mar. 29, 2016

(54) IMAGING LENS, IMAGING DEVICE AND INFORMATION DEVICE

(71) Applicant: Takashi Kubota, Suginami-ku (JP)

(72) Inventor: Takashi Kubota, Suginami-ku (JP)

(73) Assignee: RICOH COMPANY, LTD., Tokyo (JP)

( * ) Notice: Subject to any disclaimer, the term of this patent is extended or adjusted under 35 U.S.C. 154(b) by 51 days.

(21) Appl. No.: 14/082,538

(22) Filed: Nov. 18, 2013

(65) Prior Publication Data

US 2014/0139931 A1    May 22, 2014

(30) Foreign Application Priority Data

Nov. 19, 2012    (JP) .................................. 2012-253748

(51) Int. Cl.
| | |
|---|---|
| *G02B 9/60* | (2006.01) |
| *G02B 9/62* | (2006.01) |
| *G02B 15/14* | (2006.01) |
| *G02B 13/00* | (2006.01) |

(52) U.S. Cl.
CPC .. *G02B 9/60* (2013.01); *G02B 9/62* (2013.01); *G02B 13/0045* (2013.01); *G02B 15/14* (2013.01)

(58) Field of Classification Search
CPC .............. G02B 9/60; G02B 9/62; G02B 9/64; G02B 13/0045
USPC ......... 359/751–753, 755–756, 761, 763–764, 359/770
See application file for complete search history.

(56) References Cited

U.S. PATENT DOCUMENTS

| | | | |
|---|---|---|---|
| 5,528,428 A * | 6/1996 | Ohtake et al. ................. | 359/684 |
| 5,805,359 A | 9/1998 | Yamanashi | |
| 2010/0027136 A1 | 2/2010 | Ohashi et al. | |
| 2011/0128637 A1 | 6/2011 | Kubota | |
| 2011/0141583 A1 | 6/2011 | Take | |
| 2011/0310496 A1 | 12/2011 | Kubota et al. | |
| 2011/0317285 A1 | 12/2011 | Ohashi et al. | |
| 2012/0147485 A1 | 6/2012 | Kubota | |
| 2012/0212842 A1 * | 8/2012 | Hosoi et al. .................... | 359/784 |
| 2012/0314305 A1 * | 12/2012 | Miyagawa ..................... | 359/784 |
| 2014/0240851 A1 * | 8/2014 | Kawamura ..................... | 359/708 |

FOREIGN PATENT DOCUMENTS

| | | |
|---|---|---|
| JP | 3541983 | 4/2004 |
| JP | 2009-258157 | 11/2009 |
| JP | 2010-39088 | 2/2010 |

* cited by examiner

*Primary Examiner* — Jordan Schwartz
(74) *Attorney, Agent, or Firm* — Oblon, McClelland, Maier & Neustadt, L.L.P.

(57) ABSTRACT

An imaging lens including seven or fewer lenses which constitute an entire system of an optical system comprising, in order from an object side to an imaging side: a first lens group having a positive refractive power; a second lens group having a positive refractive power; and a third lens group having a negative refractive power, wherein the first lens group includes a lens having a negative refractive power and a lens having a positive refractive power, an aperture stop being disposed in the first lens group, the second lens group includes one lens having a negative refractive power and one lens having a positive refractive power, and the third lens group including one lens having a negative refractive power and a concave surface on the object side.

17 Claims, 32 Drawing Sheets

IMAGING LENS, IMAGING DEVICE AND INFORMATION DEVICE

CROSS-REFERENCE TO RELATED APPLICATION

The present application is based on and claims priority from Japanese Patent Application No. 2012-253748, filed on Nov. 19, 2012, the disclosure of which is hereby incorporated by reference herein in its entirety.

BACKGROUND

Field of the Invention

The present invention relates to an improvement of a single focal imaging lens which is used as an imaging optical system in various cameras including a silver salt camera, especially in a digital camera and a video camera, so as to provide an object image. In particular, it relates to an imaging lens which is preferably used as an imaging optical system in an imaging device having electrical imaging means, for example, a digital camera, a video camera and so on, and it also relates to an imaging device using such an imaging lens, for example, a camera, and an information device such as a mobile information terminal device having an imaging function.

Recently, as an imaging device using a solid-state imaging element such as a CCD (charge-coupled device) or a CMOS (complementary metal-oxide-semiconductor), a digital still camera and a digital video camera have become popular. In particular, a digital camera which is used for imaging a still image i.e., a stop motion image is widely known as an alternative photographing device to the existing silver salt camera using a silver salt film.

The solid-state imaging element used in those kinds of imaging device is increasingly required to have a large number of pixels and corresponding to this, an imaging lens which is used as a photographing lens is also needed to have a higher optical performance. The miniaturization of an imaging device is also further required while considering the portability of the device. Thus, in the market, a high-performance imaging device having a miniaturized body is demanded, and similarly the imaging lens is asked to accomplish high-performance and miniaturization. Furthermore, the speed-up of shooting is also progressing, so a brighter imaging lens is needed as an imaging lens which is suitable for such high-speed shooting.

As a viewing angle of an imaging lens in a digital camera, a wide-angle is preferable because it is suitable for easy shooting by snapping and so on. A half viewing angle of 32 degrees which is comparable to a focal length of 35 mm when converting to a 35 mm-film photograph (known as Leica Format) is required as a target.

More recently, a bright large-diameter lens and a wide-angle single focus lens are apt to be chosen. Herein, if a focal length is shorter than 50 mm, the coma aberration and the field curvature of the lens increase and it is difficult to control them.

A lens having a large diameter and a focal length thereof shorter than 50 mm when converting to a 35 mm film (that is, wide-angle side) is heretofore known in patent references, for example, JP3541983B, JP2009-258157A and JP2010-39088A.

Each of those lenses disclosed in the above patent references configures an inner focus type or a rear focus type optical system in which the entire length thereof does not change while focusing on an object (subject).

In JP3541983B, an inner focus type lens is disclosed. The lens has a wide-angle configuration where the F-number is F 2.8 and the focal length thereof is 28 mm while converting to the 35 mm film. The entire length of the lens is about 3 times longer than the maximum image height.

In JP2009-258157A, a rear focus type lens is disclosed. The lens has a wide-angle configuration where the F-number is F 2.8 and the focal length thereof is 35 mm while converting to the 35 mm film. The entire length of the lens is 3.6 times longer than the maximum image height.

Further, in JP2010-39088A, an inner focus type lens is disclosed. The lens has a wide-angle configuration where the focal length of the lens is 28 mm while converting to the 35 mm film, and a large diameter such that the F-number is F 1.9. The entire length of the lens is more than 9 times longer than the maximum image height.

The lens disclosed in JP3541983B is, as described above, an inner focus type lens having a wide-angle configuration. The F-number of the lens is F 2.8 and its focal length is 28 mm while converting to the 35 mm film. The entire length of the lens is about 3 times longer than the maximum image height. The lens includes many lenses in a focusing group which move corresponding to the focusing. That is, it is difficult to speed-up the focusing. The lens disclosed in JP2009-258157A is, as described above, a rear focus type and has a wide-angle configuration. The F number of the lens is F 2.8 and its focal length is 35 mm while converting to the 35 mm film. The entire length of the lens is about 3.6 times longer than the maximum image height and the ratio of peripheral light intensity is relatively dark at about 30%. The lens disclosed in JP2010-39088A is, as described above, an inner focus type optical system and has a wide-angle configuration. The lens is bright because it has a large diameter such that the F number is F 1.9, but the entire length of the lens is long such that it is more than 9 times longer than the maximum image height.

Each of these lenses disclosed in the above patent references is insufficient in view of miniaturization.

SUMMARY

An object of the present invention provides an imaging lens configured of an inner focus type optical system capable of focusing without changing the entire length of the optical system. The half viewing angle of the lens is a wide-angle of around 29 degrees to 33 degrees. The lens is bright, has an F number of F 2.5, and is sufficiently small enough to make the entire length thereof about 2.3 times longer than the image height. Furthermore, the lens is capable of focusing with a movement of about two lenses and has a high performance.

In order to achieve the object, the embodiments of the present invention provide an imaging lens including seven or fewer lenses which constitute an entire system of an optical system comprising, in order from an object side to an imaging side:

a first lens group having a positive refractive power;
a second lens group having a positive refractive power; and
a third lens group having a negative refractive power, wherein
the first lens group includes a lens having a negative refractive power and a lens having a positive refractive power, an aperture stop being disposed in the first lens group,
the second lens group includes one lens having a negative refractive power and one lens having a positive refractive power, the third lens group including one lens having negative refractive power and a concave surface on the object side, and the second lens group is moved from the imaging side to the object side as a focusing lens when focusing from infinity to a close range.

BRIEF DESCRIPTION OF THE DRAWINGS

FIG. 31A illustrates a condition in which a photographing lens using an imaging lens according to the eleventh embodiment of the present invention is collapsed in the body of the digital camera. FIG. 31B illustrates a condition in which the photographing lens is protruded from the body of the digital camera.

DETAILED DESCRIPTION OF THE PREFERRED EMBODIMENTS

Figure 1:
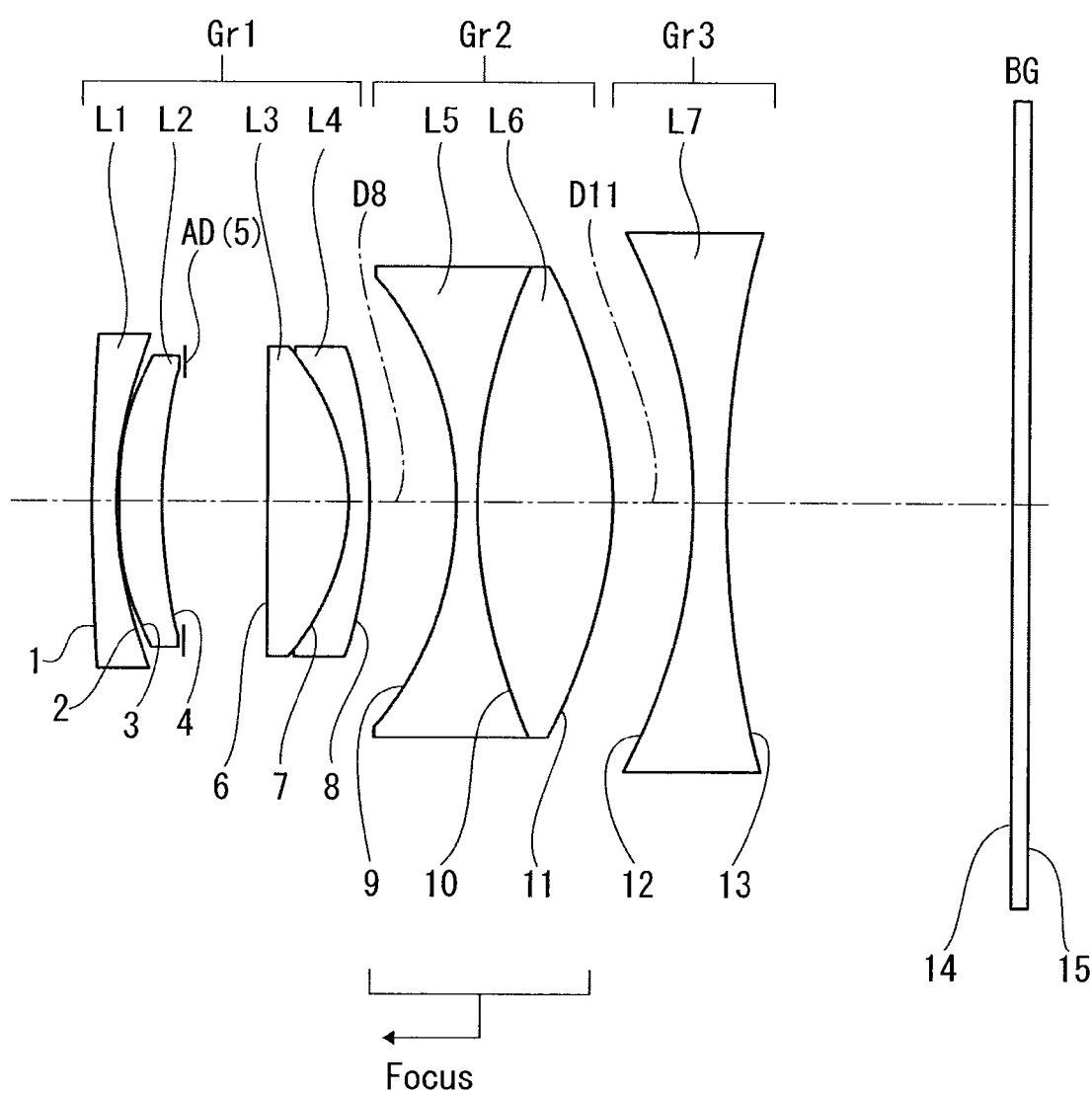
FIG. 1 is a cross-sectional view along an optical axis which illustrates a configuration of an optical system of an imaging lens according to Example 1 of a first embodiment of the present invention.

Hereinafter, embodiments regarding an imaging lens, an imaging device and an information device in the present invention will be explained with reference to the drawings. Before describing the examples of the embodiments with the numerical values, a principle embodiment of the present invention is shown at first.

The first embodiment of the present invention is an embodiment of an imaging lens in an optical system to provide an optical image of an object.

The imaging lens according to the first embodiment of the present invention is configured to be an inner focus type optical system in which the entire length thereof does not change while focusing. The half viewing angle of the lens is a wide-angle which is between about 29 to 33 degrees. The imaging lens is bright because the F number is about F 2.5. Furthermore, the imaging lens has a miniaturized body such that its entire length is about 2.3 times longer than the image height and the focusing lenses that move while focusing are as few as two lenses. Thus, the imaging lens system according to the embodiments of the present invention provides a high performance and the aberration thereof while focusing is small.

Accordingly, an imaging lens according to the first embodiment of the present invention includes seven or fewer lenses which constitute an entire system of an optical system comprising, in order from an object side to an imaging side:
a first lens group having a positive refractive power;
a second lens group having a positive refractive power; and
a third lens group having a negative refractive power, wherein the first lens group includes a lens having a negative refractive power and a lens having a positive refractive power, an aperture stop being disposed in the first lens group, the second lens group includes one lens having a negative refractive power and one lens having a positive refractive power, the third lens group including one lens having negative refractive power and a concave surface on the object side, and the second lens group is moved from the imaging side to the object side as a focusing lens when focusing from infinity to a close range.

Therefore, a miniaturized and high performance imaging lens can be obtained.

As described above, the imaging lens has a three-lens group configuration including positive, positive, and negative lens groups. The first lens group is a positive lens group including an aperture stop within the group. Thereby, the spherical aberration is cancelled by the lenses before and behind the aperture stop, and the coma aberration is also controlled by the similar function. The second lens group includes a negative lens and a positive lens. Thereby, each aberration generated from the movement corresponding to the focusing, in particular, the color aberration is corrected appropriately. The third lens group includes a negative lens. So the entire length of the imaging lens can be shortened and the color aberration of magnification caused from the second lens group can be corrected by the third lens group. In addition, the focusing speed can be improved by such a configuration of two focusing lenses.

Furthermore, the above-described imaging lens can be further miniaturized and made to have a higher performance by the configuration satisfying the following Conditional Expression 1.

$$2.3 < L/Y' < 2.8 \quad [1]$$

Herein, L indicates a distance between the object side surface of the lens located on the most object side in the first lens group and the imaging surface. Y' indicates the maximum image height.

The above Conditional Expression 1 controls the entire length of the imaging lens to provide the effect of the present invention to be optimum. When L/Y' in Conditional Expression 1 exceeds the upper limit, the entire length of the optical system become longer. In such a configuration, there is an advantage for the optical capacity, but it is not appropriate in terms of a miniaturization. When L/Y' in Conditional Expression 1 falls below the lower limit, each of aberrations is increased significantly, so it is not appropriate because the imaging efficiency is degraded by them.

The above-described imaging lens can be made to have a higher performance by the configuration satisfying the following Conditional Expression 2.

$$0.0 \, [\text{mm}] < |(AX1 - AX2)/\beta| < 1.6 \, [\text{mm}] \quad [2]$$

Herein, AX1 indicates the amount of color aberration on the axis of the g line to the d line when the shooting distance is at infinity, $\beta$ indicates an imaging magnification when focusing on an object at a limited shooting distance, and AX2 indicates the amount of color aberration on the axis of the g line to the d line when the imaging magnification is $\beta$.

When $|(AX1-AX2)/\beta|$ in Conditional Expression 2 falls below the lower limit, the color aberration on the axis can be improved to be lowered, but the color aberration of magnification is increased. When $|(AX1-AX2)/\beta|$ in Conditional Expression 2 exceeds the upper limit, the color aberration on the axis is increased. Therefore, such configurations are not appropriate because the imaging efficiency is degraded by those.

The above-described imaging lens can be made to have a higher performance by the configuration satisfying the following Conditional Expression 3.

$$0.9 < f2/f < 1.5 \quad [3]$$

Herein, f2 indicates a focal length of the second lens group and f indicates a focal length of the entire system of the optical system when the shooting distance is at infinity.

Conditional Expression 3 controls the second lens group, i.e., the focusing lens to have the most preferable condition. When f2/f in Conditional Expression falls below the lower limit, the power of the second lens group is increased. Because the distortion of image surface is increased significantly, such a configuration is not appropriate. When f2/f in Conditional Expression 3 exceeds the upper limit, the coma aberration becomes bigger, so such a configuration is not appropriate.

The above-described imaging lens can be made to have a higher performance by the configuration satisfying the following Conditional Expression 4.

$$1.1 < |f2n/f2p| < 4.6 \quad [4]$$

Herein, f2n indicates the focal length of the lens having a negative refractive power in the second lens group and f2p indicates the focal length of the lens having a positive refractive power in the second lens group.

When |f2n/f2p| in Conditional Expression 4 falls below the lower limit, the coma aberration becomes bigger so such a configuration is not appropriate. When |f2n/f2p| in Conditional Expression 4 exceeds the upper limit, especially, according to shortening of the shooting distance, the tangential coma aberration and the high order spherical aberration are generated significantly. Therefore such a configuration is not appropriate because the imaging efficiency is degraded.

Such a constitution satisfying Conditional Expression 4 provides the optimum solution for the focal length of the focusing lens.

The above-described imaging lens can be made to have a higher performance by the configuration satisfying the following Conditional Expression 5.

$$11.7 \text{ [mm]} < |\Delta Df/\beta| < 32.3 \text{ [mm]} \quad [5]$$

Herein, ΔDf indicates the moving distance of the second lens group according to the focusing performance on an object disposed at the limited distance from the photographing distance infinity. β indicates the imaging magnification when focusing on the object.

When |ΔDf/β| in Conditional Expression 5 falls below the lower limit, the variation of magnification according to the focusing is increased, and the moving distance of the second lens group when focusing from the infinity to the close range is shortened. From such a configuration, the focusing speed is improved but it is not appropriate because it is necessary to control the limit of resolution in particular. When |ΔDf/β| in Conditional Expression 5 exceeds the upper limit, the variation amount of the magnification according to the focusing becomes smaller. So such a configuration is not appropriate because the moving distance of the second lens group becomes bigger and the focusing speed is reduced.

Such a configuration satisfying Conditional Expression 5 provides the optimum solution for the imaging magnification and the moving distance of the focusing lens when focusing on the object at the limited distance in particular.

The above-described imaging lens can be made to have a higher performance by the configuration satisfying the following Conditional Expression 6.

$$0.7 < R2o/R2i < 2.0 \quad [6]$$

Herein, R2o indicates the curvature radius R of an object side of a lens in the second lens group which is disposed on the most object side. R2i indicates the curvature radius R of an imaging side of the lens in the second lens group which is disposed on the most imaging surface side.

When R2o/R2i in Conditional Expression 6 is out of the lower and the upper limits, the sagittal coma aberration arises significantly, so such a configuration is not appropriate. It is appropriate in particular that the variation range of the aberration according to the focusing operation be large and R2o/R2i be within the range of Conditional Expression 6.

The above-described imaging lens can be made to have a higher performance by the configuration such that the second lens group includes a cemented lens.

That is, by the configuration having only one cemented lens as the focusing lens, the configuration of the lens can be simplified. And by the similar configuration, the eccentricity between the lenses can be minimized. Furthermore, when the focusing lens is configured with one commented lens, the numbers of the components are reduced and the number of assembly processes can be reduced.

The above-described imaging lens can be made to have a higher performance by the configurations such that the second lens group has an air lens in a space between the lens having the negative refractive power and the lens having the positive refractive power.

That is, by including an air lens within the second les group as the focusing lens, it is made possible to correct the fluctuation of each aberration by the moving of the focusing lens more effectively.

The above-described imaging lens can be made to have a higher performance by configurations satisfying the following Conditional Expression 7.

$$1.7 \leq (Nd2n, Nd2p) \quad [7]$$

Herein, Nd2n indicates the refractive index of the negative lens in the second lens group, and Nd2p indicates the refractive index of the positive lens in the second lens group.

If the configuration does not satisfy the above Conditional expression 7, the color aberration on axis is apt to increase when focusing on the closer side, so it is not appropriate.

The above-described imaging lens can be made to have a higher performance by the configurations satisfying the following Conditional Expression 8.

$$-1.1 < f1/f3 < -0.6 \quad [8]$$

Herein, f1/f3 indicates the focal length of the first lens group and f3 indicates the focal length of the third lens group.

When f1/f3 in Conditional expression 8 falls below the lower limit, the color aberration of magnification significantly occurs especially while the shooting distance is on the nearer side. When f1/f3 in Conditional expression 8 exceeds the upper limit, the power of the third lens group is decreased and the astigmatic difference becomes large so it is not appropriate.

The above-described imaging lens can be made to have a higher performance by the configurations satisfying the following Conditional Expression 9.

$$0.5 < LD1/LD3 < 0.9 \quad [9]$$

Herein, LD1 indicates the maximum effective diameter of the largest lens of the first lens group and LD3 indicates the maximum effective diameter of the largest lens of the third lens group.

Conditional Expression 9 controls the lens diameter of the imaging lens to have the most preferable result of the present invention. When LD1/LD3 is out of the lower and upper limits, the lens diameter of the first or third lens becomes larger so the lens barrel diameter becomes large, the lens diameter becomes large, and it is difficult to minimize the lens. Therefore, such a configuration is not appropriate.

The above-described imaging lens can be made to have a higher performance by the configurations satisfying the following Conditional Expression 10.

$$SD > 3.0 \text{ [mm]} \quad [10]$$

Herein, SD indicates the dimension of the shutter space in the optical axis direction, which is disposed between the lenses.

Herein, the shutter space is provided between the lenses disposed in front and rear of the aperture stop in the first lens group. It is the most effective that the shutter be provided in the position where the diameter of the light beam flux becomes the largest, that is, in front and rear of the aperture stop, and the shutter space of 3.0 mm at minimum be kept.

Another imaging lens according to the first embodiment of the present invention includes:

seven or fewer lenses which constitute an entire system of an optical system; and an aperture stop disposed between the lenses in the optical system, wherein the three or fewer lenses including at least one lens having a positive refractive power and one lens having a negative refractive power are provided on the object side of the aperture stop;

the four or more lenses are provided on the imaging side of the aperture stop;

the four or more lenses include at least one cemented lens of a lens having a positive refractive power and a lens having a negative refractive power, and a lens disposed on the most object side and a lens disposed on the most imaging side in the four or more lenses are fixed so that they cannot move at least while focusing and at least one cemented lens is moved corresponding to the focusing. Thereby the imaging lens can be a brighter, miniaturized and high performance lens.

The imaging lens is configured as described above so that it can correct the aberration occurring in the optical system. From such a configuration, the aberration can be corrected by the imaging lens at a high level. Generally, in a single-focus imaging optical system, it is appropriate to choose a lens which extends its entire body while focusing, in consideration of the aberration fluctuation due to astigmatic differences and so on. However, according to the above-described configuration, it is made possible to avoid the astigmatic differences as much as possible even if the focusing lens includes only one cemented lens. That is, by the configuration including the negative refractive power lens on the most imaging side and making it as a fixed group which does not move while focusing, the astigmatic differences can be lowered.

Thereby, a miniaturized and high performance inner-focus type optical system can be obtained. The optical system has a wide angle such as a half viewing angle of 29 to 33 degrees. It is bright such as having an F number of F 2.5 and includes fewer focusing lenses of two.

Another imaging lens according to the embodiments of the present invention includes:

seven or fewer lenses which constitute an entire system of the optical system; and an aperture stop disposed between the lenses in the optical system, wherein the three lenses or fewer including at least one lens having a positive refractive power and one lens having a negative refractive power are provided on an object side of the aperture stop;

the four or more lenses are provided on an imaging side of the aperture stop;

the four or more lenses disposed on the imaging side of the aperture stop include at least a pair of non-cemented lenses of a lens having a positive refractive power and a lens having a negative refractive power; and a lens disposed on the most imaging side and a lens disposed on the most object side in the four or more lenses on the imaging side are fixed so that they cannot move at least while focusing and the at least a pair of non-cemented lenses of the lens having a positive refractive power and the lens having a negative refractive power is moved corresponding to the focusing. Thereby the imaging lens can be a brighter, miniaturized and high performance lens.

The imaging lens is configured as described above in order to correct the aberration occurring in the optical system. By such a configuration, the aberration is controlled by the imaging lens at a high level. Generally, for a single-focus imaging optical system, it is appropriate to choose a lens which extends its entire body while focusing, in consideration of the aberration fluctuation (astigmatic differences). However, according to the above-described configuration, the astigmatic differences can be avoided as much as possible even if the focusing lens includes a pair of non-cemented lenses of a lens having positive refractive power and a lens having negative refractive power which are to be moved at one time. That is, by the configuration including a negative refractive power lens on the most imaging side and making it as a fixed group which does not move while focusing, the astigmatic differences can be lowered.

Thereby, a miniaturized and high performance inner-focus type optical system can be obtained. The optical system has a wide angle such as a half viewing angle of 29 to 33 degrees. It is bright such as having an F number of F2.5 and includes fewer focusing lenses of two.

In addition, in the eleventh embodiment of the present invention, an imaging device such as a digital camera or an information device having an imaging function is disclosed.

That is, the imaging device according to the eleventh embodiment of the present invention is configured to use the above-described imaging lens as an imaging optical system.

A miniaturized and high performance imaging device can be obtained by the above configuration.

The information device according to the eleventh embodiment of the present invention has a function of photographing and includes the above-described imaging lens to use as an imaging optical device.

A miniaturized and high performance information device having an imaging function can be obtained by such a configuration.

Example 1

Hereafter, the detailed descriptions of examples according to the above-described embodiments of the present invention will be given. The following Examples 1-10 describe the detailed configurations with the specific numerical values of the imaging lens corresponding to the first to tenth embodiments of the present invention. The eleventh embodiment describes an imaging device or an information device using the lens unit including the imaging lens shown in Examples 1-10 as an optical system for imaging.

Figure 2:
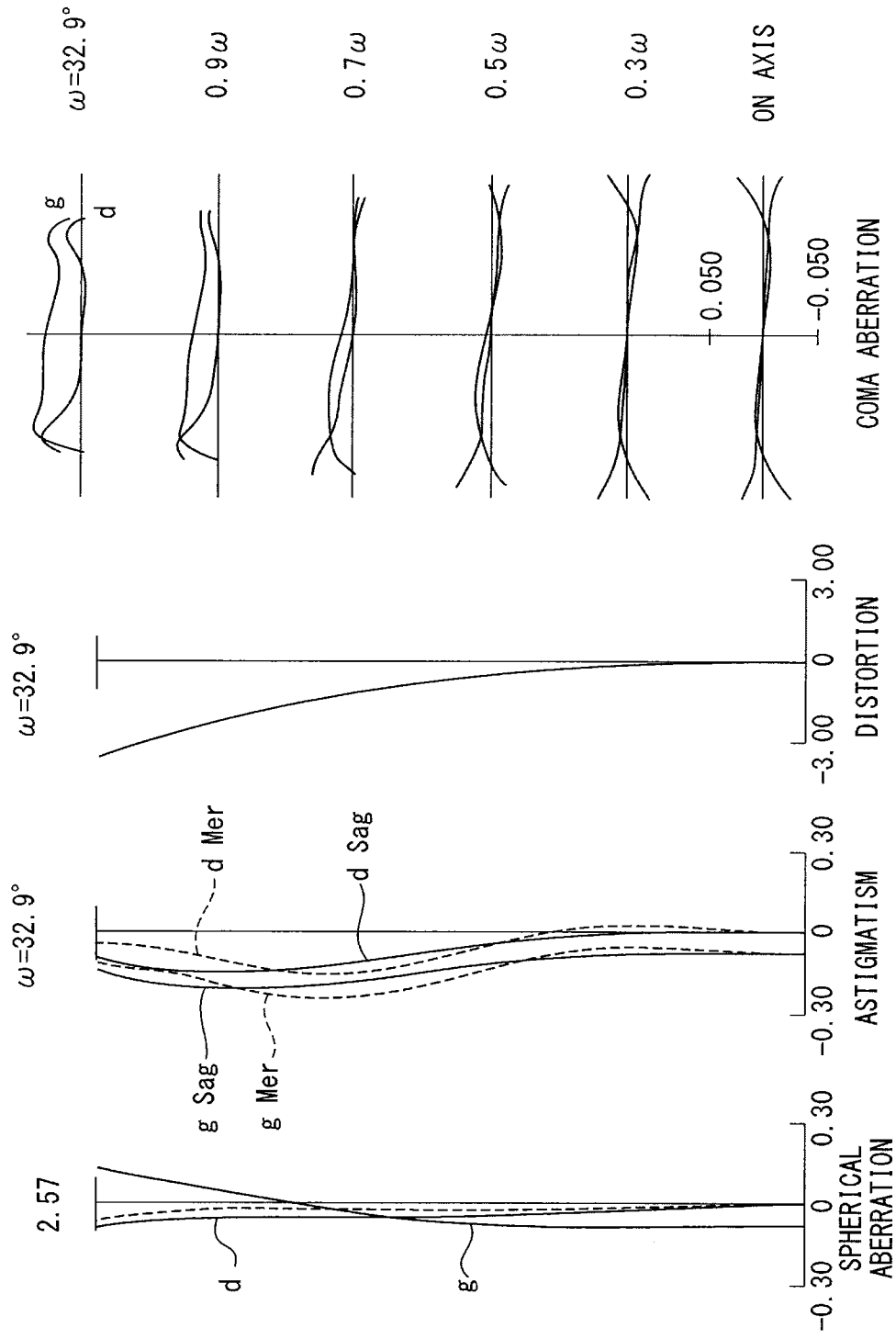
FIG. 2 illustrates aberration curves of spherical aberration, astigmatism, distortion, and coma aberration of the d and g lines when the imaging lens according to Example 1 of the present invention illustrated in FIG. 1 is focused on an infinite object.
Figure 3:
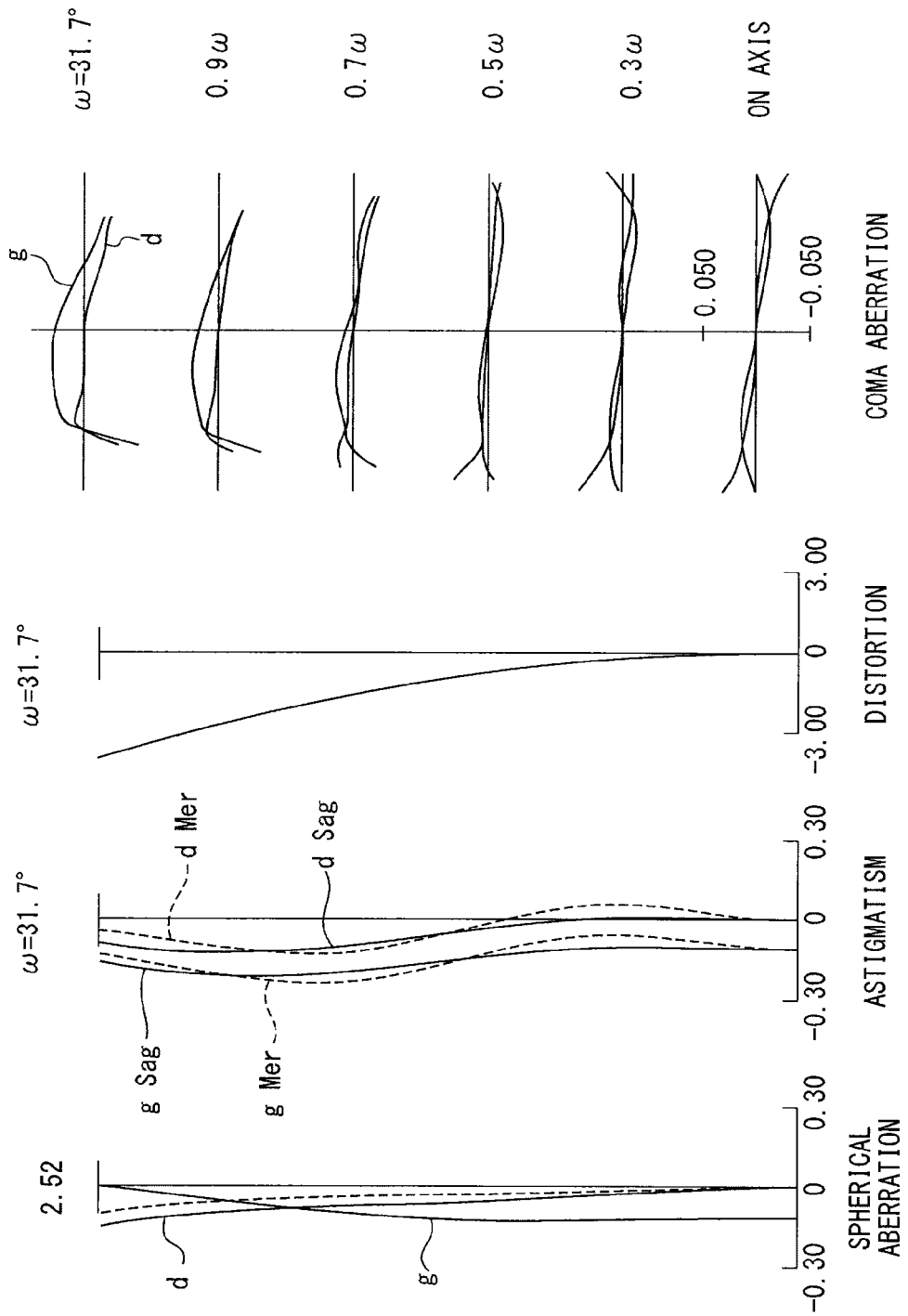
FIG. 3 illustrates aberration curves of spherical aberration, astigmatism, distortion and coma aberration of the d and g lines when the imaging lens according to Example 1 of the present invention illustrated in FIG. 1 is focused at the imaging magnification ratio of about one-twentieth (imaging distance is nearly equal to 500 mm).
Figure 4:
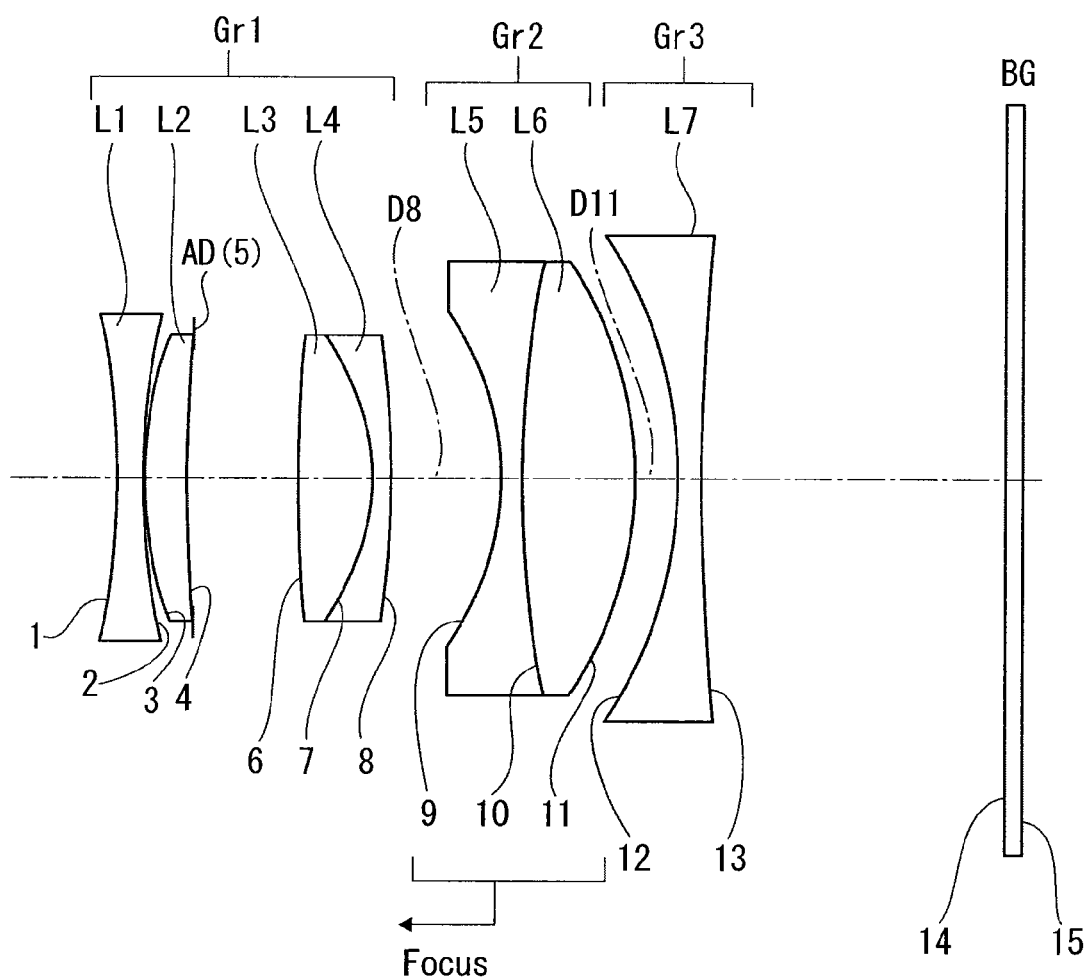
FIG. 4 is a schematic cross-sectional view along an optical axis which illustrates a configuration of an optical system of an imaging lens according to Example 2 of a second embodiment of the present invention.
Figure 5:
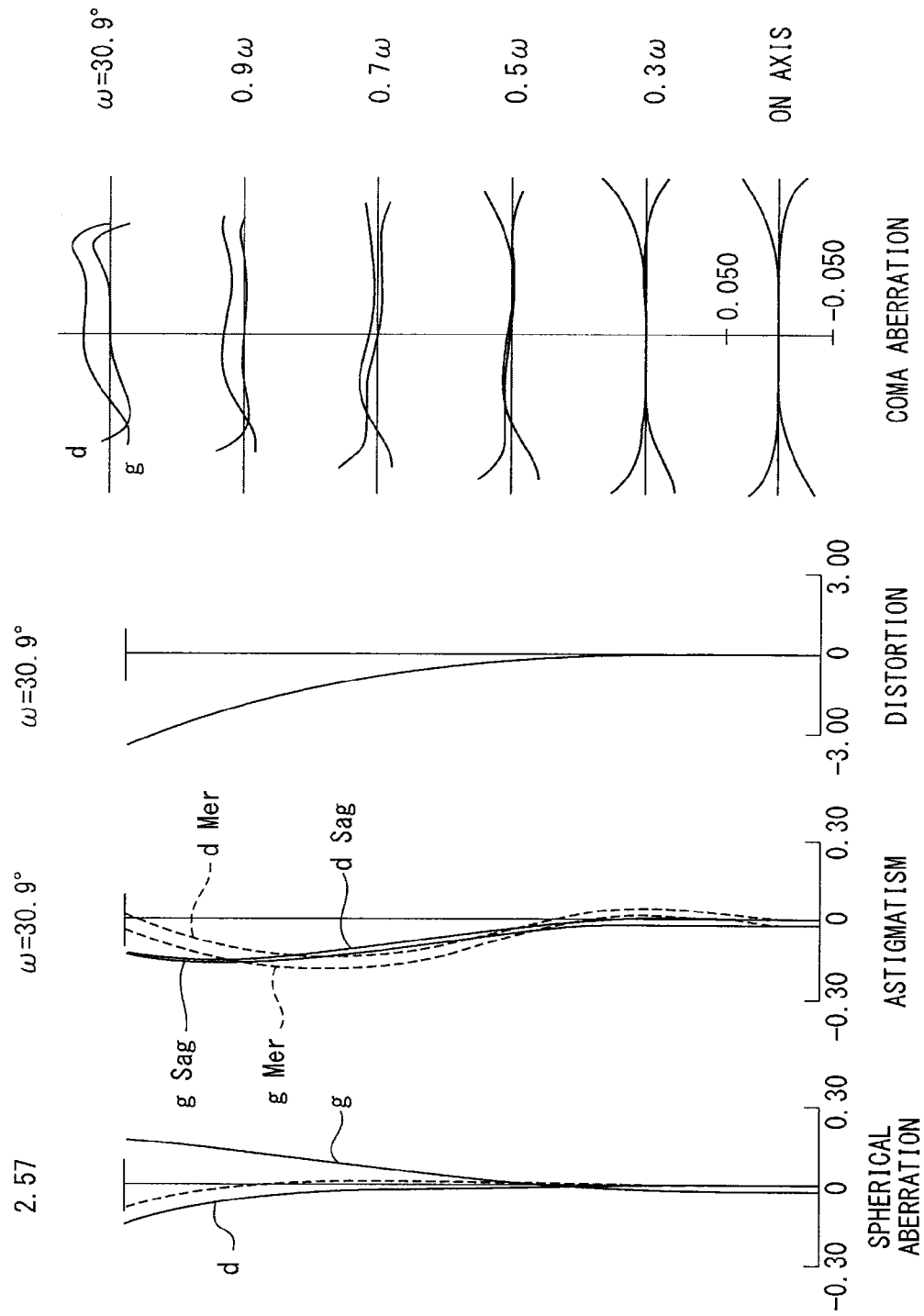
FIG. 5 illustrates aberration curves of spherical aberration, astigmatism, distortion, and coma aberration of the d and g lines when the imaging lens according to Example 2 of the present invention is focused on an infinite object.
Figure 6:
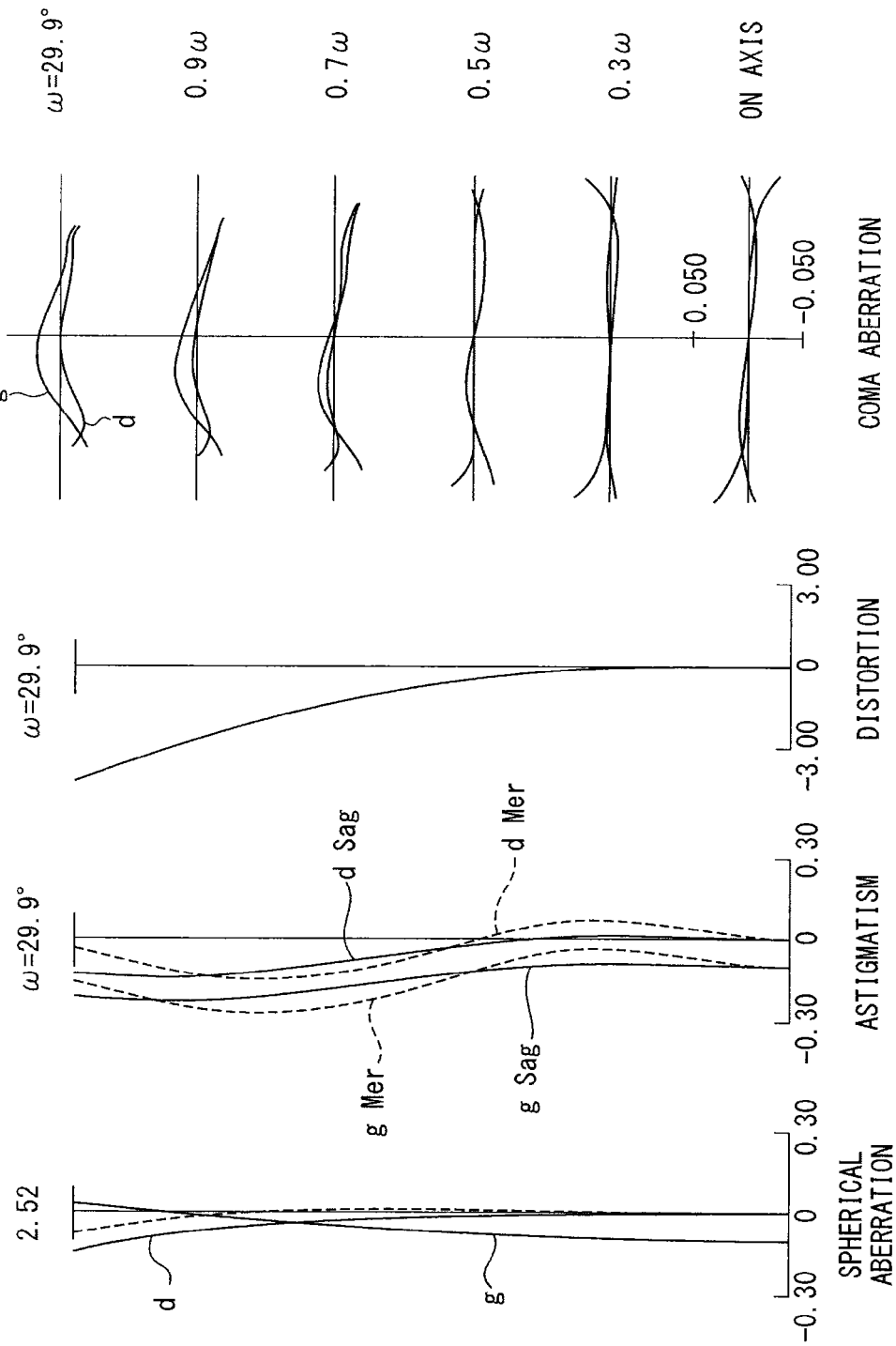
FIG. 6 illustrates aberration curves of spherical aberration, astigmatism, distortion, and coma aberration of the d and g lines when the imaging lens according to Example 2 of the present invention illustrated in FIG. 4 is focused at the imaging magnification ratio of about one-twentieth (imaging distance is nearly equal to 500 mm).
Figure 7:
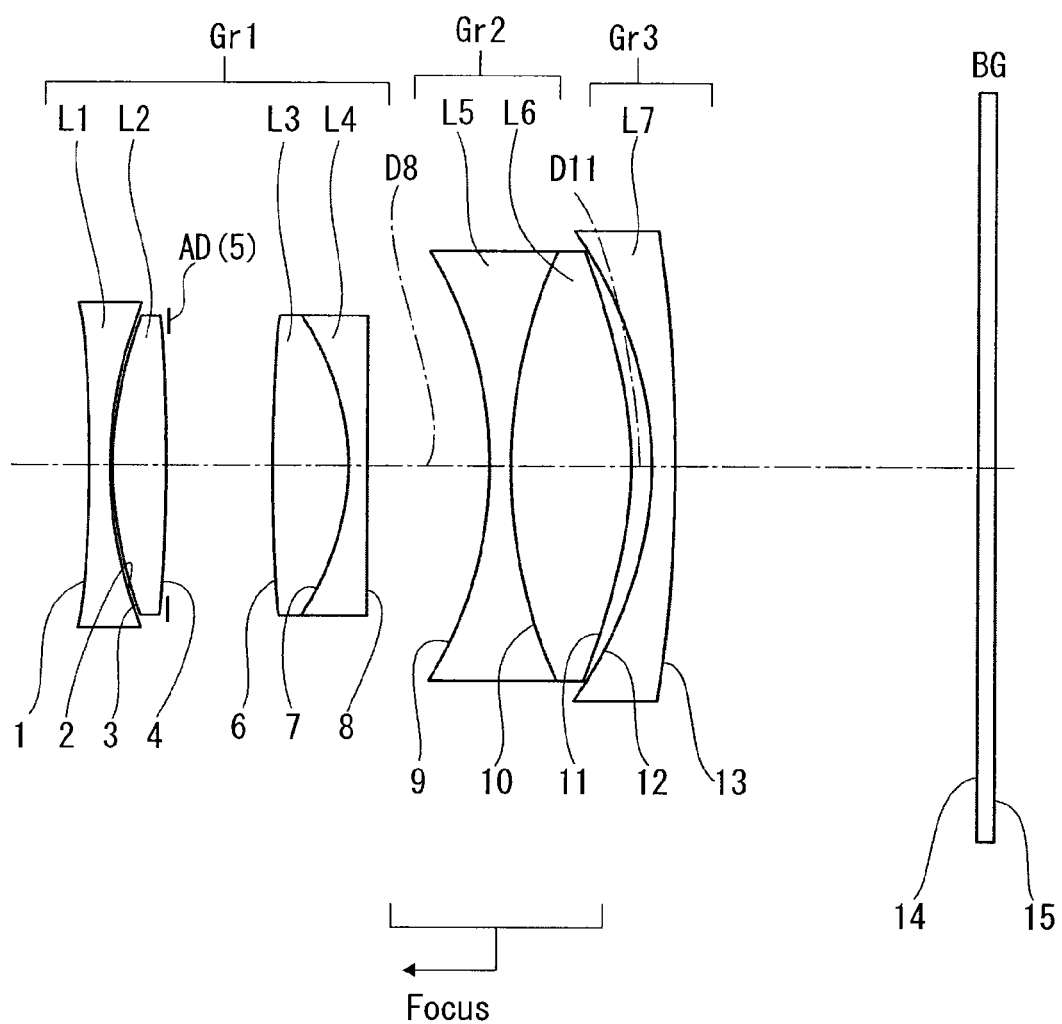
FIG. 7 is a cross-sectional view along an optical axis which illustrates a configuration of an optical system of an imaging lens according to Example 3 of a third embodiment of the present invention.
Figure 8:
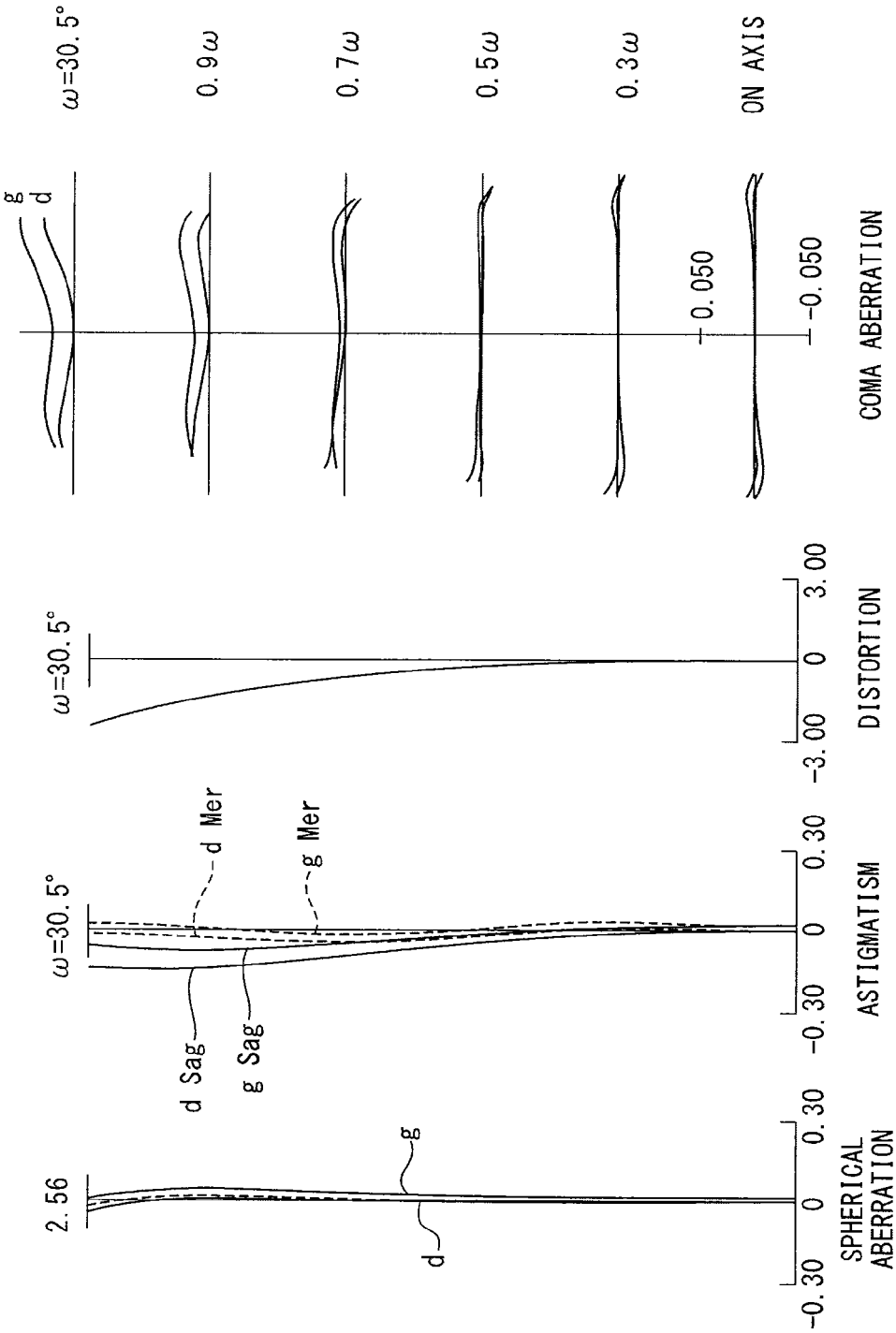
FIG. 8 illustrates aberration curves of spherical aberration, astigmatism, distortion, and coma aberration of the d and g lines when the imaging lens according to Example 3 is focused on an infinite object.
Figure 9:
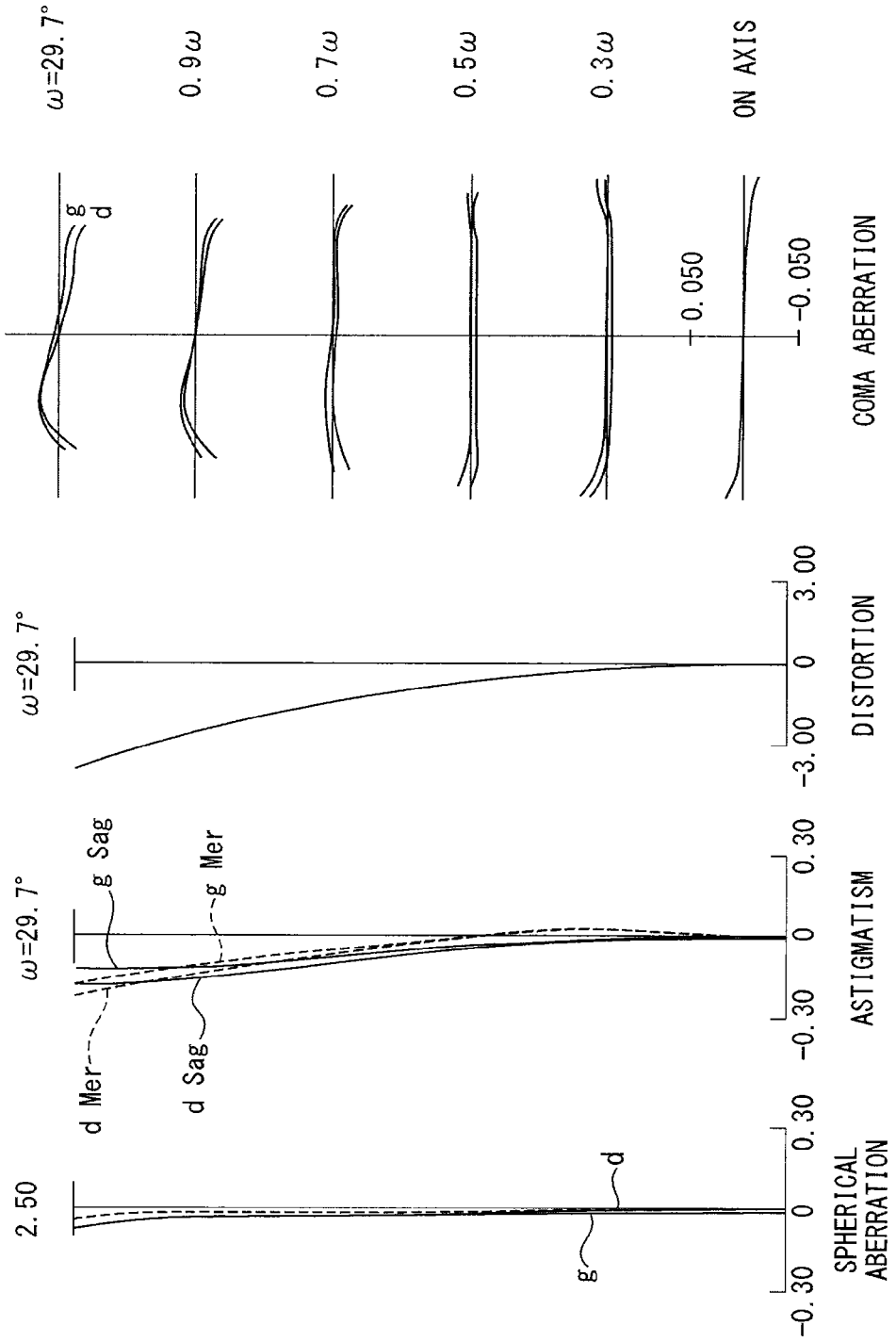
FIG. 9 illustrates aberration curves of spherical aberration, astigmatism, distortion, and coma aberration of the d and g lines when the imaging lens according to Example 3 is focused at the imaging magnification ratio of about one-twentieth (imaging distance is nearly equal to 500 mm).
Figure 10:
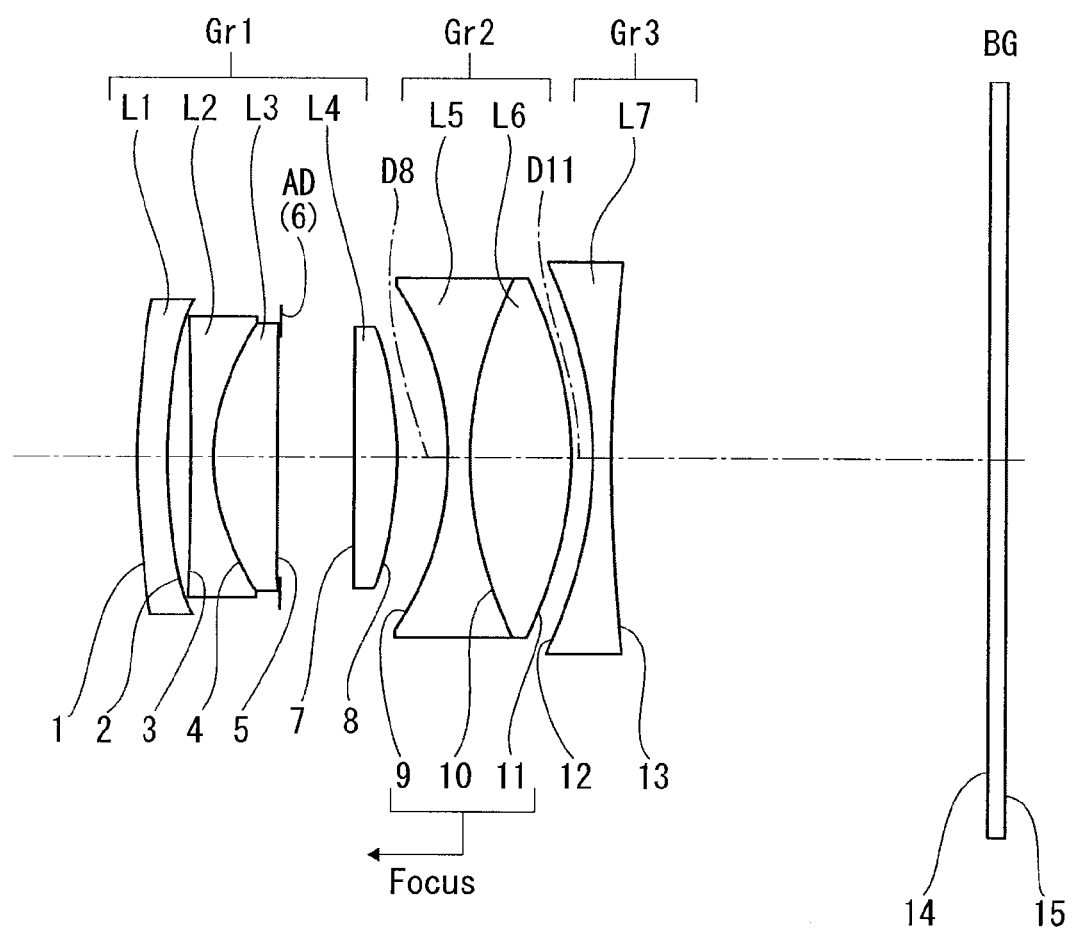
FIG. 10 is a cross-sectional view along an optical axis which illustrates a configuration of an optical system of an imaging lens according to Example 4 of a fourth embodiment of the present invention.
Figure 11:
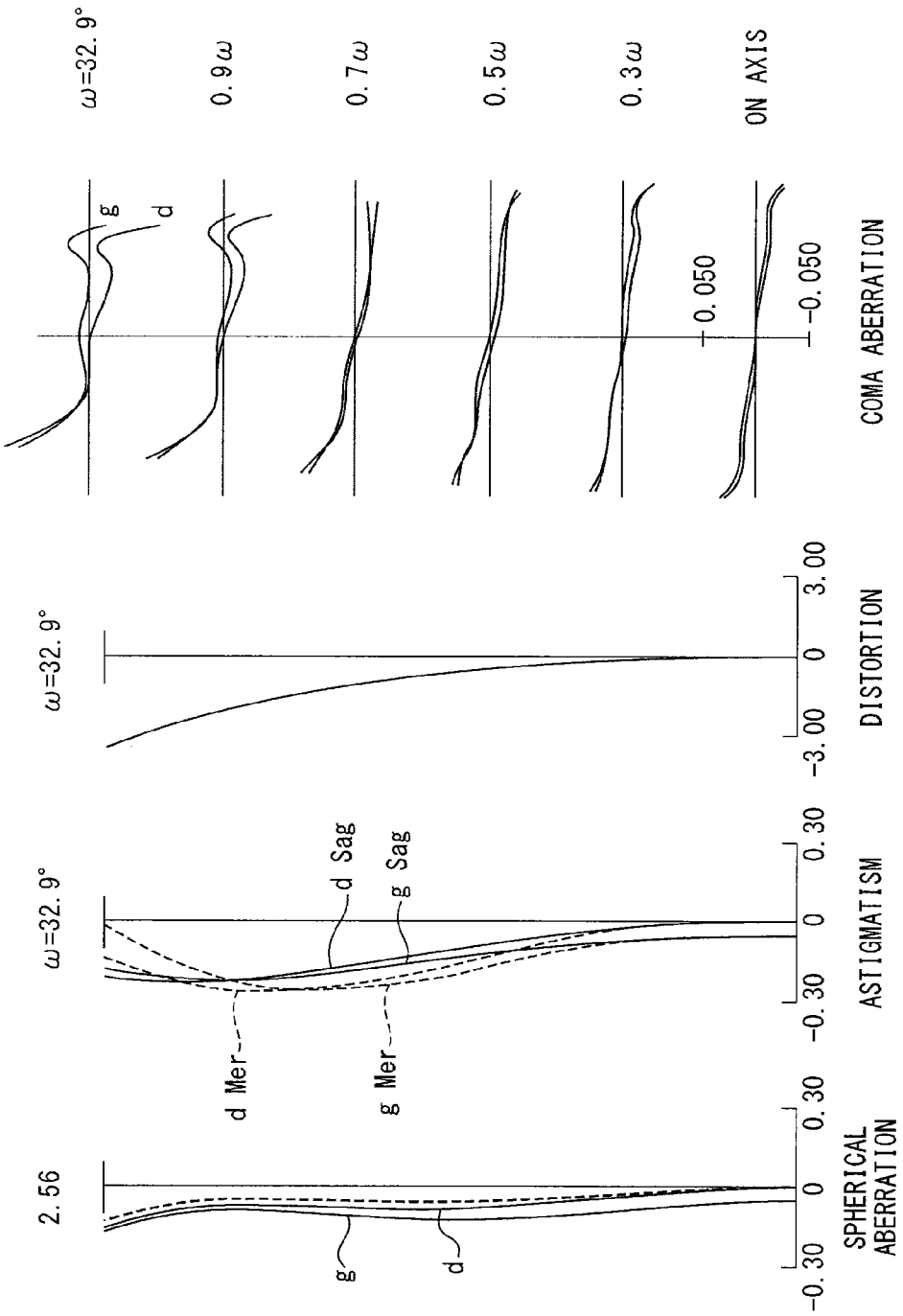
FIG. 11 illustrates aberration curves of spherical aberration, astigmatism, distortion, and coma aberration of the d and g lines when the imaging lens according to Example 4 of the present invention is focused on an infinite object.
Figure 12:
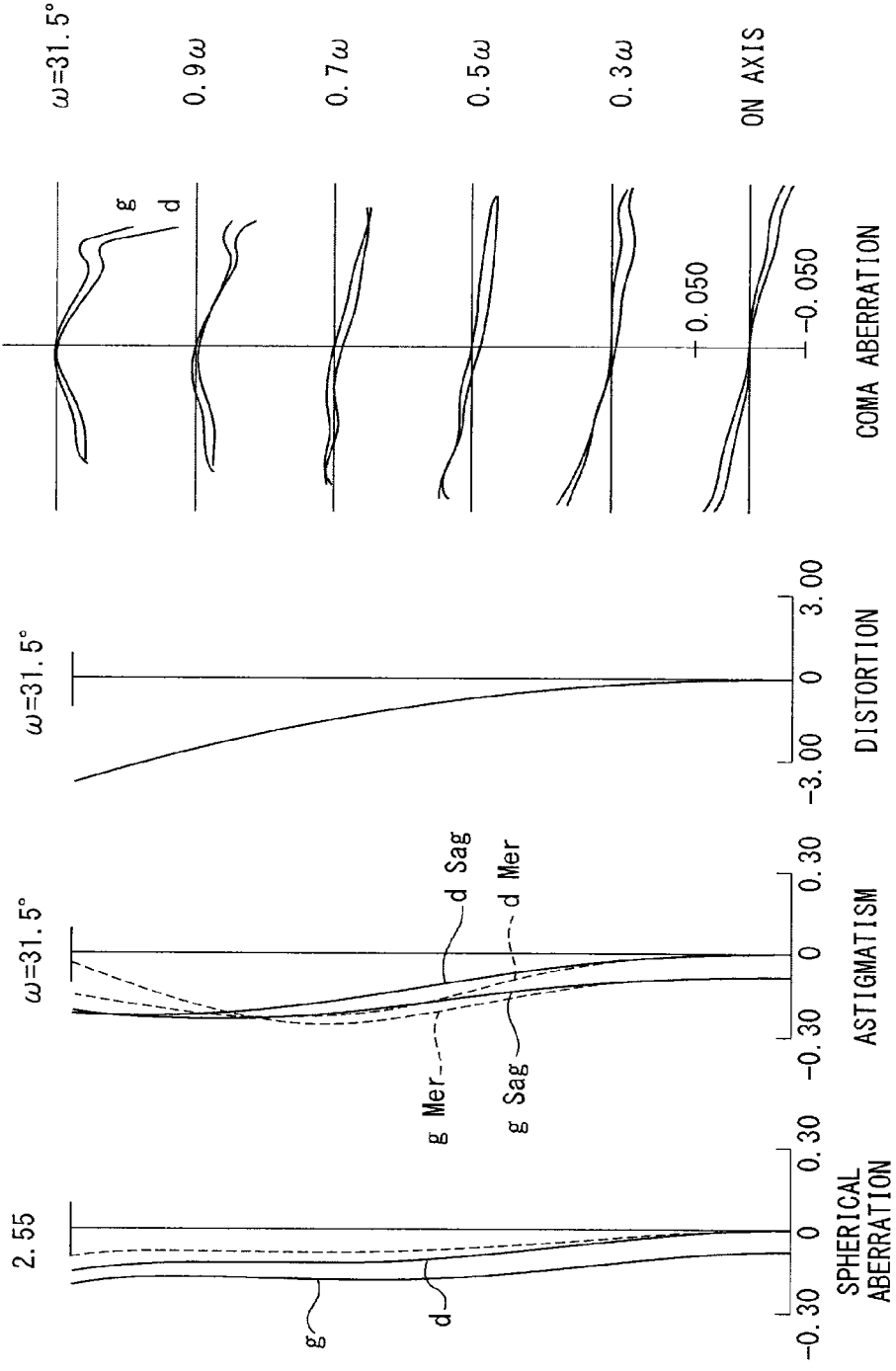
FIG. 12 illustrates aberration curves of spherical aberration, astigmatism, distortion, and coma aberration of the d and g lines when the imaging lens according to Example 4 of the present invention illustrated in FIG. 10 is focused at the imaging magnification ratio of about one-twentieth (imaging distance is nearly equal to 500 mm).
Figure 13:
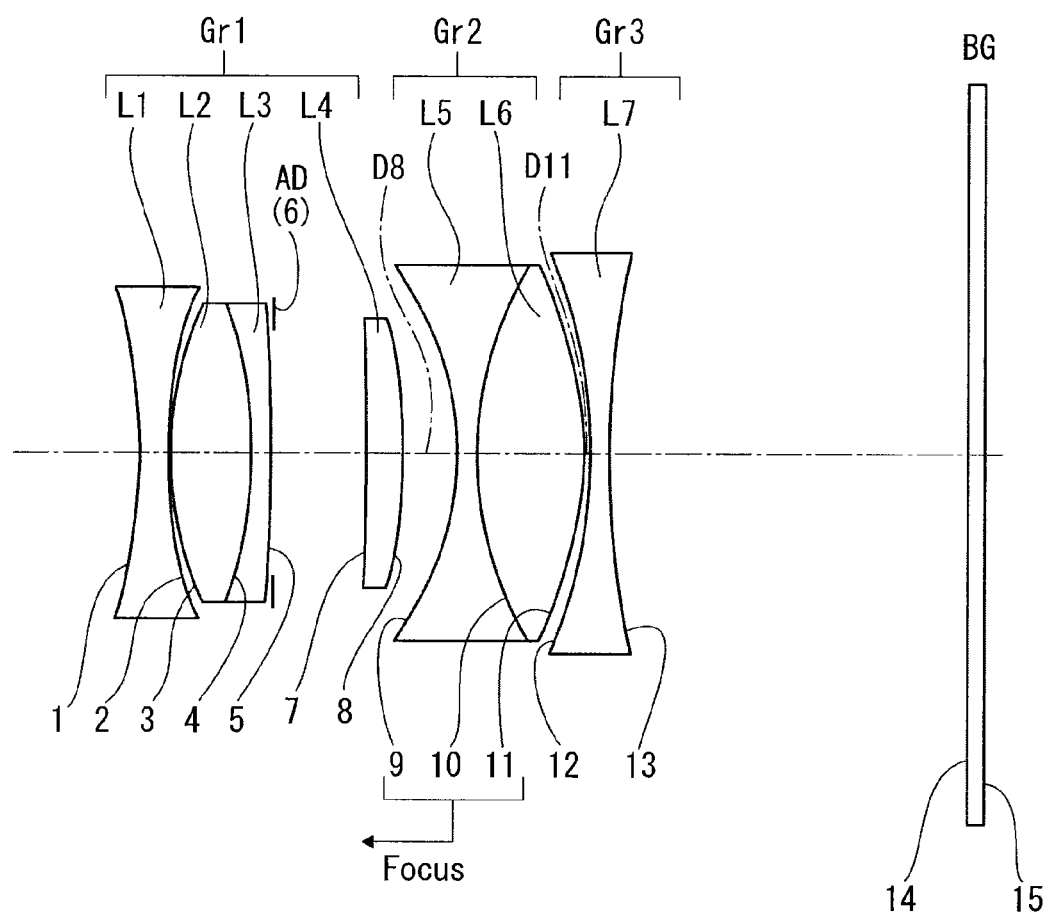
FIG. 13 is a cross-sectional view along an optical axis which illustrates a configuration of an optical system of an imaging lens according to Example 5 of a fifth embodiment of the present invention.
Figure 14:
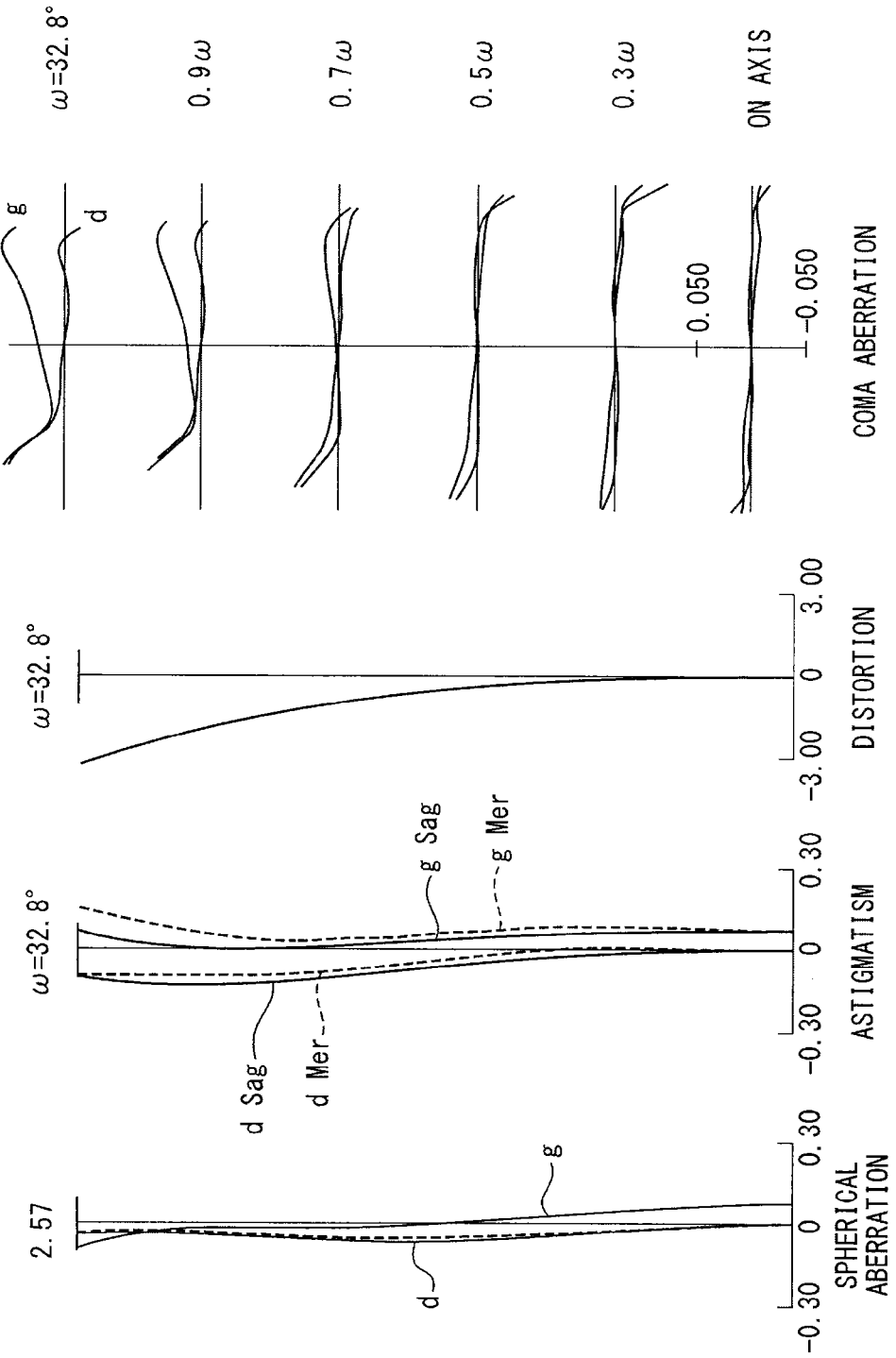
FIG. 14 illustrates aberration curves of spherical aberration, astigmatism, distortion, and coma aberration of the d and g lines when the imaging lens according to Example 5 of the present invention is focused on an infinite object.
Figure 15:
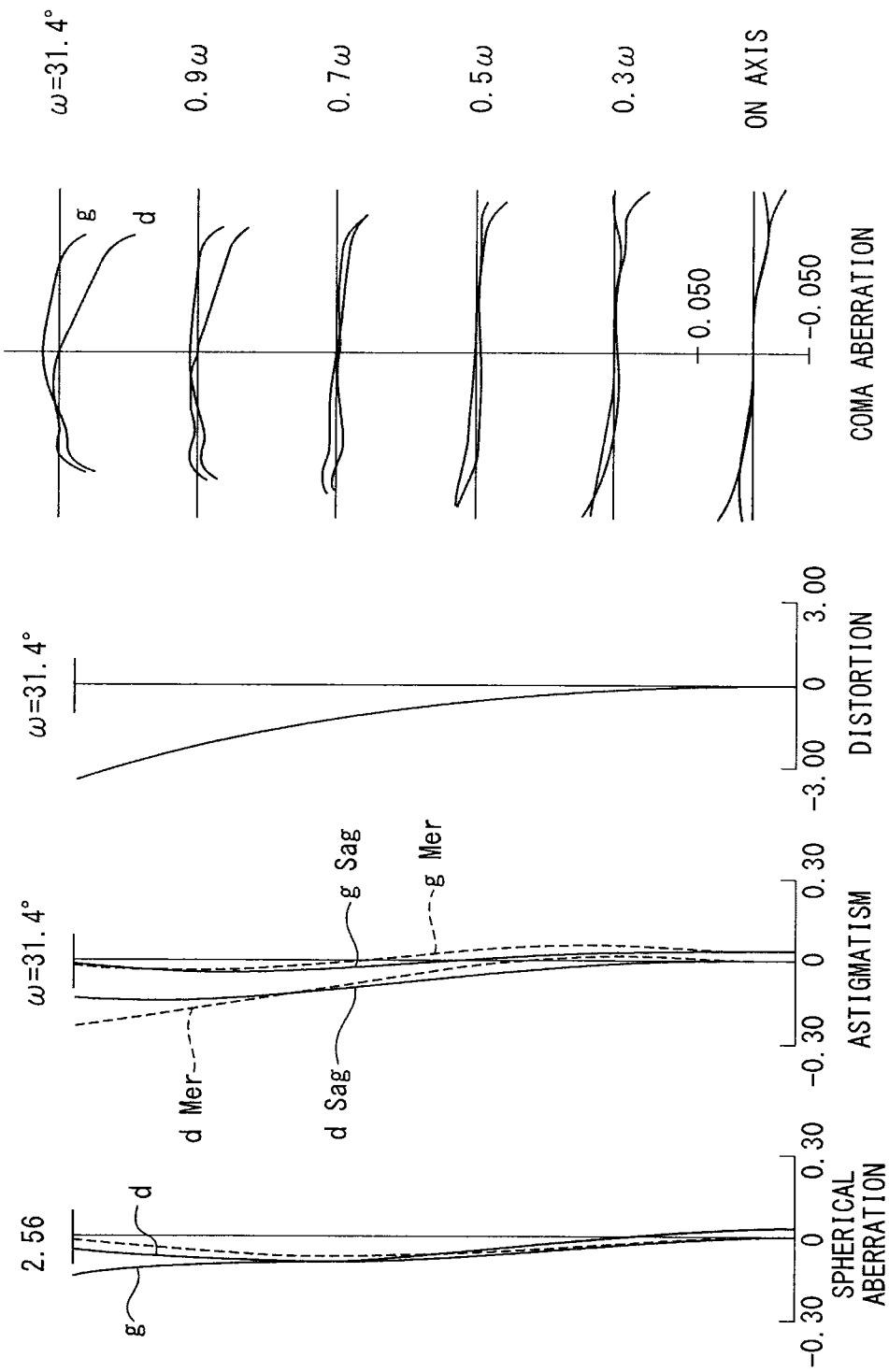
FIG. 15 illustrates aberration curves of spherical aberration, astigmatism, distortion, and coma aberration of the d and g lines when the imaging lens according to Example 5 of the present invention is focused at the imaging magnification ratio of about one-twentieth (imaging distance is nearly equal to 500 mm).

FIGS. 1-3 illustrate an imaging lens according to Example 1 of the first embodiment of the present invention. FIGS. 4-6 illustrate an imaging lens according to Example 2 of the second embodiment of the present invention. FIGS. 7-9 illustrate an imaging lens according to Example 3 of the third embodiment of the present invention. FIGS. 10-12 illustrate an imaging lens according to Example 4 of the fourth embodiment of the present invention. FIGS. 13-15 illustrate an imaging lens according to Example 5 of the fifth embodiment of the present invention.

Figure 16:
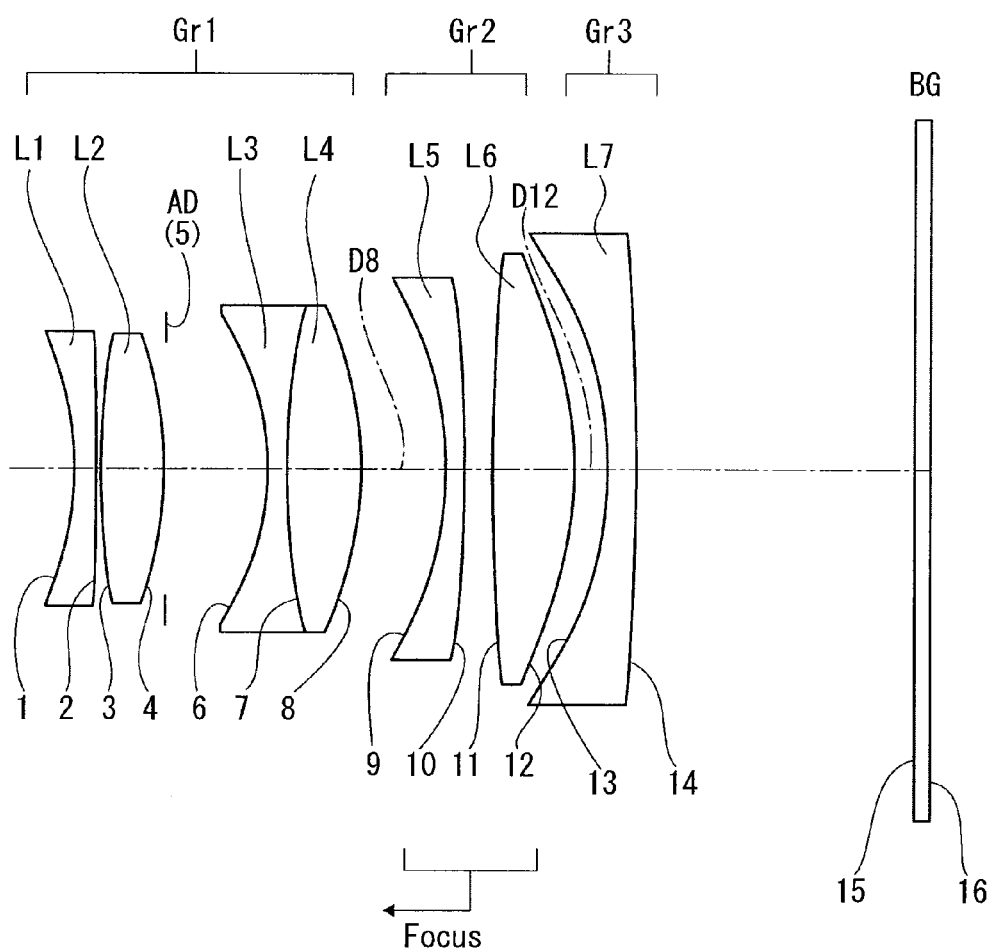
FIG. 16 is a cross-sectional view along an optical axis which illustrates a configuration of an optical system of an imaging lens according to Example 6 of a sixth embodiment of the present invention.
Figure 17:
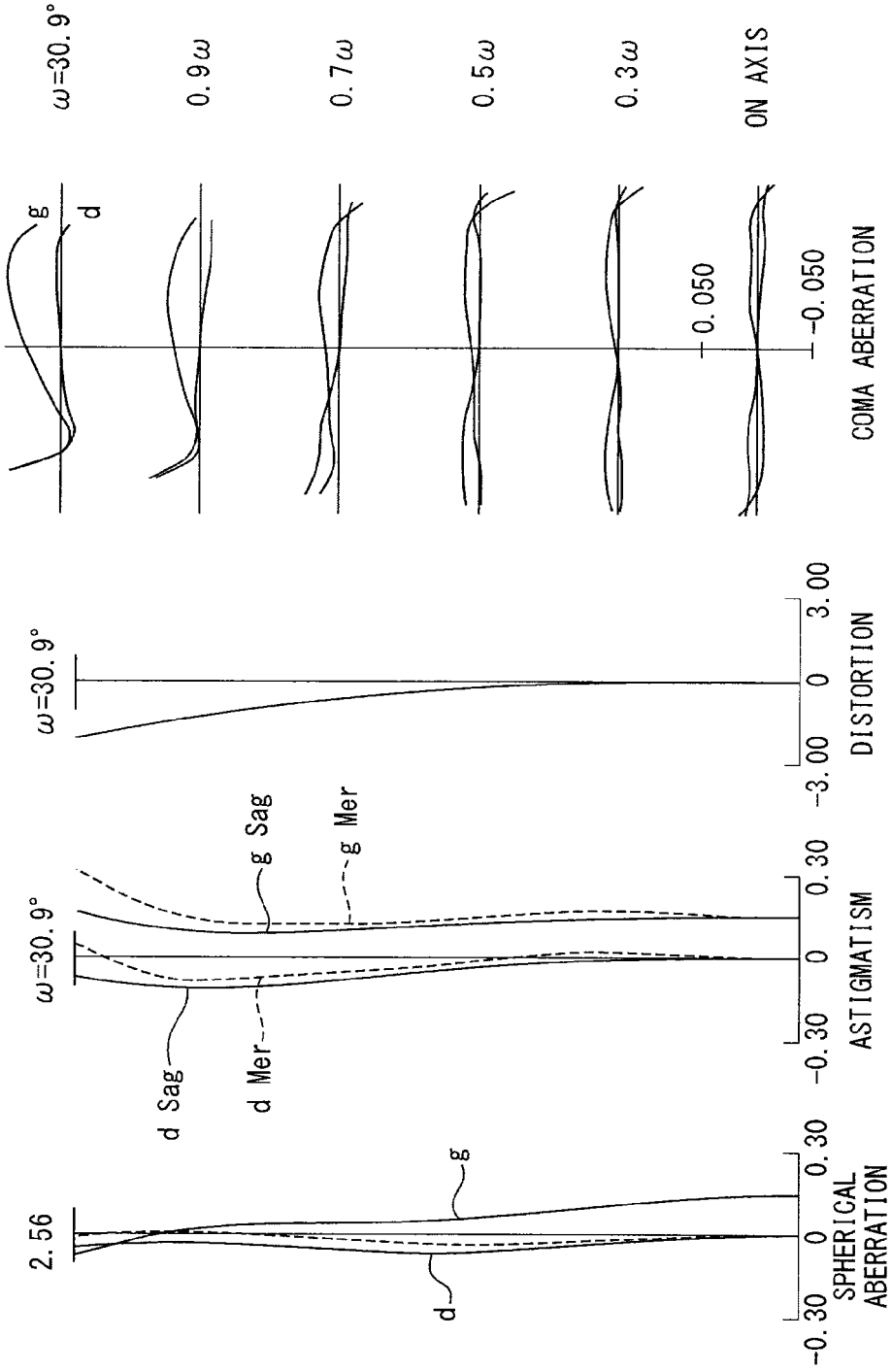
FIG. 17 illustrates aberration curves of spherical aberration, astigmatism, distortion, and coma aberration of the d and g lines when the imaging lens according to Example 6 of the present invention illustrated in FIG. 16 is focused on an infinite object.
Figure 18:
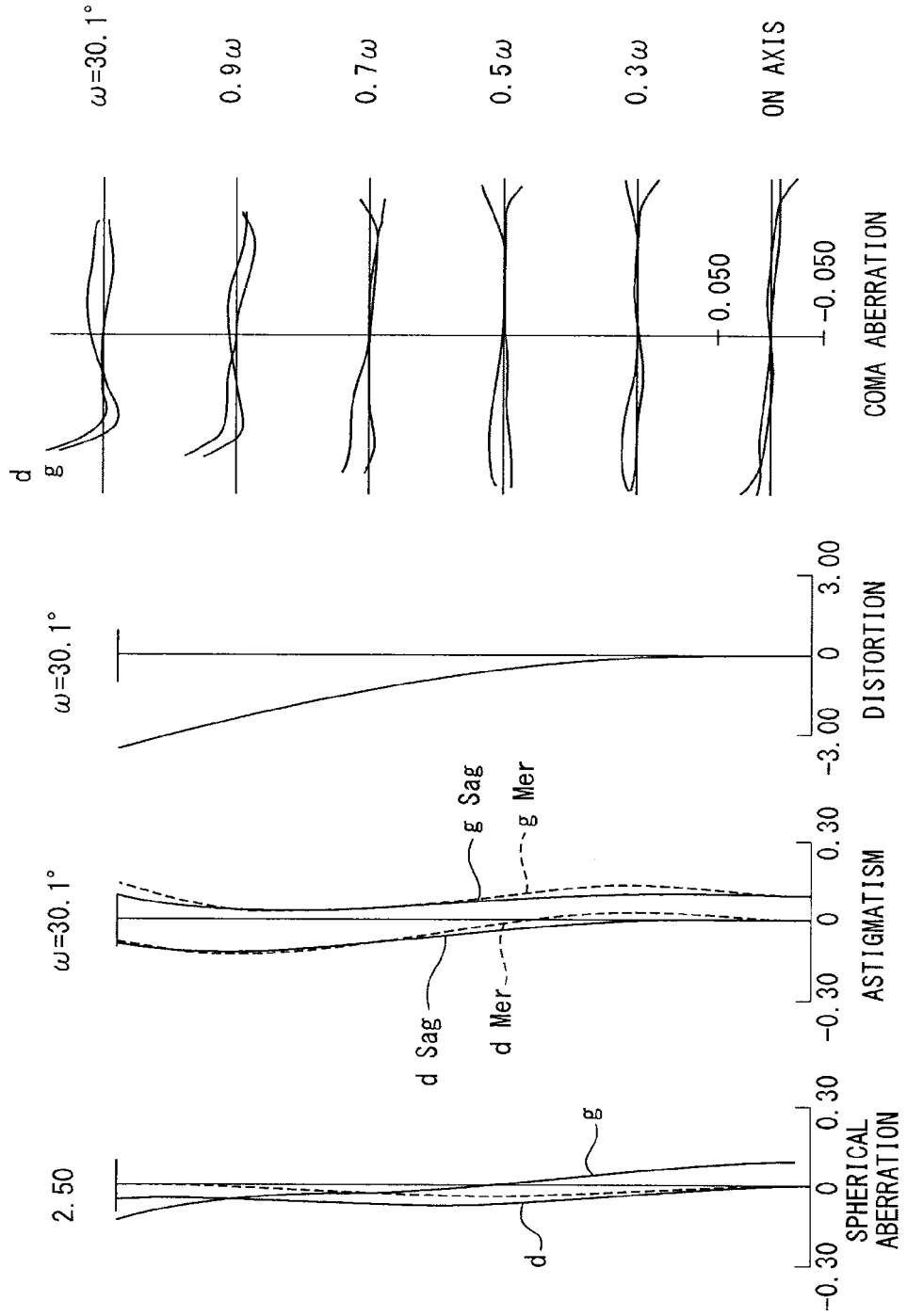
FIG. 18 illustrates aberration curves of spherical aberration, astigmatism, distortion, and coma aberration of the d and g lines when the imaging lens according to Example 6 of the present invention illustrated in FIG. 16 is focused at the imaging magnification ratio of about one-twentieth (imaging distance is nearly equal to 500 mm).
Figure 19:
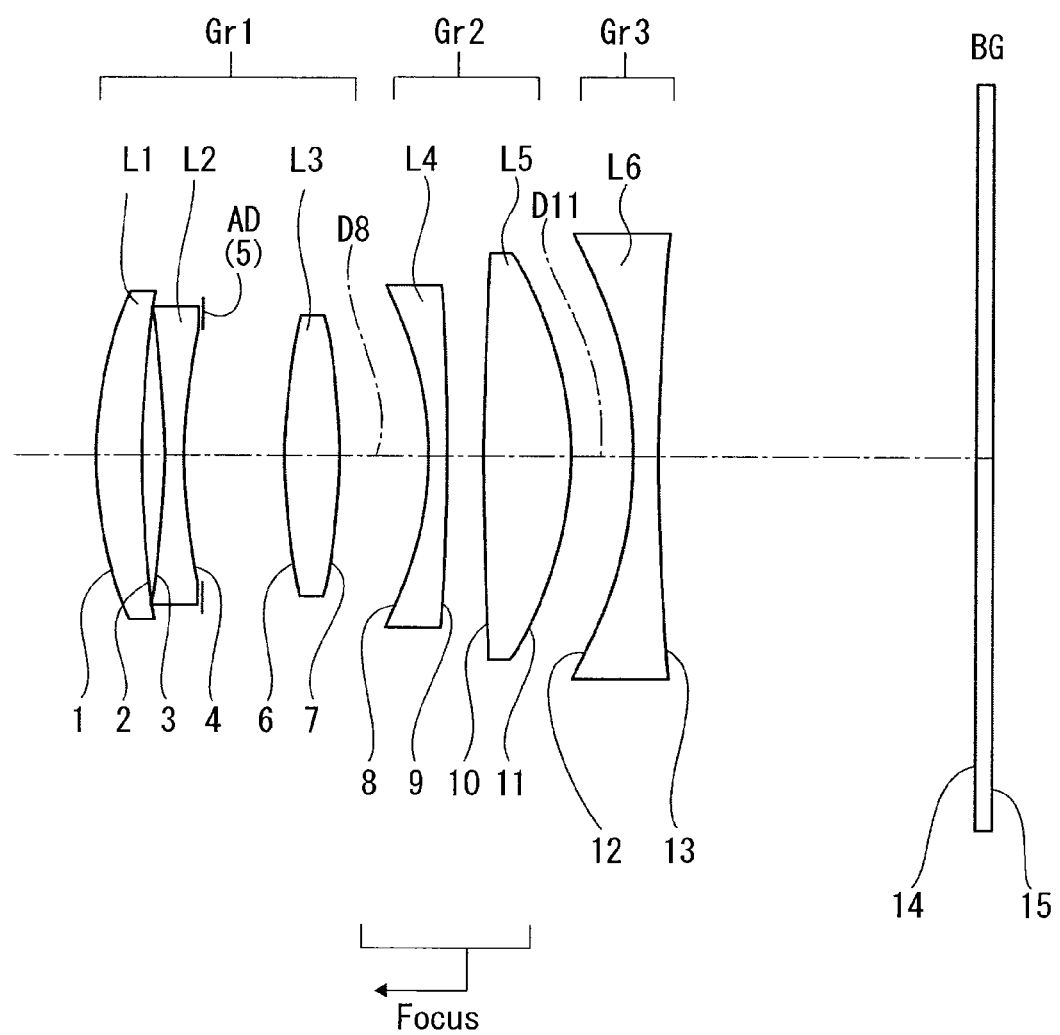
FIG. 19 is a cross-sectional view along an optical axis which illustrates a configuration of an optical system of an imaging lens according to Example 7 of a seventh embodiment of the present invention.
Figure 20:
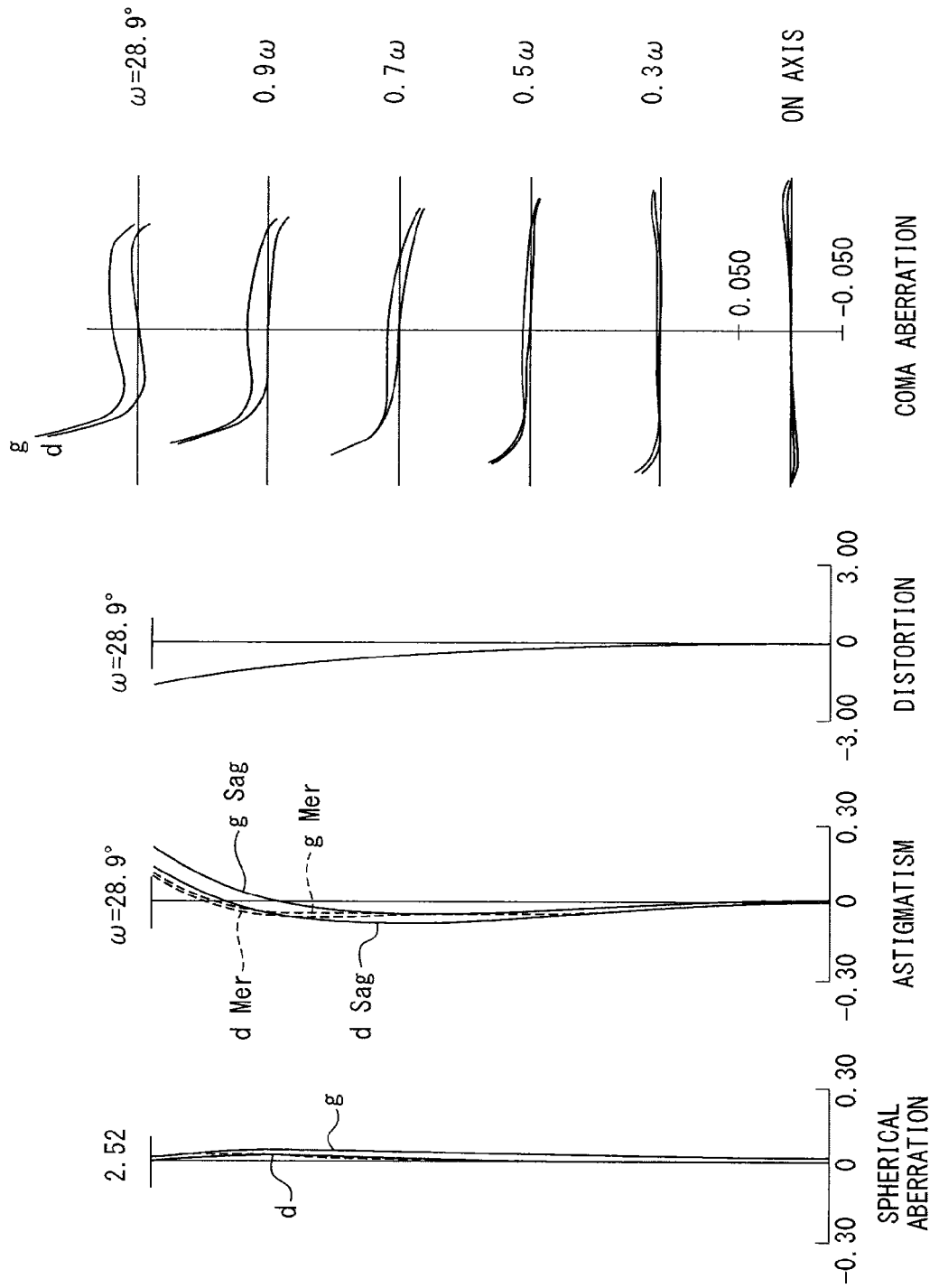
FIG. 20 illustrates aberration curves of spherical aberration, astigmatism, distortion, and coma aberration of the d and g lines when the imaging lens according to Example 7 of the present invention illustrated in FIG. 19 is focused on an infinite object.
Figure 21:
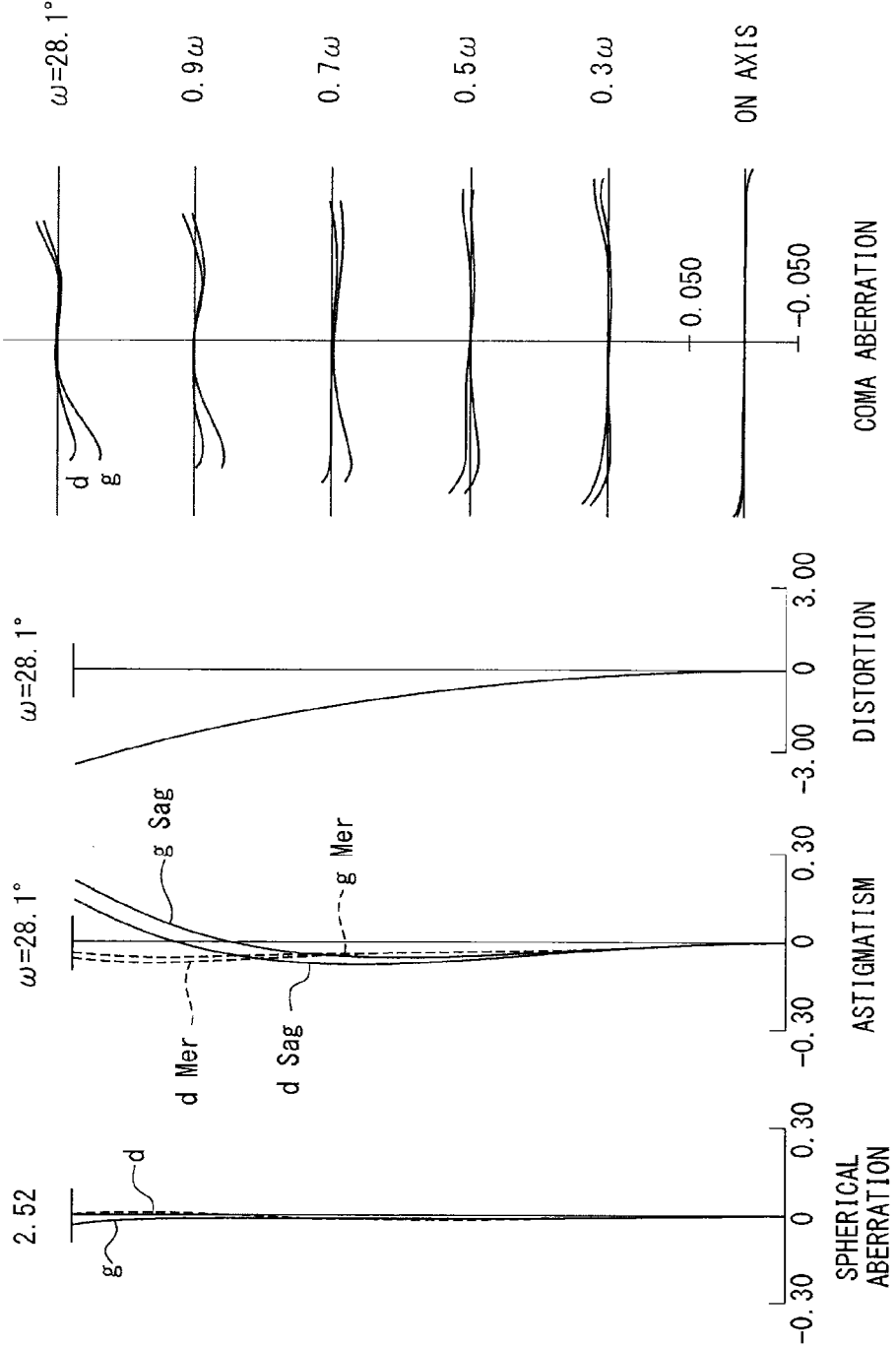
FIG. 21 illustrates aberration curves of spherical aberration, astigmatism, distortion, and coma aberration of the d and g lines when the imaging lens according to Example 7 of the present invention illustrated in FIG. 19 is focused at the imaging magnification ratio of about one-twentieth (imaging distance is nearly equal to 500 mm).
Figure 22:
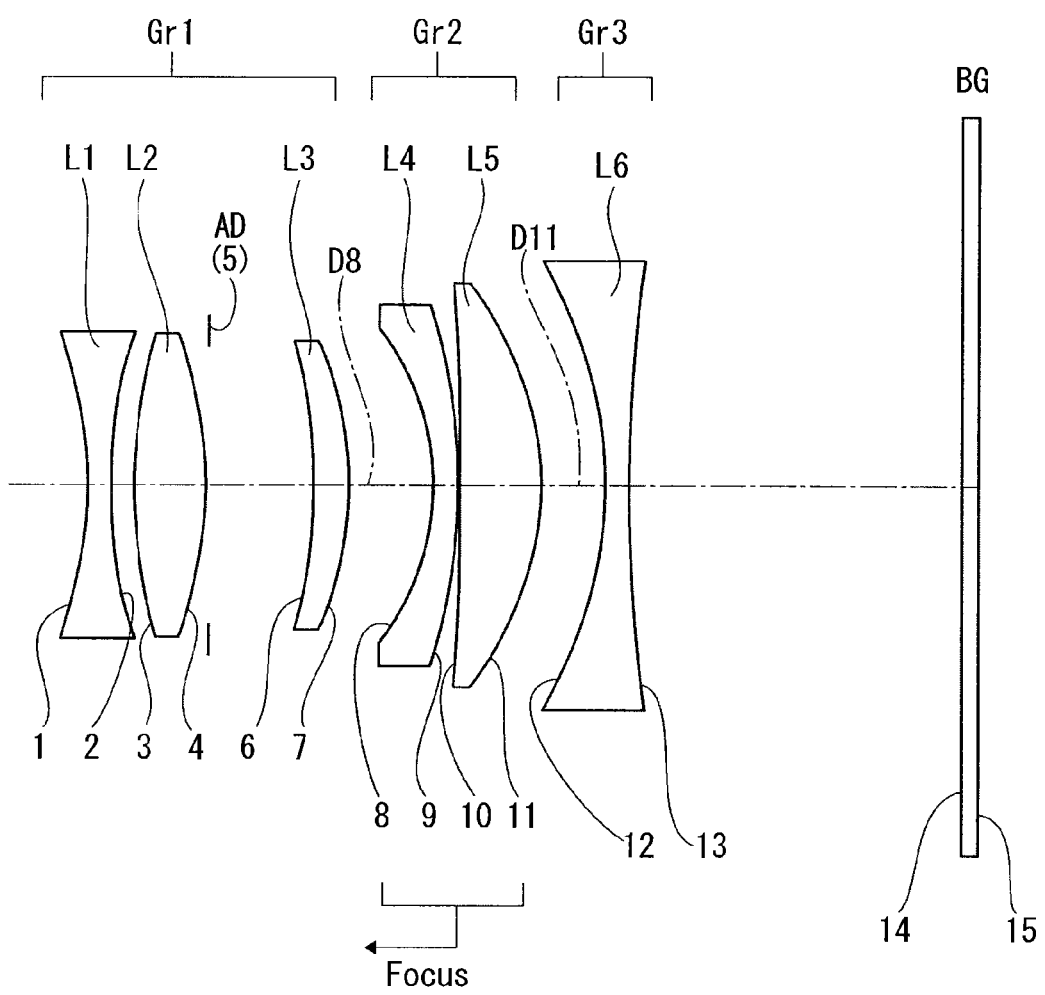
FIG. 22 is a cross-sectional view along an optical axis which illustrates a configuration of an optical system of an imaging lens according to Example 8 of an eighth embodiment of the present invention.
Figure 23:
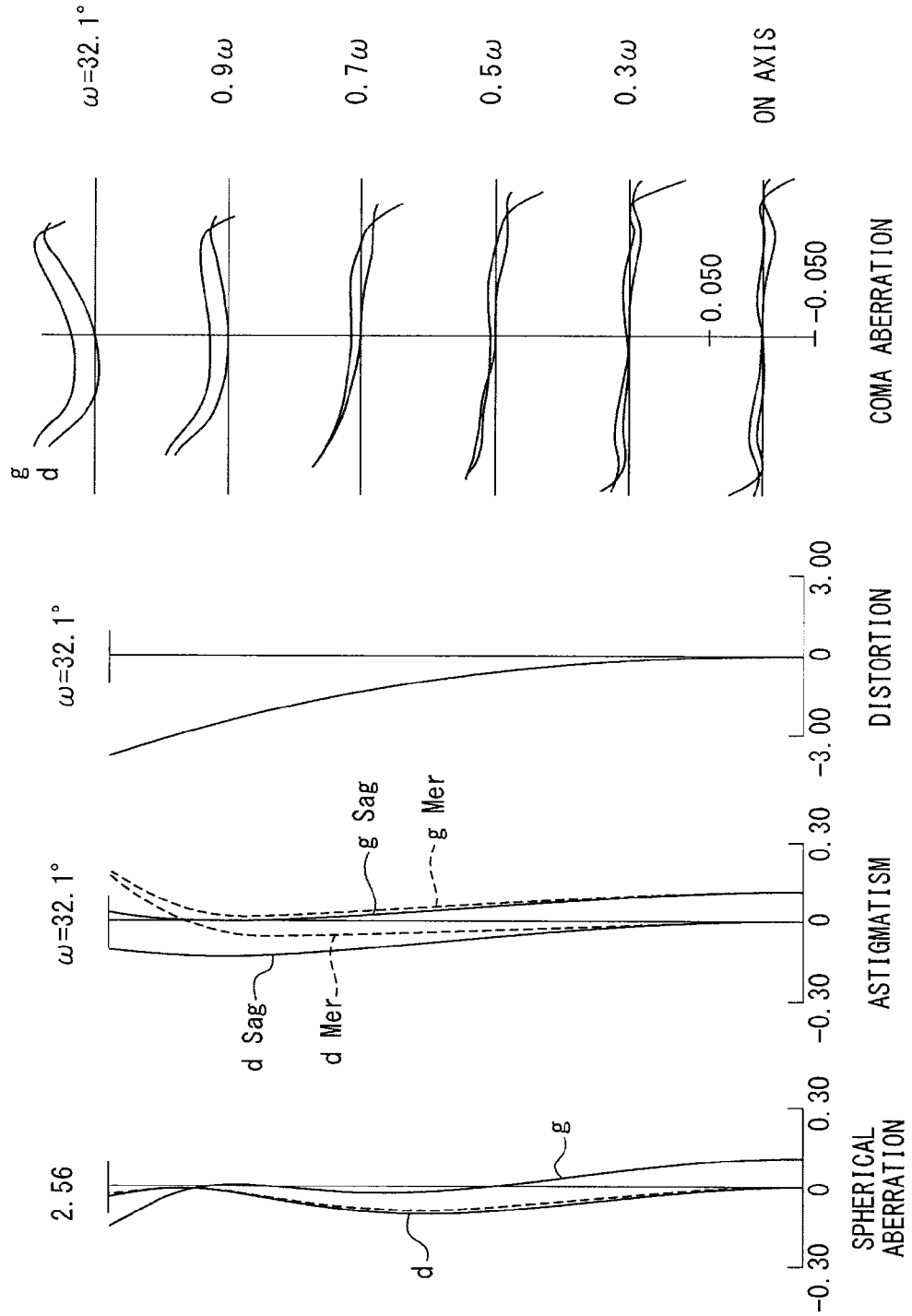
FIG. 23 illustrates aberration curves of spherical aberration, astigmatism, distortion, and coma aberration of the d and g lines when the imaging lens according to Example 8 of the present invention is focused on an infinite object.
Figure 24:
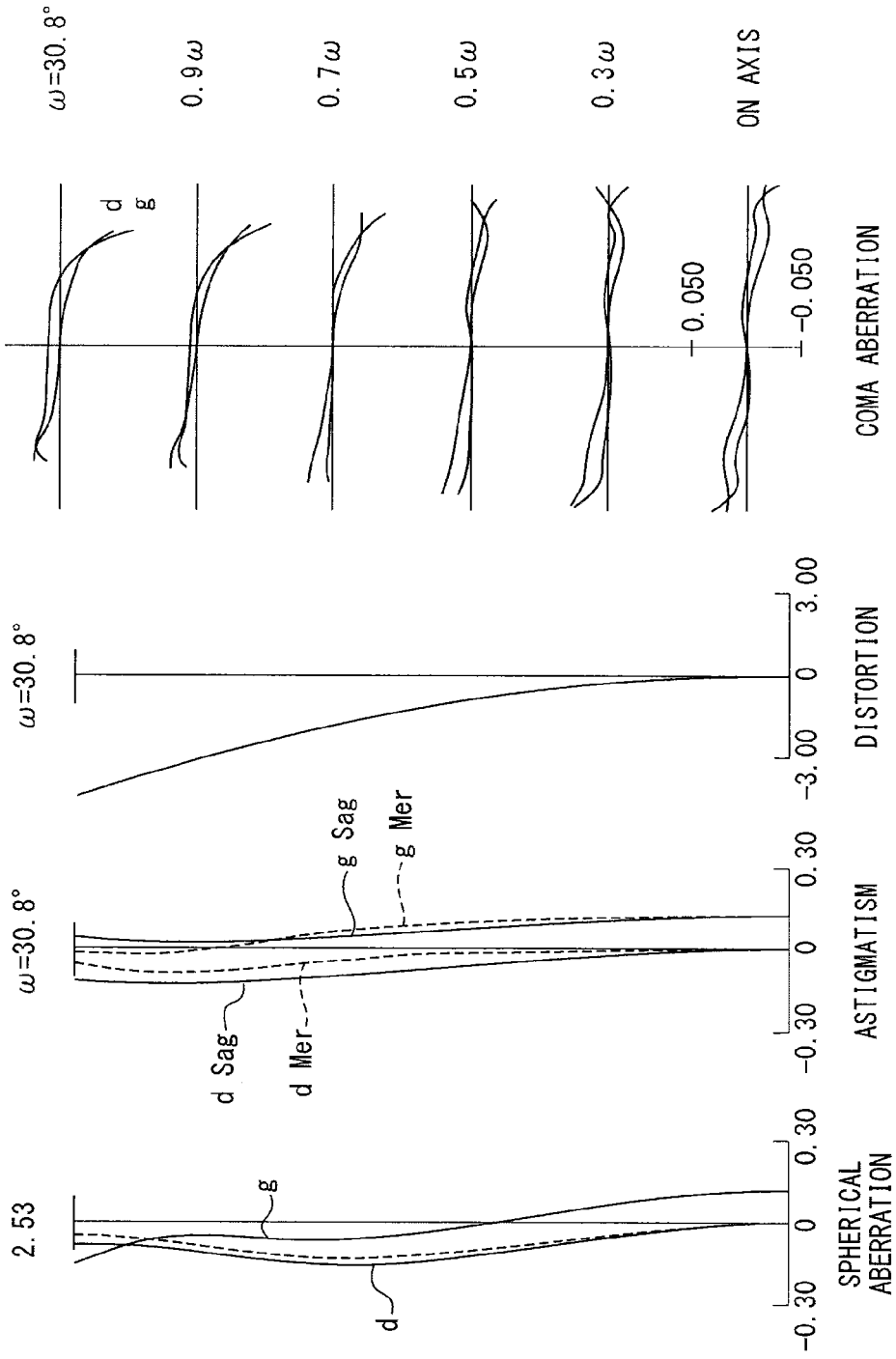
FIG. 24 illustrates aberration curves of spherical aberration, astigmatism, distortion, and coma aberration of the d and g lines when the imaging lens according to Example 8 is focused at the imaging magnification ratio of about one-twentieth (imaging distance is nearly equal to 500 mm).
Figure 25:
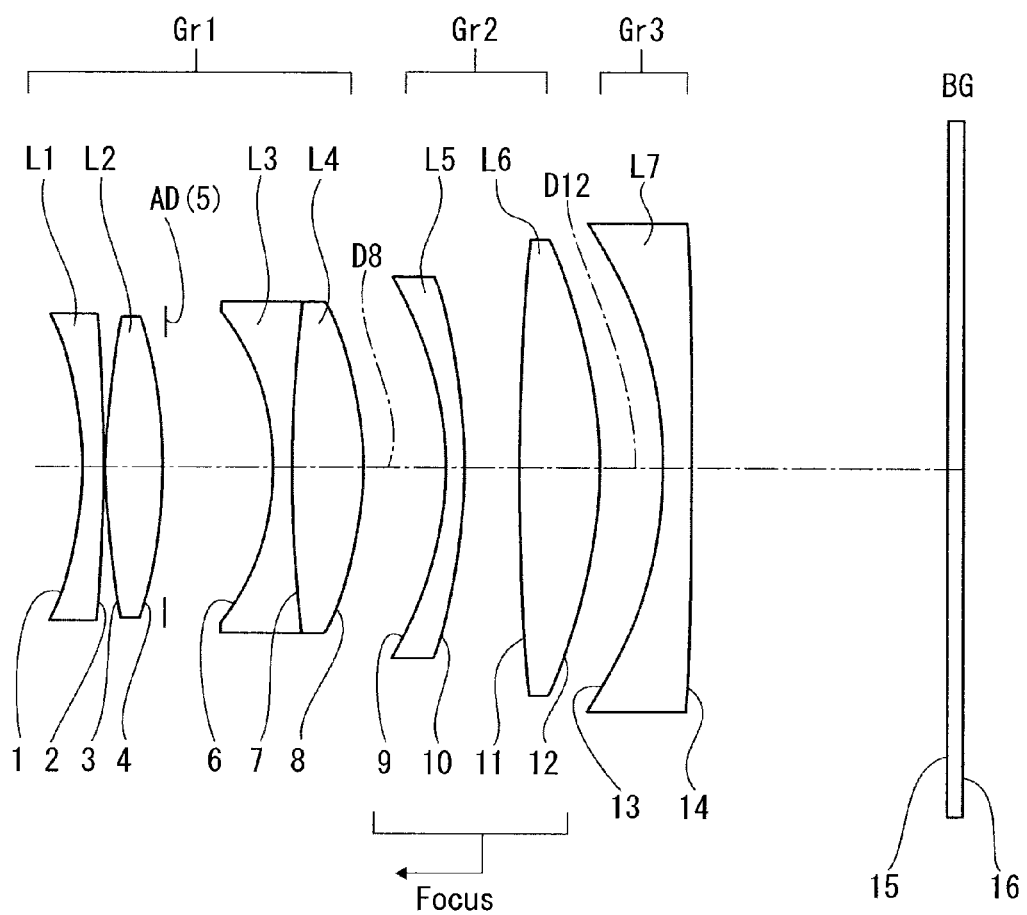
FIG. 25 is a cross-sectional view along an optical axis which illustrates a configuration of an optical system of an imaging lens according to Example 9 of a ninth embodiment of the present invention.
Figure 26:
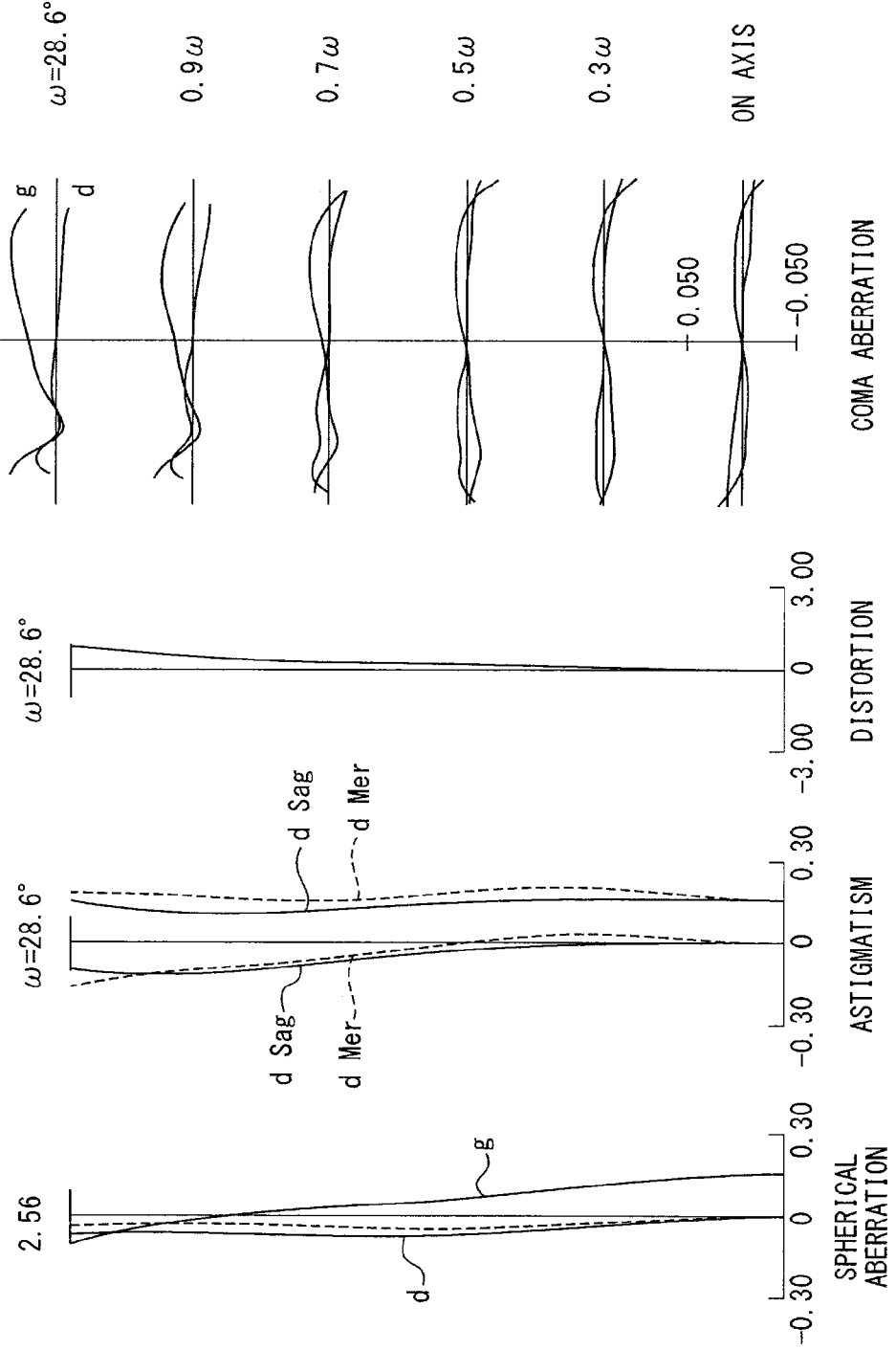
FIG. 26 illustrates aberration curves of spherical aberration, astigmatism, distortion, and coma aberration of the d and g lines when the imaging lens according to Example 9 of the present invention illustrated in FIG. 25 is focused on an infinite object.
Figure 27:
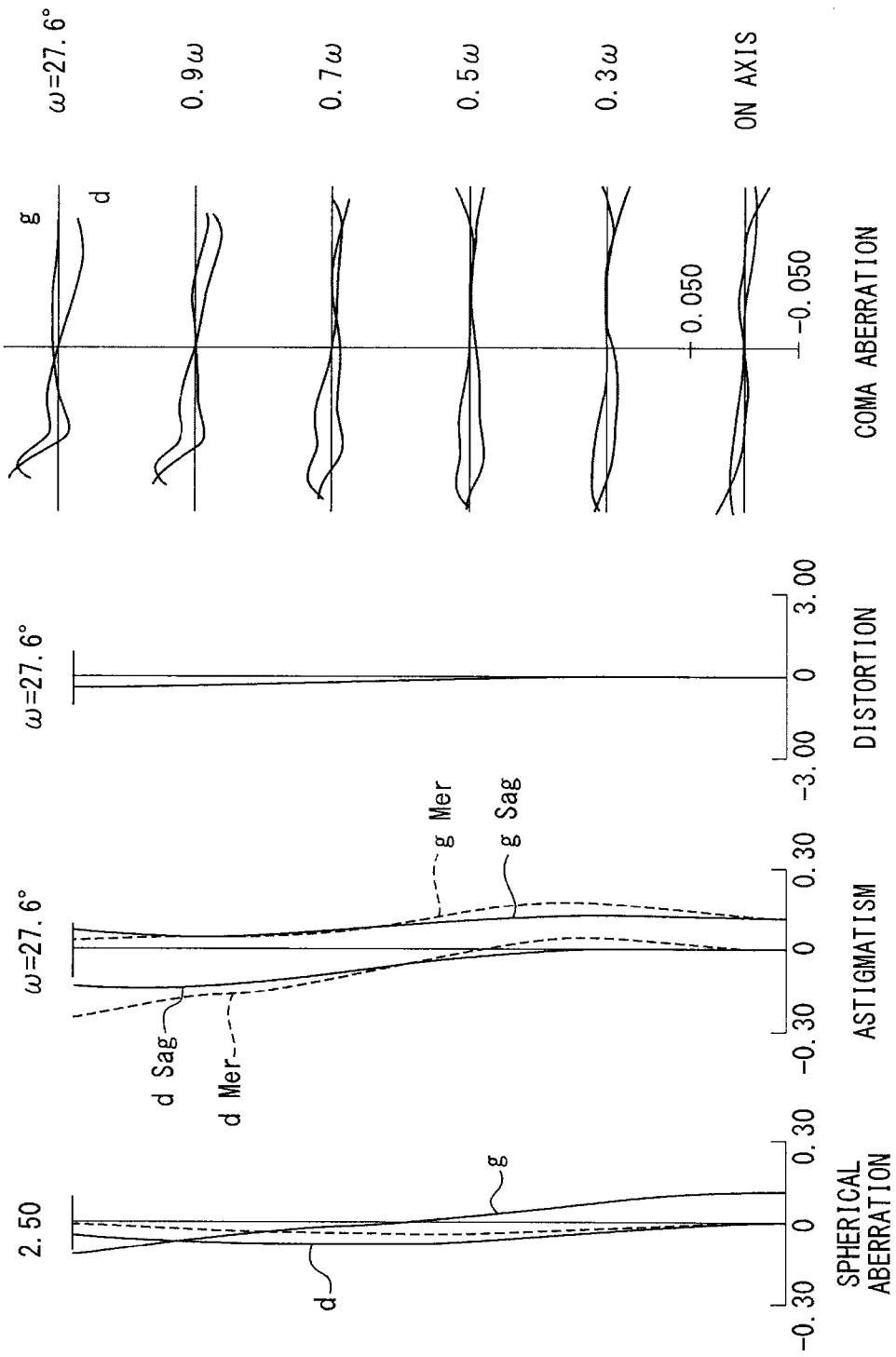
FIG. 27 illustrates aberration curves of spherical aberration, astigmatism, distortion, and coma aberration of the d and g lines when the imaging lens according to Example 9 of the present invention illustrated in FIG. 25 is focused at the imaging magnification ratio of about one-twentieth (imaging distance is nearly equal to 500 mm).
Figure 28:
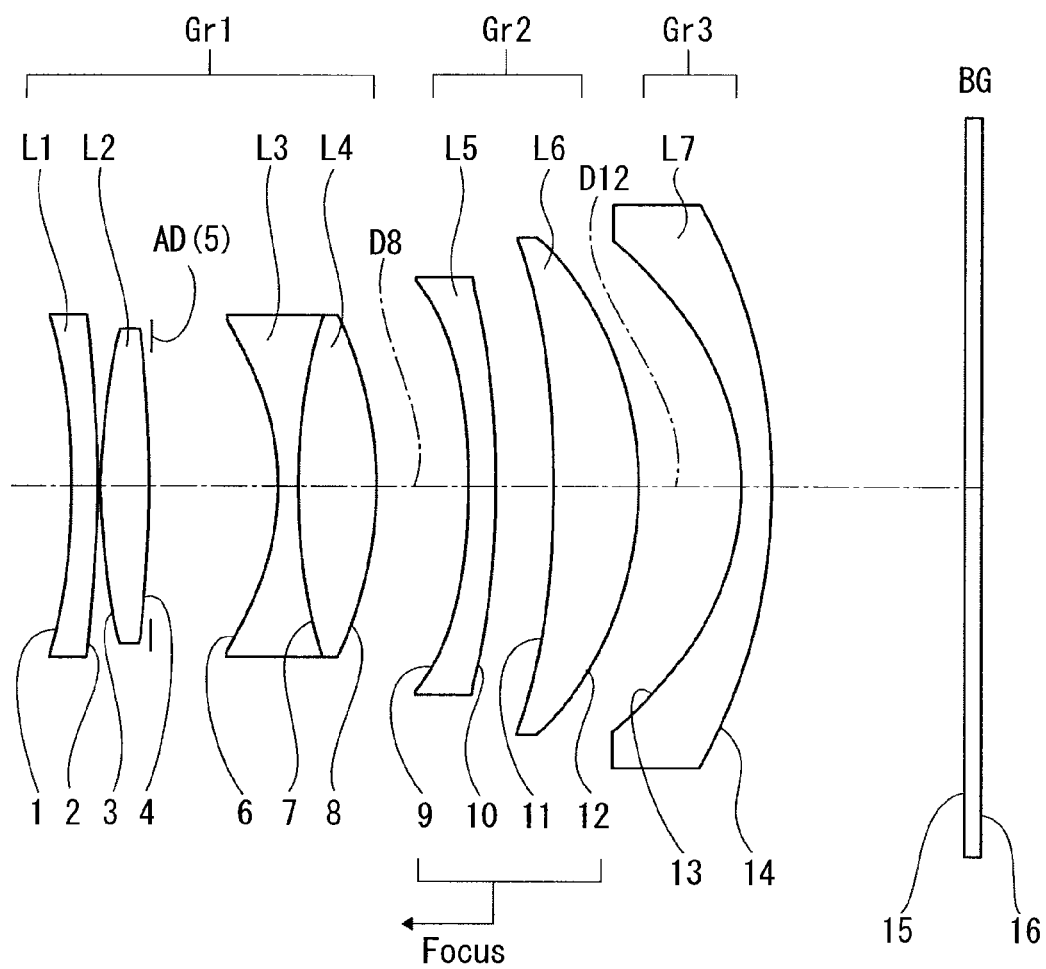
FIG. 28 is a cross-sectional view along an optical axis which illustrates a configuration of an optical system of an imaging lens according to Example 10 of a tenth embodiment of the present invention.
Figure 29:
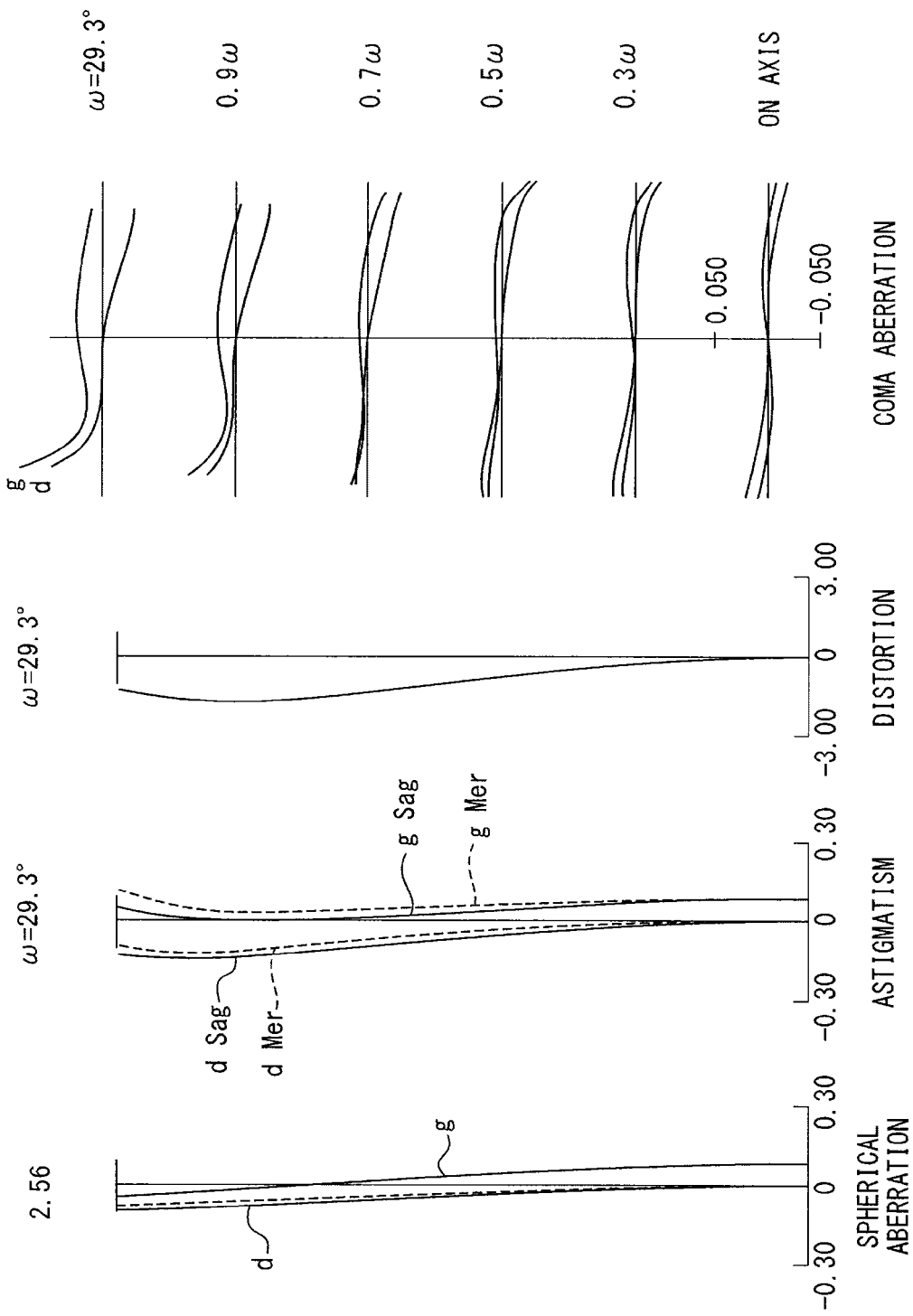
FIG. 29 illustrates aberration curves of spherical aberration, astigmatism, distortion, and coma aberration of the d and g lines when the imaging lens according to Example 10 of the present invention illustrated in FIG. 28 is focused on an infinite object.
Figure 30:
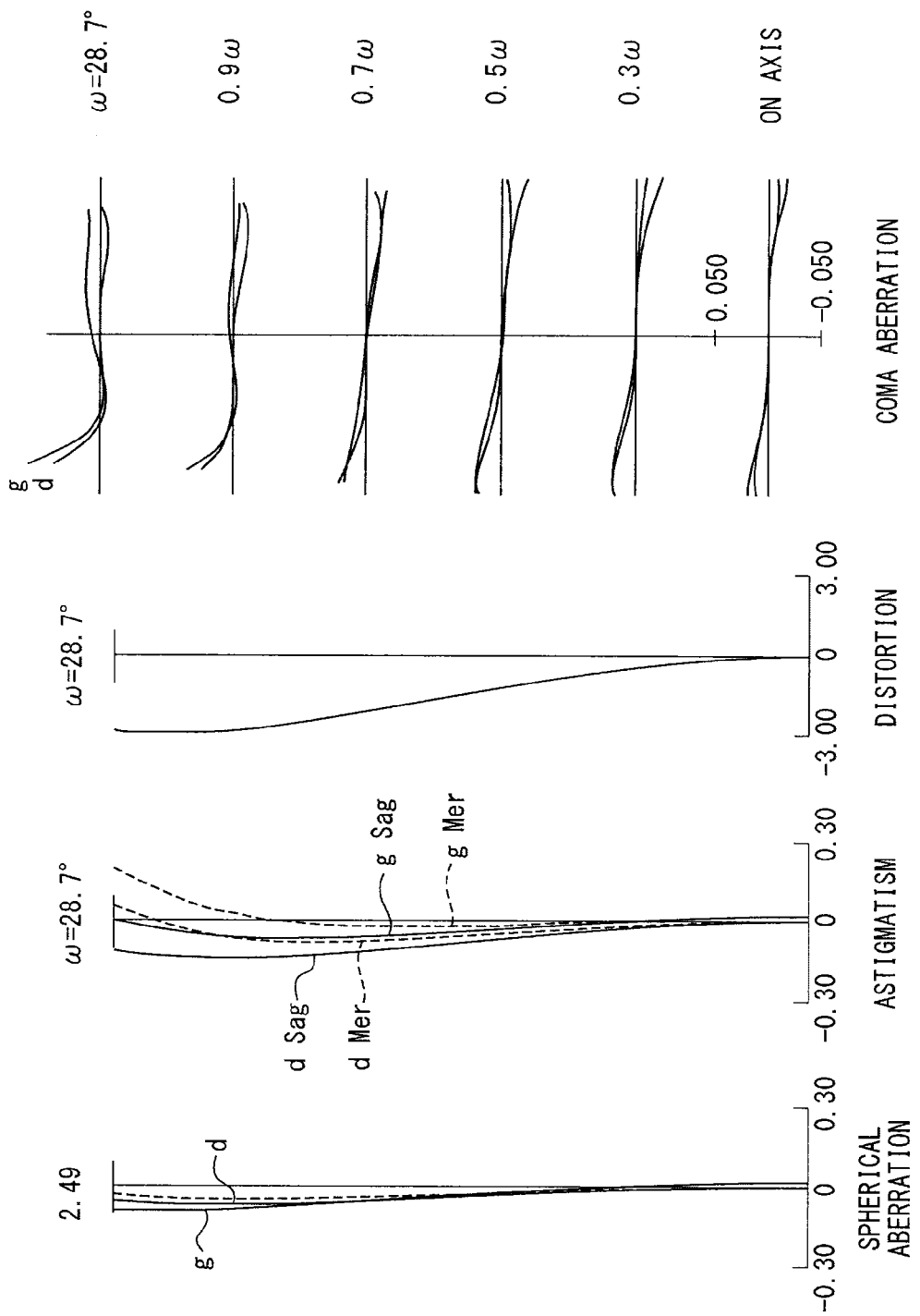
FIG. 30 illustrates aberration curves of spherical aberration, astigmatism, distortion, and coma aberration of the d and g lines when the imaging lens according to Example 10 of the present invention illustrated in FIG. 28 is focused at the imaging magnification ratio of about one-twentieth (imaging distance is nearly equal to 500 mm).

FIGS. 16-18 illustrate an imaging lens according to Example 6 of the sixth embodiment of the present invention. FIGS. 19-21 illustrate an imaging lens according to Example 7 of the seventh embodiment of the present invention. FIGS. 22-24 illustrate an imaging lens according to Example 8 of the eighth embodiment of the present invention. FIGS. 25-27 illustrate an imaging lens according to Example 9 of the ninth embodiment of the present invention. FIGS. 28-30 illustrate an imaging lens according to Example 10 of the tenth embodiment of the present invention.

The aberration of each imaging lens according to Examples 1-10 is corrected at a high level and similarly spherical aberration, astigmatism, field curvature and magnification color aberration are corrected sufficiently. It is obvious from Examples 1-10 that the imaging lens is capable of having a half viewing angle of 29 to 33 degrees, a large diameter such as an F number of F2.5 and a favorable imaging function with the configuration according to the present invention.

The common numerals and characters in Examples 1-10 are shown as follows.
f: Focal length of entire optical system
F: F number
R: Curvature radius (Paraxial curvature radius with regards to aspheric surface)
D: Distance of Surfaces
Nd: Refractive index
vd: Abbe number
SD: Shutter space [mm]
ω: Half viewing angle [degree]

In Examples 1-10, several lens surfaces are aspheric. In order to form an aspheric surface, there are two configurations. One of them is that the each lens surface is directly made to be an aspheric surface such as a so-called molded aspheric lens. The other is therefore that the aspheric surface is obtained by laying a thin-film resin on the lens surface of the spherical lens to form thereon the aspheric surface such as a so-called hybrid aspheric lens. Both of them can be applied herein. Regarding such an aspheric shape, the displacement X in the optical axis direction in the position of the height H from the optical axis when the apex of the surface is a standard is defined by the following Condition 11 where a constant of the cone of the aspheric surface is K, coefficients of aspheric surfaces of fourth, sixth, eighth, tenth, twelfth, . . . , eighteenth order are $A_4$, $A_6$, $A_8$, $A_{10}$, $A_{12}$, $A_{14}$, $A_{16}$, $A_{18}$, . . . , and an inverse of the paraxial curvature radius R is C.

$$X = \frac{CH^2}{1 + \sqrt{\{1 - (1+K)C^2H^2\}}} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18} \quad (11)$$

FIG. 1 illustrates a longitudinal section of the lens configuration of the optical system of the imaging lens according to Example 1 of the present invention when focusing on infinity (a photographing distance is set to be infinity).

That is, the optical system of the imaging lens according to the first embodiment and also Example 1 of the present invention includes, as shown in FIG. 1, from an object side to the imaging side, a first lens L1, a second lens L2, an aperture stop (otherwise, an optical stop) AD, a third lens L3, a fourth lens L4, a fifth lens L5, a sixth lens L6 and a seventh lens L7 in order. The third lens L3 and the fourth lens L4 are cemented, and the fifth lens and the sixth lens are also cemented, therefore the optical system has a configuration of five groups of seven lenses.

Regarding the configuration of the lens group, the first lens group Gr1 having a positive refractive power includes the first lens L1 to the fourth lens L4, the second lens group Gr2 having a positive refractive power includes the fifth lens L5 and the sixth lens L6, and the third lens group Gr3 having a negative refractive power includes the seventh lens L7. That is, an optical system of the imaging lens as shown in FIG. 1 has the first lens group Gr1 including an aperture stop in the middle part, the second lens group Gr2 and the third lens group Gr3 from the object side to the imaging side in order.

In detail, the first lens group Gr1 includes, from the object side to the imaging side: the first lens L1 of the negative meniscus lens having an aspheric surface and a convex surface on the object side; the second lens L2 of the positive meniscus lens having a convex surface on the object side; the third lens L3 of the positive meniscus lens having a convex surface on the imaging side; and the fourth lens L4 of the negative meniscus lens having a concave surface on the object surface, in order. The first lens group Gr1 has a positive refractive power. The third and fourth lenses in the first lens group Gr1 are closely cemented and form a cemented lens having two lenses.

Herein, the aperture stop AD is provided between the second lens L2 and the third lens L3 in the first lens group Gr1.

The second lens group Gr2 includes, from the object side to the imaging side: the fifth lens L5 of the biconcave negative lens having a curvature on the object side which is larger than that on the imaging side; and the sixth lens L6 of the biconvex positive lens having an aspheric surface on the imaging side and a curvature on the imaging side which is larger than that on the object side, in order. The second lens group Gr2 has a positive refractive power. The fifth lens L5 and the sixth lens L6 are closely cemented and form a cemented lens having two lenses.

The third lens group Gr3 has a negative refractive power and includes only the seventh lens L7 of the biconcave negative lens having a curvature on the object side which is larger than that on the imaging side.

In addition, a back insertion glass BG is inserted behind these first lens group Gr1, second lens group Gr2, and third lens group Gr3, namely, on the imaging side.

The imaging optical system as a so-called digital still camera using a solid-state imaging element such as a CCD (charge-coupled device) or a CMOS (complementary metal-oxide-semiconductor) includes at least one of a back insertion glass, a low-pass filter, an infrared cut glass, and a cover glass protecting the light-receiving surface of the solid-state imaging element. In the present example, the above-described back insertion glass BG is provided as a representative example and shown as a parallel flat surface plate. Similarly, in Examples 2 to 10, the back insertion glass BG is provided as a parallel flat surface plate, but it represents an example of at least one of a back insertion glass, a low-pass filter, an infrared cut glass, a cover glass, and so on.

The first lens group Gr1 including the aperture stop AD, the second lens group Gr2, and the third lens group Gr3 are just about supported integrally by an appropriate supporting frame at least for a while being used, except that the second lens group Gr2 is used as a focusing lens. Namely, when focusing on the object at the limited distance from the photographing distance infinity, a focusing is performed by moving the second lens group Gr2 which includes the fifth lens L5 and the sixth lens L6 from the imaging side to the object side along with an optical axis, as a focusing lens.

In FIG. 1, each surface number of each optical surface in the optical system of the imaging lens is indicated. Each reference number in FIG. 1 is applied per each example in order to avoid a complex description caused by the increase of the number of digits of the reference number. Therefore, if the common reference number is used in FIGS. 4, 7, 10, 13, 16, 19, 22, 25, 28, and so on, it does not always describe the same configuration as Examples corresponding to those.

In Example 1, a focal length of the entire system f, an open F number F, and a half viewing angle ω[°] are f=22.9 [mm], F=2.57 (F2.57), and ω=32.9[°], respectively. Optical property of a curvature radius (paraxial curvature radius with regards to the aspheric surface) R, distance of surfaces D of the adjacent surfaces, refractive index Nd, abbe number vd, and so on, of the optical surfaces of each optical element according to Example 1 are shown in the following Table 1.

TABLE 1

OPTICAL PROPERTY

| SURFACE NUMBER | R | D | Nd | vd | REMARKS | |
|---|---|---|---|---|---|---|
| 1* | 50.000 | 1.00 | 1.5163 | 64.06 | L1 | Gr1 |
| 2 | 16.016 | 0.10 | | | | |
| 3 | 12.087 | 1.50 | 1.90366 | 31.32 | L2 | |
| 4 | 19.4401 | 0.61 | | | | |
| 5 | INF | 3.35 | | | AD | |
| 6 | −180.049 | 3.02 | 1.8830 | 40.8 | L3 | |
| 7 | −7.822 | 0.80 | 1.92286 | 20.88 | L4 | |
| 8 | −17.146 | D8 | | | | |
| 9 | −12.171 | 0.80 | 1.61293 | 36.96 | L5 | Gr2 |
| 10 | 19.617 | 4.98 | 1.8514 | 40.1 | L6 | |
| 11* | −13.785 | D11 | | | | |
| 12 | −19.2046 | 1.20 | 1.4875 | 70.45 | L7 | Gr3 |
| 13 | 38.4397 | 9.53 | | | | |
| 14 | INF | 1.3 | 1.5168 | 64.2 | BG | |
| 15 | INF | — | | | | |

In Table 1, a lens surface having the surface number with [* asterisk] is aspheric. [INF] represents infinity (∞). These are also applied to other Examples 2-10.

That is, the first surface of the optical surface on the object side of the first lens L1 indicated with [*] and the eleventh surface of the optical surface on the imaging side of the sixth lens L6 have aspheric surfaces respectively. An aspheric surface coefficient (aspheric surface parameter) of Condition 11 is as shown in the following Table 2. Herein, [En] in aspheric surface coefficient indicates an exponent of ten, that is, [×10$^n$]. For example, [E−05] indicates [×10$^{-5}$]. This is also applied to the other Examples.

TABLE 2

ASPHERIC SURFACE COEFFICIENT

| | SURFACE NUMBER | |
|---|---|---|
| COEFFICIENT | 1 | 11 |
| K | 0 | 1.06147 |
| C4 | −8.2634E−05 | 1.2882E−04 |
| C6 | −2.3878E−06 | −3.0284E−07 |
| C8 | 6.8109E−08 | 3.6928E−08 |
| C10 | −9.4678E−10 | −5.2978E−10 |
| C12 | 0.0000E+00 | 4.0709E−12 |

In Example 1, because the second lens group Gr2 of the cemented lens of the fifth lens L5 and the sixth lens L6 is moved as the focusing lens when focusing, a variable distance D8 between the fourth lens L4 in the first lens group Gr1 and the fifth lens L5 in the second lens group Gr2, and a variable distance D11 between the sixth lens L6 of the second lens group Gr2 and the seventh lens L7 in the third lens group Gr3 will change as shown in the following Table 3, when the imaging magnification is changed, so that the object distance becomes infinity (INF) and the imaging magnification becomes 1/20 (photographing distance≈500 mm).

TABLE 3

| | VARIABLE DISTANCE | |
|---|---|---|
| | D8 | D11 |
| INF | 3.18 | 3.00 |
| 1/20 | 1.99 | 4.19 |

The values corresponding to the above-described Conditional Expressions 1 to 10 in Example 1 are as shown in the following Table 4, except that the values in Conditional Expressions 2 and 5 are calculated as the imaging magnification β=1/20.

TABLE 4

| VALUE IN CONDITIONAL EXPRESSION | | |
|---|---|---|
| [1] | L/Y' | 2.44 |
| [2] | |(AX1 − AX2)/β| | 0.51 |
| [3] | f2/f | 1.38 |
| [4] | |f2n/f2p| | 1.19 |
| [5] | |ADf/β| | 24.68 |
| [6] | R2o/R2i | 0.883 |
| [7] | Nd2n ≥ 1.7 | — |
| | Nd2p ≥ 1.7 | — |
| [8] | f1/f3 | −0.79 |
| [9] | LD1/LD3 | 0.60 |
| [10] | SD > 3.0 [mm] | 3.96 |

Herein, Conditional Expression 7 is out of the applicable range for the second lens group Gr2 in the imaging lens according to Example 1 because the second lens group Gr2 is a cemented lens.

Accordingly, the values according to the above-described Conditional Expressions 1 to 10 in Example 1 are within the range of respective expressions and satisfy Conditional Expressions 1 to 10.

In addition, in FIG. 2, the aberration curves of the d and g lines, that is, each aberration curve of the spherical aberration, astigmatism, distortion and comma aberration when the imaging lens according to Example 1 focuses on the object at infinity are illustrated. In FIG. 3, the aberration curves of the d and g lines, that is, each aberration curve of the spherical aberration, astigmatism, distortion and comma aberration when the imaging lens according to Example 1 focuses on the object while its imaging magnification is about 1/20 (photographing distance≈500 mm) are illustrated.

In these aberration curves in FIGS. 2 and 3, a broken line in spherical aberration represents a sine condition, a solid line in astigmatism represents a sagittal line, and a broken line therein represents a meridional line respectively. The g and d shown in spherical aberration, astigmatism and coma aberration represent the g and d lines respectively. The above representations are also applied to the aberration curves according to the other Examples.

Example 2

FIG. 4 illustrates Example 2 of the second embodiment according the present invention and shows the longitudinal plane of the lens configuration of the optical system of the imaging lens.

That is, the optical system according to Example 2 of the present invention includes, as shown in FIG. 4, from the object side to imaging side: a first lens L1, a second lens L2, an optical aperture stop AD, a third lens L3, a fourth lens L4, a fifth lens L5, a sixth lens L6, and a seventh lens L7 in order. The third lens L3 and the fourth lens L4 are cemented, and the fifth lens and the sixth lens are also cemented, therefore the optical system has a configuration of five groups of seven lenses.

Regarding the configuration of the lens group, the first lens group Gr1 having a positive refractive power includes the first lens L1 to the fourth lens L4, the second lens group Gr2 having a positive refractive power includes the fifth lens L5 and the sixth lens L6, and the third lens group Gr3 having a negative refractive power includes the seventh lens L7. That is, an optical system of the imaging lens as shown in FIG. 4 has the first lens group Gr1 including an aperture stop AD in the middle part, the second lens group Gr2, and the third lens group Gr3 from the object side to the imaging side in order.

In detail, the first lens group Gr1 includes, from the object side to the imaging side: the first lens L1 of the biconcave negative lens having an aspheric surface and a curvature on the image side which is larger than that on the object side; the second lens L2 of the positive meniscus lens having a convex surface on the object side; the third lens L3 of the biconvex positive lens having a curvature on the imaging side which is larger than that on the object side; and the fourth lens L4 of the negative meniscus lens having a concave surface on the object side, in order. The first lens group Gr1 has a positive refractive power. The third lens L3 and the fourth lens L4 in the first lens group Gr1 are closely cemented and form a cemented lens having two lenses.

Herein, an aperture stop AD is provided between the second lens L2 and the third lens L3 in the first lens group Gr1.

The second lens group Gr2 includes, from the object side to the imaging side: the fifth lens L5 of the biconcave negative lens having a curvature on the object side which is larger than that on the imaging side; and the sixth lens L6 of the biconvex positive lens having an aspheric surface on the imaging side and a curvature on the imaging side which is larger than that on the object side, in order. The second lens group Gr2 has a positive refractive power. The fifth lens L5 and the sixth lens L6 in the second lens group Gr2 are closely cemented and form a cemented lens having two lenses.

The third lens group Gr3 has a negative refractive power and includes only the seventh lens L7 of the biconcave negative lens having a curvature on the object side which is larger than that on the imaging side.

In addition, similar to Example 1 (FIG. 1), a back insertion glass BG is inserted behind these first lens group Gr1, second lens group Gr2 and third lens group Gr3, in other words, on the imaging side.

The first lens group Gr1 including the aperture stop AD, second lens group Gr2, and third lens group Gr3 are just about supported integrally by an appropriate supporting frame at least for a while being used, except that the second lens group Gr2 is used as a focusing lens. That is, when focusing on the object at the limited distance from the imaging distance infinity, a focusing is performed by moving the second lens group Gr2 which includes the fifth lens L5 and the sixth lens L6 integrally from the imaging side to the object side along with an optical axis, as a focusing lens.

In FIG. 4, similar to Example 1 (FIG. 1), each surface number of each optical surface in the optical system of the imaging lens is indicated. Each of references in FIG. 4 is numbered per each example in order to avoid a complex description caused by the increase of the digits of the reference number. Therefore, if the common reference number is used in FIGS. 1, 7, 10, 13, 16, 19, 22, 25, 28, and so on, it does not always describe the same configuration as Examples corresponding to those.

In Example 2, a focal length of entire system f, an open F number F, and a half viewing angle ω[°] are f=24.7 [mm], F=2.57 (F2.57), and ω=31.0[°], respectively. Optical property of a curvature radius (paraxial curvature radius with regards to the aspheric surface) R, surface distance D of the adjacent surfaces, refractive index Nd, abbe number vd, and so on, of the optical surfaces of each optical element according to Example 2 are shown in the following Table 5.

TABLE 5

OPTICAL PROPERTY

| SURFACE NUMBER | R | D | Nd | vd | REMARKS | |
|---|---|---|---|---|---|---|
| 1* | −34.270 | 1.00 | 1.4971 | 81.56 | L1 | Gr1 |
| 2 | 24.097 | 0.10 | | | | |
| 3 | 15.153 | 1.76 | 1.883 | 40.8 | L2 | |
| 4 | 70.622 | 0.27 | | | | |
| 5 | INF | 4.20 | | | AD | |
| 6 | 59.291 | 3.00 | 1.8830 | 40.8 | L3 | |
| 7 | −9.030 | 0.80 | 1.92286 | 20.88 | L4 | |
| 8 | −34.011 | D8 | | | | |
| 9 | −10.522 | 0.80 | 1.51742 | 52.15 | L5 | Gr2 |
| 10 | 41.354 | 4.61 | 1.8514 | 40.1 | L6 | |
| 11* | −12.829 | D11 | | | | |
| 12 | −16.778 | 1.00 | 1.5174 | 52.15 | L7 | Gr3 |
| 13 | 109.0973 | 11.30 | | | | |
| 14 | INF | 1.30 | 1.5168 | 64.2 | BG | |
| 15 | INF | 1.5 | | | | |

Similar to Example 1 (Table 1), in Table 5, a lens surface having the surface number with [* asterisk] is aspheric. [INF] represents infinity (∞). These are also applied in other Examples 3-10.

That is, the first surface of the optical surface on the object side of the first lens L1 indicated with [*] and the eleventh surface of the optical surface on the imaging side of the sixth lens L6 have aspheric surfaces respectively. An aspheric surface coefficient (aspheric surface parameter) of Condition 11 is as shown in the following Table 6. Herein, [En] in aspheric surface coefficient indicates an exponent of ten, that is, [×10$^n$]. For example, [E−05] indicates [×10$^{-5}$]. This is also applied in the other Examples.

TABLE 6

ASPHERIC SURFACE COEFFICIENT

| | SURFACE NUMBER | |
|---|---|---|
| COEFFICIENT | 1 | 11 |
| K | 1.17804 | 0.76448 |
| C4 | −4.2298E−05 | 1.3221E−04 |
| C6 | −4.7828E−07 | −4.1223E−07 |
| C8 | 1.3274E−08 | 3.7414E−08 |
| C10 | −1.0175E−10 | −5.3095E−10 |
| C12 | 0.0000E+00 | 4.0343E−12 |

In Example 2, similar to Example 1, because the second lens group Gr2 of the cemented lens of the fifth lens L5 and the sixth lens L6 is moved as the focusing lens when focusing, a variable distance D8 between the fourth lens L4 in the first lens group Gr1 and the fifth lens L5 in the second lens group Gr2, and a variable distance D11 between the sixth lens L6 of the second lens group Gr2 and the seventh lens L7 in the third lens group Gr3 shown in Table 5 will change as shown in the following Table 7, when the imaging magnification is changed and the object distance becomes infinity (INF) and the imaging magnification becomes 1/20 (photographing distance≈500 mm).

TABLE 7

VARIABLE DISTANCE

|  | D8 | D11 |
|---|---|---|
| INF | 4.45 | 1.65 |
| 1/20 | 3.16 | 2.94 |

The values corresponding to the above-described Conditional Expressions 1 to 10 in Example 2 are as shown in the following Table 8, except that the values in Conditional Expressions 2 and 5 are calculated with the imaging magnification $\beta=1/20$.

TABLE 8

VALUE IN CONDITIONAL EXPRESSION

| [1] | L/Y' | 2.57 |
|---|---|---|
| [2] | |(AX1 − AX2)/β| | 1.45 |
| [3] | f2/f | 1.19 |
| [4] | |f2n/f2p| | 1.35 |
| [5] | |ΔDf/β| | 24.75 |
| [6] | R2o/R2i | 0.820 |
| [7] | Nd2n ≥ 1.7 | — |
|  | Nd2p ≥ 1.7 | — |
| [8] | f1/f3 | −0.78 |
| [9] | LD1/LD3 | 0.66 |
| [10] | SD > 3.0 [mm] | 4.48 |

Herein, similar to Example 1, Conditional Expression 7 is out of the applicable range for the second lens group Gr2 in the imaging lens according to Example 2 because the second group lens Gr2 is a cemented lens.

Accordingly, the values according to the above-described Conditional Expressions 1 to 10 in Example 2 are within the range of respective expressions and satisfy Conditional Expressions 1 to 10.

In addition, in FIG. 5, the aberration curves of d and g lines, namely, each aberration curve of the spherical aberration, astigmatism, distortion, and comma aberration when the imaging lens according to Example 2 focuses on the object at infinity are illustrated. In FIG. 6, the aberration curves of the d and g lines, that is, each aberration curve of the spherical aberration, astigmatism, distortion, and comma aberration when the imaging lens according to Example 2 focuses on the object while its imaging magnification is about 1/20 (photographing distance≈500 mm) are illustrated.

In these aberration curves in FIGS. 5 and 6, a broken line in spherical aberration represents a sine condition, a solid line in astigmatism represents a sagittal line, and a broken line therein represents a meridional line respectively. The g and d shown in spherical aberration, astigmatism, and coma aberration represent the g and d lines respectively. The above representations are also applied to the aberration curves according to the other Examples.

Example 3

FIG. 7 illustrates Example 3 of the third embodiment according to the present invention and shows the longitudinal plane of the lens configuration of the optical system of the imaging lens.

That is, the optical system according to Example 3 of the present invention includes, as shown in FIG. 7, from the object side to imaging side: a first lens L1, a second lens L2, an aperture stop AD, a third lens L3, a fourth lens L4, a fifth lens L5, a sixth lens L6, and a seventh lens L7, in order. The third lens L3 and the fourth lens L4 are cemented as a cemented lens, and the fifth lens L5 and the sixth lens L6 are also cemented as a cemented lens: therefore the optical system has a configuration of five groups of seven lenses.

Regarding the configuration of the lens group, the first lens group Gr1 having a positive refractive power includes the first lens L1 to the fourth lens L4, the second lens group Gr2 having a positive refractive power includes the fifth lens L5 and the sixth lens L6, and the third lens group Gr3 having a negative refractive power includes the seventh lens L7. That is, an optical system of the imaging lens as shown in FIG. 7 has the first lens group Gr1 including an aperture stop AD in the middle part, the second lens group Gr2 and the third lens group Gr3 from the object side to the imaging side in order.

In detail, the first lens group Gr1 includes, from the object side to the imaging side: the first lens L1 of the biconcave negative lens having a curvature on the imaging side which is larger than that on the object side; the second lens L2 of the biconvex positive lens having an aspheric surface and a curvature on the object side which is larger than that on the imaging side; the third lens L3 of the biconvex positive lens having a curvature on the imaging side which is larger than that on the object side; and the fourth lens L4 of the biconcave negative lens having a curvature on the object side which is larger than that on the imaging side, in order. The first lens group Gr1 has a positive refractive power. The third lens L3 and the fourth lens L4 in the first lens group Gr1 are closely cemented and form a cemented lens having two lenses.

Herein, an aperture stop AD is provided between the second lens L2 and the third lens L3 in the first lens group Gr1.

The second lens group Gr2 includes, from the object side to the imaging side: the fifth lens L5 of the biconcave negative lens having a curvature on the object side which is larger than that on the imaging side; and the sixth lens L6 of the biconvex positive lens having an aspheric surface and a curvature on the imaging side which is larger than that on the object side, in order. The second lens group Gr2 has a positive refractive power. The fifth lens L5 and the sixth lens L6 in the second lens group Gr2 are closely cemented and form a cemented lens having two lenses.

The third lens group Gr3 has a negative refractive power and includes only the seventh lens L7 of the negative meniscus lens having a convex surface on the imaging side.

In addition, similar to Examples 1 and 2 (FIGS. 1 and 4), a back insertion glass BG is inserted behind these first lens group Gr1, second lens group Gr2 and third lens group Gr3, in other words, on the imaging side.

The first lens group Gr1 including the aperture stop AD, second lens group Gr2 and third lens group Gr3 are just about supported integrally by an appropriate supporting frame at least for a while being used, except that the second lens group Gr2 is used as a focusing lens. That is, when focusing on the object at the limited distance from the imaging distance infinity, a focusing is performed by integrally moving the second lens group Gr2 which includes the fifth lens L5 and the sixth lens L6 from the imaging side to the object side along with an optical axis, as a focusing lens.

In FIG. 7, similar to Examples 1 and 2 (FIGS. 1 and 4), each surface number of each optical surface in the optical system of the imaging lens is indicated. Each of reference numbers in FIG. 7 is represented independently per each example in order to avoid a complex description caused by the increase of the digits of the reference number. Therefore, if the common reference number is used in FIGS. 1, 4, 10, 13, 16, 19, 22, 25, 28, and so on, it does not always describe the same configuration as Examples corresponding to those.

In Example 3, a focal length of entire system f, open F number F and half viewing angle ω[°] are f=24.9 [mm], F=2.56, and ω=30.5[°], respectively. Optical property of a curvature radius (paraxial curvature radius with regards to aspheric surface) R, surface distance D of the adjacent surfaces, refractive index Nd, abbe number vd, and so on, of the optical surfaces of each optical element according to Example 3 are shown in the following Table 9.

TABLE 9

OPTICAL PROPERTY

| SURFACE NUMBER | R | D | Nd | vd | REMARKS | |
|---|---|---|---|---|---|---|
| 1 | −39.623 | 0.80 | 1.6727 | 32.17 | L1 | Gr1 |
| 2 | 15.353 | 0.10 | | | | |
| 3* | 13.473 | 2.22 | 1.85135 | 40.1 | L2 | |
| 4 | −101.479 | 0.10 | | | | |
| 5 | INF | 4.20 | | | AD | |
| 6 | 56.606 | 3.05 | 1.8830 | 40.8 | L3 | |
| 7 | −9.770 | 0.80 | 1.6398 | 34.57 | L4 | |
| 8 | 880.538 | D8 | | | | |
| 9 | −15.020 | 0.80 | 1.64769 | 33.84 | L5 | Gr2 |
| 10 | 18.672 | 4.94 | 1.8514 | 40.1 | L6 | |
| 11* | −15.542 | D11 | | | | |
| 12 | −14.554 | 1.00 | 1.6889 | 31.16 | L7 | Gr3 |
| 13 | −55.7805 | 11.12 | | | | |
| 14 | INF | 1.30 | 1.5168 | 64.2 | BG | |
| 15 | INF | — | | | | |

Similar to Examples 1 and 2 (Tables 1 and 5), in Table 9, a lens surface having the surface number with [* asterisk] is aspheric. [INF] represents infinity (∞). These are also applied to other Examples 4-10.

That is, the third surface of the optical surface on the object side of the second lens L2 indicated with [*] and the eleventh surface of the optical surface on the imaging side of the sixth lens L6 have aspheric surfaces respectively. An aspheric surface coefficient (aspheric surface parameter) of Condition 11 is as shown in the following Table 10. Herein, similar to Examples 1 and 2 (Tables 2 and 6), [En] in the aspheric surface coefficient represents an exponent of ten, that is, [×10$^n$]. For example, [E−05] indicates [×10$^{-5}$]. This is also applied to the other Examples.

TABLE 10

ASPHERIC SURFACE COEFFICIENT

| | SURFACE NUMBER | |
|---|---|---|
| COEFFICIENT | 3 | 11 |
| K | −0.7723 | 0.88307 |
| C4 | −3.6748E−05 | 9.9594E−05 |
| C6 | −3.4508E−07 | −1.6830E−07 |
| C8 | −5.0037E−11 | 2.4692E−08 |
| C10 | −3.4626E−11 | −4.8304E−10 |
| C12 | 0.0000E+00 | 5.0103E−12 |

TABLE 10-continued

ASPHERIC SURFACE COEFFICIENT

| | SURFACE NUMBER | |
|---|---|---|
| COEFFICIENT | 3 | 11 |
| C14 | 0.0000E+00 | −7.8821E−15 |
| C16 | 0.0000E+00 | −3.1039E−16 |
| C18 | 0.0000E+00 | 2.2400E−18 |

In Example 3, similar to Examples 1 and 2, because the second lens group Gr2 of the cemented lens of the fifth lens L5 and the sixth lens L6 is moved as the focusing lens when focusing, a variable distance D8 between the fourth lens L4 in the first lens group Gr1 and the fifth lens L5 in the second lens group Gr2, and a variable distance D11 between the sixth lens L6 of the second lens group Gr2 and the seventh lens L7 in the third lens group Gr3 shown in Table 9 will change as shown in the following Table 11, when the object distance is changed to infinity (INF) and the imaging magnification becomes 1/20 (photographing distance≈500 mm) in accordance with change in the imaging magnification.

TABLE 11

VARIABLE DISTANCE

| | D8 | D11 |
|---|---|---|
| INF | 4.98 | 0.8 |
| 1/20 | 3.30 | 2.48 |

The values corresponding to the above-described Conditional Expressions 1 to 10 in Example 3 are as shown in the following Table 12, except that the values in Conditional Expressions 2 and 5 are calculated with the imaging magnification β=1/20.

TABLE 12

VALUE IN CONDITIONAL EXPRESSION

| [1] | L/Y' | 2.57 |
|---|---|---|
| [2] | \|(AX1 − AX2)/β\| | 0.52 |
| [3] | f2/f | 1.40 |
| [4] | \|f2n/f2p\| | 1.19 |
| [5] | \|ΔDf/β\| | 32.24 |
| [6] | R2o/R2i | 0.97 |
| [7] | Nd2n ≥ 1.7 | — |
| | Nd2p ≥ 1.7 | — |
| [8] | f1/f3 | −0.71 |
| [9] | LD1/LD3 | 0.68 |
| [10] | SD > 3.0 [mm] | 4.30 |

Herein, similar to Examples 1 and 2, Conditional Expression 7 is out of the applicable range for the second lens group Gr2 in the imaging lens according to Example 3 because the second group lens Gr2 is a cemented lens.

Accordingly, the values according to the above-described Conditional Expressions 1 to 10 in Example 3 are within the range of respective expressions and satisfy Conditional Expressions 1 to 10.

In addition, in FIG. 8, the aberration curves of d and g lines, namely, each aberration curve of spherical aberration, astigmatism, distortion and comma aberration when the imaging lens according to Example 3 focuses on the object at infinity are illustrated. In FIG. 9, the aberration curves of the d and g lines, that is, each aberration curve of the spherical aberration, astigmatism, distortion and comma aberration when the imaging lens according to Example 3 focuses on the object at infinity while its imaging magnification is about 1/20 (photographing distance≈500 mm) are illustrated.

In these aberration curves in FIGS. 8 and 9, a broken line in spherical aberration represents a sine condition, a solid line in astigmatism represents a sagittal line, and a broken line therein represents a meridional line respectively. The g and d shown in spherical aberration, astigmatism and coma aberration represent the g and d lines respectively. The above representations are also applied to the aberration curves according to the other Examples.

Example 4

FIG. 10 illustrates Example 6 of the fourth embodiment according to the present invention and shows the longitudinal plane of the lens configuration of the optical system of the imaging lens.

That is, the optical system according to Example 4 of the present invention includes, as shown in FIG. 10, from the object side to imaging side: a first lens L1, a second lens L2, a third lens L3, an aperture stop AD, a fourth lens L4, a fifth lens L5, a sixth lens L6 and a seventh lens L7, in order. The second lens L2 and the third lens L3 are cemented as a cemented lens, and the fifth lens and the sixth lens are also cemented as a cemented lens, therefore the optical system has a configuration of five groups of seven lenses.

Regarding the configuration of the lens group, the first lens group Gr1 having a positive refractive power includes from the first lens L1 to the fourth lens L4, the second lens group Gr2 having a positive refractive power includes the fifth lens L5 and the sixth lens L6, and the third lens group Gr3 having a negative refractive power includes the seventh lens L7. That is, an optical system of the imaging lens as shown in FIG. 10 has the first lens group Gr1 including the aperture stop AD in the middle part, the second lens group Gr2 and the third lens group Gr3 from the object side to the imaging side in order.

In detail, the first lens group Gr1 includes, from the object side to the imaging side: the first lens L1 of the negative meniscus lens having an aspheric surface on the imaging side and a convex surface on the object side; the second lens L2 of the biconcave negative lens having a curvature on the imaging side which is larger than that on the object side; the third lens L3 of the positive meniscus lens having a convex surface on the object side; and the fourth lens L4 of the positive meniscus lens having a convex surface on the imaging side, in order. The first lens group Gr1 has a positive refractive power. The second lens L2 and the third lens L3 in the first lens group Gr1 are closely cemented and form a cemented lens having two lenses.

Herein, the aperture stop AD is provided between the third lens L3 and the fourth lens L4 in the first lens group Gr1.

The second lens group Gr2 includes, from the object side to the imaging side: the fifth lens L5 of the biconcave negative lens having a curvature on the object side which is larger than that on the imaging side; and the sixth lens L6 of the biconvex positive lens having an aspheric surface and a curvature on the imaging side which is larger than that on the object side, in order. The second lens group Gr2 has a positive refractive power. The fifth lens L5 and the sixth lens L6 in the second lens group Gr2 are closely cemented and form a cemented lens having two lenses.

The third lens group Gr3 has a negative refractive power and includes only the seventh lens L7 of the biconcave negative lens having a curvature on the object side which is larger than that on the imaging side.

In addition, similar to Examples 1-3, a back insertion glass BG is inserted behind these first lens group Gr1, second lens group Gr2 and third lens group Gr3, in other words, on the imaging side.

The first lens group Gr1 including the aperture stop AD, second lens group Gr2 and third lens group Gr3 are just about supported integrally by an appropriate supporting frame at least for a while being used, except that the second lens group Gr2 is used as a focusing lens. That is, when focusing on the object at the limited distance from the imaging distance infinity, a focusing is performed by moving the second lens group Gr2 which includes the fifth lens L5 and the sixth lens L6 integrally from the imaging side to the object side along with an optical axis, as a focusing lens.

In FIG. 10, similar to Examples 1-3 (FIGS. 1, 4 and 7), each surface number of each optical surface in the optical system of the imaging lens is indicated.

In Example 4, a focal length of entire system f, open F number F, and half viewing angle ω[°] are f=22.9 [mm], F=2.56, and ω=32.9[°], respectively. Optical property of a curvature radius (paraxial curvature radius with regards to aspheric surface) R, surface distance D of the adjacent surfaces, refractive index Nd, abbe number vd, and so on, of the optical surfaces of each optical element according to Example 4 are shown in the following Table 13.

TABLE 13

OPTICAL PROPERTY

| SURFACE NUMBER | R | D | Nd | vd | REMARKS | |
|---|---|---|---|---|---|---|
| 1 | 33.551 | 1.20 | 1.8212 | 24.06 | L1 | Gr1 |
| 2* | 24.242 | 0.99 | | | | |
| 3 | −113.358 | 0.80 | 1.62004 | 36.3 | L2 | |
| 4 | 8.0797 | 2.51 | 1.883 | 40.8 | L3 | |
| 5 | 148.035 | 0.17 | | | | |
| 6 | INF | 3.00 | | | AD | |
| 7 | −111.097 | 1.72 | 1.883 | 40.8 | L4 | |
| 8 | −15.312 | D8 | | | | |
| 9 | −11.615 | 0.80 | 1.64769 | 33.84 | L5 | Gr2 |
| 10 | 13.924 | 4.08 | 1.8514 | 40.1 | L6 | |
| 11* | −12.267 | D11 | | | | |
| 12 | −16.7497 | 0.80 | 1.6727 | 32.17 | L7 | Gr3 |
| 13 | 75.9543 | 13.93 | | | | |
| 14 | INF | 1.3 | 1.5168 | 64.2 | BG | |
| 15 | INF | 1.5 | | | | |

Similar to Examples 1-3 (Tables 1, 5 and 9), in Table 13, a lens surface having the surface number with [* asterisk] is aspheric. [INF] represents infinity (∞). These are also applied to other Examples 5-10.

That is, the second surface of the optical surface on the imaging side of the first lens L1 indicated with [*] and the eleventh surface of the optical surface on the imaging side of the sixth lens L6 have aspheric surfaces respectively. An aspheric surface coefficient (aspheric surface parameter) of Condition 11 is as shown in the following Table 14.

TABLE 14

ASPHERIC SURFACE COEFFICIENT

| | SURFACE NUMBER | |
|---|---|---|
| COEFFICIENT | 2 | 11 |
| K | −0.01458 | 1.54058 |
| C4 | 8.9967E−05 | 2.2375E−04 |
| C6 | 3.6574E−06 | 7.8071E−07 |
| C8 | −9.4392E−08 | 8.3773E−08 |

TABLE 14-continued

ASPHERIC SURFACE COEFFICIENT

| COEFFICIENT | SURFACE NUMBER | |
|---|---|---|
| | 2 | 11 |
| C10 | 2.0252E−09 | −1.9241E−09 |
| C12 | 0.0000E+00 | 2.9234E−11 |

In Example 4, similar to Examples 1-3, because the second lens group Gr2 of the cemented lens of the fifth lens L5 and the sixth lens L6 is moved as the focusing lens when focusing, a variable distance D8 between the fourth lens L4 in the first lens group Gr1 and the fifth lens L5 in the second lens group Gr2, and a variable distance D11 between the sixth lens L6 of the second lens group Gr2 and the seventh lens L7 in the third lens group Gr3 shown in Table 13 change as shown in the following Table 15, when the object distance is changed to infinity (INF) and the imaging magnification of 1/20 (photographing distance≈500 mm) in accordance with change in the imaging magnification.

TABLE 15

| VARIABLE DISTANCE | | |
|---|---|---|
| | D8 | D11 |
| INF | 2.03 | 0.80 |
| 1/20 | 1.31 | 1.52 |

The values corresponding to the above-described Conditional Expressions 1 to 10 in Example 4 are as shown in the following Table 16, except that the values in Conditional Expressions 2 and 5 are calculated with the imaging magnification β=1/20.

TABLE 16

| VALUE IN CONDITIONAL EXPRESSION | | |
|---|---|---|
| [1] | L/Y' | 2.41 |
| [2] | |(AX1 − AX2)/β| | 0.38 |
| [3] | f2/f | 1.19 |
| [4] | |f2n/f2p| | 1.17 |
| [5] | |ΔDf/β| | 14.68 |
| [6] | R2o/R2i | 0.95 |
| [7] | Nd2n ≥ 1.7 | — |
| | Nd2p ≥ 1.7 | — |
| [8] | f1/f3 | −0.84 |
| [9] | LD1/LD3 | 0.77 |
| [10] | SD > 3.0 [mm] | 3.17 |

Herein, similar to Examples 1-3, Conditional Expression 7 is out of the applicable range for the second lens group Gr2 in the imaging lens according to Example 4 because the second group lens Gr2 is a cemented lens.

Accordingly, the values according to the above-described Conditional Expressions 1 to 10 in Example 4 are within the range of respective expressions and satisfy Conditional Expressions 1 to 10.

In addition, in FIG. 11, the aberration curves of d and g lines, namely, each aberration curve of spherical aberration, astigmatism, distortion, and comma aberration when the imaging lens according to Example 4 focuses on the object at infinity are illustrated. In FIG. 12, the aberration curves of the d and g lines, that is, each aberration curve of spherical aberration, astigmatism, distortion, and comma aberration when the imaging lens according to Example 4 focuses on the object at infinity while its imaging magnification is about 1/20 (photographing distance≈500 mm) are illustrated.

In these aberration curves in FIGS. 11 and 12, a broken line in spherical aberration represents a sine condition, a solid line in astigmatism represents a sagittal line, and a broken line therein represents a meridional line respectively. The g and d shown in spherical aberration, astigmatism, and coma aberration represent the g and d lines respectively. The above representations are also applied to the aberration curves according to the other Examples.

Example 5

FIG. 13 illustrates Example 5 of the fifth embodiment according to the present invention and shows the longitudinal plane of the lens configuration of the optical system of the imaging lens.

That is, the optical system according to Example 5 of the present invention includes, as shown in FIG. 13, from the object side to imaging side: a first lens L1, a second lens L2, a third lens L3, an optical aperture stop AD, a fourth lens L4, a fifth lens L5, a sixth lens L6 and a seventh lens L7, in order. The second lens L2 and the third lens L3 are cemented as a cemented lens, and the fifth lens and the sixth lens are also cemented as a cemented lens, therefore the optical system has a configuration of five groups of seven lenses.

Regarding the configuration of the lens group, the first lens group Gr1 having a positive refractive power includes from the first lens L1 to the fourth lens L4, the second lens group Gr2 having a positive refractive power includes the fifth lens L5 and the sixth lens L6, and the third lens group Gr3 having a negative refractive power includes the seventh lens L7. That is, an optical system of the imaging lens as shown in FIG. 13 has the first lens group Gr1 including the aperture stop AD in the middle part, the second lens group Gr2, and the third lens group Gr3 from the object side to the imaging side in order.

In detail, the first lens group Gr1 includes, from the object side to the imaging side: the first lens L1 of the negative biconcave lens having an aspheric surface on the imaging side and a curvature on the object side which is larger than that on the imaging side; the second lens L2 of the biconvex positive lens having a curvature on the object side which is larger than that on the imaging side; the third lens L3 of the negative meniscus lens having a concave surface on the object side; and the fourth lens L4 of the positive meniscus lens having a convex surface on the imaging side, in order. The first lens group Gr1 has a positive refractive power. The second lens L2 and the third lens L3 in the first lens group Gr1 are closely cemented and form a cemented lens having two lenses.

Herein, the aperture stop AD is provided between the third lens L3 and the fourth lens L4 in the first lens group Gr1.

The second lens group Gr2 includes, from the object side to the imaging side: the fifth lens L5 of the biconcave negative lens having a curvature on the object side which is larger than that on the imaging side; and the sixth lens L6 of the biconvex positive lens having an aspheric surface and a curvature on the imaging side which is larger than that on the object side, in order. The second lens group Gr2 has a positive refractive power. The fifth lens L5 and the sixth lens L6 in the second lens group Gr2 are closely cemented and form a cemented lens having two lenses.

The third lens group Gr3 has a negative refractive power and includes only the seventh lens L7 of the biconcave negative lens having a curvature on the object side which is larger than that on the imaging side.

In addition, similar to Examples 1-4, a back insertion glass BG is inserted behind these first lens group Gr1, second lens group Gr2 and third lens group Gr3, in other words, on the imaging side.

The first lens group Gr1 including the aperture stop AD, second lens group Gr2 and third lens group Gr3 are just about supported integrally by an appropriate supporting frame at least for a while being used, except that the second lens group Gr2 is used as a focusing lens. That is, when focusing on the object at the limited distance from the imaging distance infinity, a focusing is performed integrally by moving the second lens group Gr2 which includes the fifth lens L5 and the sixth lens L6 from the imaging side to the object side along with an optical axis, as a focusing lens.

In FIG. 13, similar to Examples 1-4 (FIGS. 1, 4, 7 and 10), each surface number of each optical surface in the optical system of the imaging lens is indicated.

In Example 5, a focal length of entire system f, open F number F, and half viewing angle ω[°] are f=22.9 [mm], F=2.57 and ω=32.8[°], respectively. Optical property of a curvature radius (paraxial curvature radius with regards to aspheric surface) R, surface distance D of the adjacent surfaces, refractive index Nd, abbe number vd, and so on, of the optical surfaces of each optical element according to Example 5 are shown in the following Table 17.

TABLE 17

OPTICAL PROPERTY

| SURFACE NUMBER | R | D | Nd | vd | REMARKS | |
|---|---|---|---|---|---|---|
| 1 | −21.910 | 1.20 | 1.6889 | 31.16 | L1 | Gr1 |
| 2* | 21.954 | 0.10 | | | | |
| 3 | 13.854 | 3.30 | 1.883 | 40.8 | L2 | |
| 4 | −16.8271 | 0.80 | 1.62004 | 36.3 | L3 | |
| 5 | −119.228 | 0.10 | | | | |
| 6 | INF | 3.78 | | | AD | |
| 7 | −235.358 | 1.54 | 1.883 | 40.8 | L4 | |
| 8 | −20.874 | D8 | | | | |
| 9 | −11.476 | 0.80 | 1.5927 | 35.44 | L5 | Gr2 |
| 10 | 13.496 | 4.41 | 1.8514 | 40.1 | L6 | |
| 11* | −12.514 | D11 | | | | |
| 12 | −18.8618 | 0.80 | 1.7174 | 29.5 | L7 | Gr3 |
| 13 | 43.3739 | 13.46 | | | | |
| 14 | INF | 1.3 | 1.5168 | 64.2 | BG | |
| 15 | INF | — | | | | |

Similar to Examples 1-4 (Tables 1, 5, 9 and 13), in Table 17, a lens surface having the surface number with [* asterisk] is aspheric. [INF] represents infinity (∞). These are also applied to other Examples 6-10.

That is, the second surface of the optical surface on the imaging side of the first lens L1 indicated with [*] and the eleventh surface of the optical surface on the imaging side of the sixth lens L6 have aspheric surfaces respectively. An aspheric surface coefficient (aspheric surface parameter) of Condition 11 is as shown in the following Table 18.

TABLE 18

ASPHERIC SURFACE COEFFICIENT

| | SURFACE NUMBER | |
|---|---|---|
| COEFFICIENT | 2 | 11 |
| K | 1.25833 | 1.00576 |
| C4 | 8.0981E−05 | 2.0837E−04 |
| C6 | 1.6611E−06 | 6.3197E−07 |
| C8 | −3.8946E−08 | 2.9157E−08 |

TABLE 18-continued

ASPHERIC SURFACE COEFFICIENT

| | SURFACE NUMBER | |
|---|---|---|
| COEFFICIENT | 2 | 11 |
| C10 | 5.5366E−10 | −4.2712E−10 |
| C12 | 0.0000E+00 | 5.2455E−12 |

In Example 5, similar to Examples 1-4, because the second lens group Gr2 of the cemented lens of the fifth lens L5 and the sixth lens L6 is moved as the focusing lens when focusing, a variable distance D8 between the fourth lens L4 in the first lens group Gr1 and the fifth lens L5 in the second lens group Gr2, and a variable distance D11 between the sixth lens L6 of the second lens group Gr2 and the seventh lens L7 in the third lens group Gr3 shown in Table 17 change as shown in the following Table 19, when the object distance is changed infinity (INF) and the imaging magnification of 1/20 (photographing distance≈500 mm) in accordance with change in the imaging magnification.

TABLE 19

| | VARIABLE DISTANCE | |
|---|---|---|
| | D8 | D11 |
| INF | 2.24 | 0.25 |
| 1/20 | 1.63 | 0.87 |

The values corresponding to the above-described Conditional Expressions 1 to 10 in Example 5 are as shown in the following Table 20, except that the values in Conditional Expressions 2 and 5 are calculated with the imaging magnification β=1/20.

TABLE 20

| | VALUE IN CONDITIONAL EXPRESSION | |
|---|---|---|
| [1] | L/Y' | 2.42 |
| [2] | |(AX1 − AX2)/β| | 0.91 |
| [3] | f2/f | 1.02 |
| [4] | |f2n/f2p| | 1.25 |
| [5] | |ΔDf/β| | 11.82 |
| [6] | R2o/R2i | 0.92 |
| [7] | Nd2n ≥ 1.7 | — |
| | Nd2p ≥ 1.7 | — |
| [8] | f1/f3 | −0.94 |
| [9] | LD1/LD3 | 0.81 |
| [10] | SD > 3.0 [mm] | 3.88 |

Herein, similar to Examples 1-4, Conditional Expression 7 is out of the applicable range for the second lens group Gr2 in the imaging lens according to Example 5 because the second group lens Gr2 is a cemented lens.

Accordingly, the values according to the above-described Conditional Expressions 1 to 10 in Example 5 are within the range of respective expressions and satisfy Conditional Expressions 1 to 10.

In addition, in FIG. 14, the aberration curves of d and g lines, namely, each aberration curve of spherical aberration, astigmatism, distortion, and comma aberration when the imaging lens according to Example 5 focuses on the object at infinity are illustrated. In FIG. 15, the aberration curves of the d and g lines, that is, each aberration curve of spherical aberration, astigmatism, distortion, and comma aberration when the imaging lens according to Example 5 focuses on the object at infinity while its imaging magnification is about 1/20 (photographing distance≈500 mm) are illustrated.

In these aberration curves in FIGS. 14 and 15, a broken line in spherical aberration represents a sine condition, a solid line in astigmatism represents a sagittal line, and a broken line therein represents a meridional line respectively. The g and d shown in spherical aberration, astigmatism and coma aberration represent the g and d lines respectively. The above representations are also applied to the aberration curves according to other Examples.

Example 6

FIG. 16 illustrates Example 6 of the sixth embodiment according to the present invention and shows the longitudinal plane of the lens configuration of the optical system of the imaging lens.

That is, the optical system according to Example 6 of the present invention includes, as shown in FIG. 16, from the object side to imaging side: a first lens L1, a second lens L2, an optical aperture stop AD, a third lens L3, a fourth lens L4, a fifth lens L5, a sixth lens L6, and a seventh lens L7, in order. The third lens L3 and the fourth lens L4 are cemented as a cemented lens so that the optical system has a configuration of six groups of seven lenses.

Regarding the configuration of the lens group, the first lens group Gr1 having a positive refractive power includes from the first lens L1 to the fourth lens L4, the second lens group Gr2 having a positive refractive power includes the fifth lens L5 and the sixth lens L6, and the third lens group Gr3 having a negative refractive power includes the seventh lens L7. That is, an optical system of the imaging lens as shown in FIG. 16 has the first lens group Gr1 including the aperture stop AD in the middle part, the second lens group Gr2, and the third lens group Gr3 from the object side to the imaging side in order.

In detail, the first lens group Gr1 includes, from the object side to the imaging side: the first lens L1 of the negative meniscus lens having an convex surface on the imaging side; the second lens L2 of the biconvex positive lens having a curvature on the object side which is larger than that on the imaging side; the third lens L3 of the biconcave negative lens having a curvature on the object side which is larger than that on the imaging side; and the fourth lens L4 of the biconvex positive lens having a curvature on the imaging side which is larger than that on the object side, in order. The first lens group Gr1 has a positive refractive power. The third lens L3 and the fourth lens L4 in the first lens group Gr1 are closely cemented as a cemented lens and form a cemented lens having two lenses.

Herein, the aperture stop AD is provided between the second lens L2 and the third lens L3 in the first lens group Gr1.

The second lens group Gr2 includes, from the object side to the imaging side: the fifth lens L5 of the negative meniscus lens having a convex surface on the imaging side; and the sixth lens L6 of the biconvex positive lens having an aspheric surface and a curvature on the imaging side which is larger than that on the object side, in order. The second lens group Gr2 has a positive refractive power.

The fifth lens L5 and the sixth lens L6 in the second lens group Gr2 are not cemented and include an air distance as a so-called air lens between the lenses. Herein, an air distance provided between the two lenses disposed adjacently but separated while facing each other is called an air lens. Wherein, the air distance is formed between the imaging side surface of the object side lens and the object side surface of the imaging side lens of the two lenses. The shape of the air lens is defined such that the object side surface of the air lens is the imaging side surface of the object side lens and the imaging side surface of the air lens is the object side surface of the imaging side lens.

The third lens group Gr3 has a negative refractive power and includes only the seventh lens L7 of the negative meniscus lens having a convex surface on the imaging side.

In addition, similar to Examples 1-5, a back insertion glass BG is inserted behind these first lens group Gr1, second lens group Gr2, and third lens group Gr3, in other words, on the imaging side.

The first lens group Gr1 including the aperture stop AD, second lens group Gr2, and third lens group Gr3 are just about supported integrally by an appropriate supporting frame at least for a while being used, except that the second lens group Gr2 is used as a focusing lens. That is, when focusing on the object at the limited distance from the imaging distance infinity, a focusing is performed by integrally moving the second lens group Gr2 which includes the fifth lens L5 and the sixth lens L6 from the imaging side to the object side along with an optical axis, as a focusing lens.

In FIG. 16, similar to Examples 1-5 (FIGS. 1, 4, 7, 10 and 13), each surface number of each optical surface in the optical system of the imaging lens is indicated.

In Example 6, a focal length of entire system f, open F number F, and half viewing angle ω[°] are f=24.4 [mm], F=2.56, and ω=30.9[°], respectively. Optical property of a curvature radius (paraxial curvature radius with regards to aspheric surface) R, surface distance D of the adjacent surfaces, refractive index Nd, abbe number vd, and so on, of the optical surfaces of each optical element according to Example 6 are shown in the following Table 21.

TABLE 21

OPTICAL PROPERTY

| SURFACE NUMBER | R | D | Nd | vd | REMARKS | |
|---|---|---|---|---|---|---|
| 1 | −13.922 | 1.00 | 1.8212 | 24.06 | L1 | Gr1 |
| 2* | −72.859 | 0.14 | | | | |
| 3 | 31.044 | 2.75 | 1.883 | 40.8 | L2 | |
| 4 | −17.0969 | 0.10 | | | | |
| 5 | INF | 4.39 | | | AD | |
| 6 | −11.158 | 0.80 | 1.5814 | 40.89 | L3 | |
| 7 | 29.601 | 3.20 | 1.883 | 40.8 | L4 | |
| 8 | −15.334 | D8 | | | | |
| 9 | −14.252 | 0.80 | 1.69895 | 30.05 | L5 | Gr2 |
| 10 | −56.884 | 1.16 | | | | |
| 11 | 111.904 | 3.50 | 1.85135 | 40.1 | L6 | |
| 12* | −15.8964 | D12 | | | | |
| 13 | −15.4715 | 1.20 | 1.75211 | 25.05 | L7 | Gr3 |
| 14 | −124.187 | 10.75 | | | | |
| 15 | INF | 1.3 | 1.5168 | 64.2 | BG | |
| 16 | INF | 1.5 | | | | |

Similar to Examples 1-5 (Tables 1, 5, 9, 13 and 17), in Table 21, a lens surface having the surface number with [* asterisk] is aspheric. [INF] represents infinity (∞). These are also applied to other Examples 7-10.

That is, the second surface of the optical surface on the imaging side of the first lens L1 indicated with [*] and the twelfth surface of the optical surface on the imaging side of the sixth lens L6 have aspheric surfaces respectively. An aspheric surface coefficient (aspheric surface parameter) of Condition 11 is as shown in the following Table 22.

TABLE 22

ASPHERIC SURFACE COEFFICIENT

| COEFFICIENT | SURFACE NUMBER | |
| --- | --- | --- |
| | 2 | 12 |
| K | 0 | 1.35658 |
| C4 | 4.4119E−05 | 1.0590E−04 |
| C6 | 1.3132E−06 | −4.8332E−08 |
| C8 | −3.1988E−08 | 1.5542E−08 |
| C10 | 4.0100E−10 | −1.9792E−10 |
| C12 | 0.0000E+00 | 1.4545E−12 |

In Example 6, similar to Examples 1-5, because the second lens group Gr2 of the cemented lens of the fifth lens L5 and the sixth lens L6 is moved as the focusing lens when focusing, a variable distance D8 between the fourth lens L4 in the first lens group Gr1 and the fifth lens L5 in the second lens group Gr2, and a variable distance D11 between the sixth lens L6 of the second lens group Gr2 and the seventh lens L7 in the third lens group Gr3 shown in Table 21 change as shown in the following Table 23, when the object distance is changed infinity (INF) and the imaging magnification of 1/20 (photographing distance≈500 mm) in accordance with change in the magnification.

TABLE 23

VARIABLE DISTANCE

| | D8 | D12 |
| --- | --- | --- |
| INF | 3.69 | 1.44 |
| 1/20 | 2.29 | 2.84 |

The values corresponding to the above-described Conditional Expressions 1 to 10 in Example 6 are as shown in the following Table 24, except that the values in Conditional Expressions 2 and 5 are calculated with the imaging magnification β=1/20.

TABLE 24

VALUE IN CONDITIONAL EXPRESSION

| (1) | L/Y' | 2.57 |
| --- | --- | --- |
| (2) | |(AX1 − AX2)/β| | 1.24 |
| (3) | f2/f | 1.30 |
| (4) | |f2n/f2p| | 1.66 |
| (5) | |ΔDf/β| | 27.34 |
| (6) | R2o/R2i | 0.90 |
| (7) | Nd2n ≥ 1.7 | 1.700 |
| | Nd2p ≥ 1.7 | 1.851 |
| (8) | f1/f3 | −0.82 |
| (9) | LD1/LD3 | 0.57 |
| (10) | SD > 3.0 [mm] | 4.49 |

Accordingly, the values according to the above-described Conditional Expressions 1 to 10 in Example 6 are within the range of respective expressions and satisfy Conditional Expressions 1 to 10.

In addition, in FIG. 17, the aberration curves of d and g lines, namely, each aberration curve of spherical aberration, astigmatism, distortion, and comma aberration when the imaging lens according to Example 6 focuses on the object at infinity are illustrated. In FIG. 18, the aberration curves of the d and g lines, that is, each aberration curve of spherical aberration, astigmatism, distortion, and comma aberration when the imaging lens according to Example 6 focuses on the object at infinity while its imaging magnification is about 1/20 (photographing distance≈500 mm) are illustrated.

In these aberration curves in FIGS. 17 and 18, a broken line in spherical aberration represents a sine condition, a solid line in astigmatism represents a sagittal line, and a broken line therein represents a meridional line respectively. The g and d shown in spherical aberration, astigmatism and coma aberration represent the g and d lines respectively. The above representations are also applied to the aberration curves according to the other Examples.

Example 7

FIG. 19 illustrates Example 7 of the seventh embodiment according to the present invention and shows the longitudinal plane of the lens configuration of the optical system of the imaging lens.

That is, the optical system according to Example 7 of the present invention includes, as shown in FIG. 19, from the object side to imaging side: a first lens L1, a second lens L2, an optical aperture stop AD, a third lens L3, a fourth lens L4, a fifth lens L5, and a sixth lens L6, in order. There is no cemented lens included herein so that the optical system has a configuration of six groups of six lenses.

Regarding the configuration of the lens group, the first lens group Gr1 having a positive refractive power includes from the first lens L1 to the third lens L3, the second lens group Gr2 having a positive refractive power includes the fourth lens L4 and the fifth lens L5, and the third lens group Gr3 having a negative refractive power includes the sixth lens L6. That is, an optical system of the imaging lens as shown in FIG. 19 has the first lens group Gr1 including the aperture stop AD in the middle part, the second lens group Gr2 and the third lens group Gr3 from the object side to the imaging side in order.

In detail, the first lens group Gr1 includes, from the object side to the imaging side: the first lens L1 of the positive meniscus lens having an convex surface on the object side; the second lens L2 of the biconcave negative lens having a curvature on the imaging side which is larger than that on the object side; the third lens L3 of the biconvex positive lens having the same curvature on both of the object side and the imaging side, in order. The first lens group Gr1 has a positive refractive power.

Herein, the aperture stop AD is provided between the second lens L2 and the third lens L3 in the first lens group Gr1.

The second lens group Gr2 includes, from the object side to the imaging side: the fourth lens L4 of the negative meniscus lens having a convex surface on the imaging side; and the fifth lens L5 of the biconvex positive lens having aspheric surfaces on both sides and a curvature on the imaging side which is larger than that on the object side, in order. The second lens group Gr2 has a positive refractive power. The fourth lens L4 and the fifth lens L5 in the second lens group Gr2 are not cemented and include an air distance as a so-called air lens between the lenses.

The third lens group Gr3 has a negative refractive power and includes only the sixth lens L6 of the biconcave negative lens having a curvature on the object side which is larger than that on the imaging side.

In addition, similar to Examples 1-6, a back insertion glass BG is inserted behind these first lens group Gr1, second lens group Gr2, and third lens group Gr3, in other words, on the imaging side.

The first lens group Gr1 including the aperture stop AD, second lens group Gr2 and third lens group Gr3 are just about supported integrally by an appropriate supporting frame at least for a while being used, except that the second lens group Gr2 is used as a focusing lens. That is, when focusing on the object at the limited distance from the imaging distance infinity, a focusing is performed by integrally moving the second lens group Gr2 which includes the fourth lens L4 and the fifth lens L5 from the imaging side to the object side along with an optical axis, as a focusing lens.

In FIG. 19, similar to Examples 1-6 (FIGS. 1, 4, 7, 10, 13 and 16), each surface number of each optical surface in the optical system of the imaging lens is indicated. Each reference number in FIG. 19 is applied per each example in order to avoid a complex description caused by the increase of the number of digits of the reference number. Therefore, if the common reference number is used in FIGS. 1, 4, 7, 10, 13, 16, 22, 25, 28, and so on, it does not always describe the same configuration as Examples corresponding to those.

In Example 7, a focal length of entire system f, open F number F, and half viewing angle ω[°] are f=26.4 [mm], F=2.52, and ω=28.9[°], respectively. Optical property of a curvature radius (paraxial curvature radius with regards to aspheric surface) R, surface distance D of the adjacent surfaces, refractive index Nd, abbe number vd, and so on, of the optical surfaces of each optical element according to Example 7 are shown in the following Table 25.

TABLE 25

OPTICAL PROPERTY

| SURFACE NUMBER | R | D | Nd | vd | REMARKS | |
|---|---|---|---|---|---|---|
| 1 | 15.574 | 1.85 | 1.8830 | 40.8 | L1 | Gr1 |
| 2 | 43.982 | 0.92 | | | | |
| 3 | −31.152 | 0.80 | 1.72825 | 28.32 | L2 | |
| 4 | 22.142 | 0.63 | | | | |
| 5 | INF | 3.48 | | | AD | |
| 6 | 26.039 | 2.21 | 1.8830 | 40.8 | L3 | |
| 7 | −26.039 | D7 | | | | |
| 8 | −13.631 | 0.80 | 1.7847 | 25.72 | L4 | Gr2 |
| 9 | −99.156 | 1.50 | | | | |
| 10* | 87.034 | 3.50 | 1.8514 | 40.1 | L5 | |
| 11* | −13.649 | D11 | | | | |
| 12 | −16.487 | 1.00 | 1.6727 | 32.17 | L6 | Gr3 |
| 13 | 77.8469 | 11.81 | | | | |
| 14 | INF | 1.3 | 1.5168 | 64.2 | BG | |
| 15 | INF | — | | | | |

Similar to Examples 1-6 (Tables 1, 5, 9, 13, 17 and 21), in Table 25, a lens surface having the surface number with [* asterisk] is aspheric. [INF] represents infinity (∞). These are also applied to other Examples 8-10.

That is, the tenth surface of the optical surface on the object side in the fifth lens L5 indicated with [*] and the eleventh surface of the optical surface on the imaging side of the fifth lens L5 have aspheric surfaces respectively. An aspheric surface coefficient (aspheric surface parameter) of Condition 11 is as shown in the following Table 26. Herein, similar to Examples 1-6 (Tables 2, 6, 10, 14, 18 and 22), [En] in the aspheric surface coefficient represents an exponent of ten, that is, [×10$^n$]. For example, [E−05] indicates [×10$^{-5}$]. This is also applied to the other Examples.

TABLE 26

ASPHERIC SURFACE COEFFICIENT

| | SURFACE NUMBER | |
|---|---|---|
| COEFFICIENT | 10 | 11 |
| K | 0 | −0.11539 |
| C4 | −3.9017E−05 | 4.1275E−05 |
| C6 | −2.6584E−07 | 1.1468E−07 |
| C8 | 0.0000E+00 | −1.0716E−08 |

TABLE 26-continued

ASPHERIC SURFACE COEFFICIENT

| | SURFACE NUMBER | |
|---|---|---|
| COEFFICIENT | 10 | 11 |
| C10 | 0.0000E+00 | 1.4729E−10 |
| C12 | 0.0000E+00 | −8.4211E−13 |

In Example 7, similar to Examples 1-6, because the second lens group Gr2 of the cemented lens of the fourth lens L4 and the fifth lens L5 is moved as the focusing lens when focusing, a variable distance D7 between the third lens L3 in the first lens group Gr1 and the fourth lens L4 in the second lens group Gr2, and a variable distance D11 between the fifth lens L5 in the second lens group Gr2 and the sixth lens L6 in the third lens group Gr3 shown in Table 25 will change as shown in the following Table 27, when the object distance is changed infinity (INF) and the imaging magnification of 1/20 (photographing distance≈500 mm) in accordance with change in the magnification.

TABLE 27

VARIABLE DISTANCE

| | D7 | D11 |
|---|---|---|
| INF | 3.63 | 2.56 |
| 1/20 | 2.40 | 3.79 |

The values corresponding to the above-described Conditional Expressions 1 to 10 in Example 7 are as shown in the following Table 28, except that the values in Conditional Expressions 2 and 5 are calculated with the imaging magnification β=1/20.

TABLE 28

| | VALUE IN CONDITIONAL EXPRESSION | |
|---|---|---|
| (1) | L/Y' | 2.55 |
| (2) | |(AX1 − AX2)/β| | 0.24 |
| (3) | f2/f | 1.10 |
| (4) | |f2n/f2p| | 1.44 |
| (5) | |ΔDf/β| | 22.13 |
| (6) | R2o/R2i | 1.00 |
| (7) | Nd2n ≥ 1.7 | 1.785 |
| | Nd2p ≥ 1.7 | 1.851 |
| (8) | f1/f3 | −0.98 |
| (9) | LD1/LD3 | 0.72 |
| (10) | SD > 3.0 [mm] | 4.12 |

Accordingly, the values according to the above-described Conditional Expressions 1 to 10 in Example 7 are within the range of respective expressions and satisfy Conditional Expressions 1 to 10.

In addition, in FIG. 20, the aberration curves of d and g lines, namely, each aberration curve of spherical aberration, astigmatism, distortion, and comma aberration when the imaging lens according to Example 7 focuses on the object at infinity are illustrated. In FIG. 21, the aberration curves of the d and g lines, that is, each aberration curve of spherical aberration, astigmatism, distortion, and comma aberration when the imaging lens according to Example 7 focuses on the object at infinity while its imaging magnification is about 1/20 (photographing distance≈500 mm) are illustrated.

In these aberration curves in FIGS. 20 and 21, a broken line in spherical aberration represents a sine condition, a solid line in astigmatism represents a sagittal line, and a broken line therein represents a meridional line respectively. The g and d shown in spherical aberration, astigmatism, and coma aberration represent the g and d lines respectively. The above representations are also applied to the aberration curves according to the other Examples.

Example 8

FIG. 22 illustrates Example 8 of the eighth embodiment according to the present invention and shows the longitudinal plane of the lens configuration of the optical system of the imaging lens.

That is, the optical system according to Example 8 of the present invention includes, as shown in FIG. 22, from the object side to imaging side: a first lens L1, a second lens L2, an optical aperture stop AD, a third lens L3, a fourth lens L4, a fifth lens L5, and a sixth lens L6, in order. There is no cemented lens included herein so that the optical system has a configuration of six groups of six lenses.

Regarding the configuration of the lens group, the first lens group Gr1 having a positive refractive power includes from the first lens L1 to the third lens L3, the second lens group Gr2 having a positive refractive power includes the fourth lens L4 and the fifth lens L5, and the third lens group Gr3 having a negative refractive power includes the sixth lens L6. That is, an optical system of the imaging lens as shown in FIG. 22 has the first lens group Gr1 including the aperture stop AD in the middle part, the second lens group Gr2, and the third lens group Gr3 from the object side to the imaging side in order.

In detail, the first lens group Gr1 includes, from the object side to the imaging side: the first lens L1 of the biconcave negative lens having an aspheric surface on the imaging side and a curvature on the imaging side which is larger than that on the object side; the second lens L2 of the biconvex positive lens having a curvature on the imaging side which is larger than that on the object side; the third lens L3 of the positive meniscus lens having a convex surface on the imaging side, in order. The first lens group Gr1 has a positive refractive power.

Herein, the aperture stop AD is provided between the second lens L2 and the third lens L3 in the first lens group Gr1.

The second lens group Gr2 includes, from the object side to the imaging side: the fourth lens L4 of the negative meniscus lens having a convex surface on the imaging side; and the fifth lens L5 of the positive meniscus lens having an aspheric surface and a convex surface on the imaging side, in order. The second lens group Gr2 has a positive refractive power. The fourth lens L4 and the fifth lens L5 in the second lens group Gr2 are not cemented and include an air distance as a so-called air lens between the lenses.

The third lens group Gr3 has a negative refractive power and includes only the sixth lens L6 of the biconcave negative lens having a curvature on the object side which is larger than that on the imaging side.

In addition, similar to Examples 1-7, a back insertion glass BG is inserted behind these first lens group Gr1, second lens group Gr2, and third lens group Gr3, in other words, on the imaging side.

The first lens group Gr1 including the aperture stop AD, second lens group Gr2, and third lens group Gr3 are just about supported integrally by an appropriate supporting frame at least for a while being used, except that the second lens group Gr2 is used as a focusing lens.

That is, when focusing on the object at the limited distance from the imaging distance infinity, a focusing is performed integrally by moving the second lens group Gr2 which includes the fourth lens L4 and the fifth lens L5 from the imaging side to the object side along with an optical axis, as a focusing lens.

In FIG. 22, similar to Examples 1-7 (FIGS. 1, 4, 7, 10, 13, 16 and 19), each surface number of each optical surface in the optical system of the imaging lens is indicated. Each reference number in FIG. 22 is applied per each example in order to avoid a complex description caused by the increase of the number of digits of the reference number. Therefore, if the common reference number is used in FIGS. 1, 4, 7, 10, 13, 16, 19, 25, 28, and so on, it does not always describe the same configuration as Examples corresponding to those.

In Example 8, a focal length of entire system f, open F number F, and half viewing angle ω[°] are f=23.7 [mm], F=2.56 and ω=32.1[°], respectively. Optical property of a curvature radius (paraxial curvature radius with regards to aspheric surface) R, surface distance D of the adjacent surfaces, refractive index Nd, abbe number vd, and so on, of the optical surfaces of each optical element according to Example 8 are shown in the following Table 29.

TABLE 29

OPTICAL PROPERTY

| SURFACE NUMBER | R | D | Nd | vd | REMARKS | |
|---|---|---|---|---|---|---|
| 1 | −16.243 | 1.00 | 1.6889 | 31.16 | L1 | Gr1 |
| 2* | 28.177 | 0.89 | | | | |
| 3 | 20.469 | 2.96 | 1.83481 | 42.72 | L2 | |
| 4 | −16.646 | 0.10 | | | | |
| 5 | INF | 4.41 | | | AD | |
| 6 | −19.793 | 1.46 | 1.8830 | 40.8 | L3 | |
| 7 | −13.437 | D7 | | | | |
| 8 | −9.843 | 1.00 | 1.9229 | 20.88 | L4 | Gr2 |
| 9 | −22.245 | 0.10 | | | | |
| 10 | −109.555 | 3.38 | 1.8514 | 40.1 | L5 | |
| 11* | −10.743 | D11 | | | | |
| 12 | −16.519 | 1.00 | 1.5955 | 39.22 | L6 | Gr3 |
| 13 | 67.7848 | 12.52 | | | | |
| 14 | INF | 1.30 | 1.5168 | 64.2 | BG | |
| 15 | INF | — | | | | |

Similar to Examples 1-7 (Tables 1, 5, 9, 13, 17, 21 and 25), in Table 29, a lens surface having the surface number with [* asterisk] is aspheric. [INF] represents infinity (∞). These are also applied to other Examples 9-10.

That is, the second surface of the optical surface on the imaging side of the first lens L1 indicated with [*] and the eleventh surface of the optical surface on the imaging side of the fifth lens L5 have aspheric surfaces respectively. An aspheric surface coefficient (aspheric surface parameter) of Condition 11 is as shown in the following Table 30. Herein, similar to Examples 1-7 (Tables 2, 6, 10, 14, 18, 22 and 26), [En] in the aspheric surface coefficient represents an exponent of ten, that is, [×10$^n$]. For example, [E−05] indicates [×10$^{-5}$]. This is also applied to the other Examples.

TABLE 30

ASPHERIC SURFACE COEFFICIENT

| | SURFACE NUMBER | |
|---|---|---|
| COEFFICIENT | 2 | 11 |
| K | 2.11038 | −0.2896 |
| C4 | 1.5247E−04 | 5.8047E−05 |
| C6 | 1.9472E−06 | 3.6210E−07 |
| C8 | −4.1778E−08 | −3.9256E−09 |
| C10 | 3.3666E−10 | 9.6925E−11 |
| C12 | 0.0000E+00 | −3.7963E−13 |

In Example 8, similar to Examples 1-7, because the second lens group Gr2 of the cemented lens of the fourth lens L4 and the fifth lens L5 is moved as the focusing lens when focusing, a variable distance D7 between the third lens L3 in the first lens group Gr1 and the fourth lens L4 in the second lens group Gr2, and a variable distance D11 between the fifth lens L5 in the second lens group Gr2 and the sixth lens L6 in the third lens group Gr3 shown in Table 29 will change as shown in the following Table 31, when the object distance is changed to infinity (INF) and the imaging magnification of 1/20 (photographing distance≈500 mm) in accordance with change in the magnification.

TABLE 31

VARIABLE DISTANCE

| | D7 | D11 |
|---|---|---|
| INF | 3.41 | 2.56 |
| 1/20 | 2.41 | 3.55 |

The values corresponding to the above-described Conditional Expressions 1 to 10 in Example 8 are as shown in the following Table 32, except that the values in Conditional Expressions 2 and 5 are calculated with the imaging magnification β=1/20.

TABLE 32

VALUE IN CONDITIONAL EXPRESSION

| (1) | L/Y' | 2.56 |
|---|---|---|
| (2) | |(AX1 − AX2)/β| | 0.12 |
| (3) | f2/f | 1.26 |
| (4) | |f2n/f2p| | 1.44 |
| (5) | |ADf/β| | 19.81 |
| (6) | R2o/R2i | 0.92 |
| (7) | Nd2n ≥ 1.7 | 1.923 |
| | Nd2p ≥ 1.7 | 1.851 |
| (8) | f1/f3 | −0.83 |
| (9) | LD1/LD3 | 0.67 |
| (10) | SD > 3.0 [mm] | 4.51 |

Accordingly, the values according to the above-described Conditional Expressions 1 to 10 in Example 8 are within the range of respective expressions and satisfy Conditional Expressions 1 to 10.

In addition, in FIG. 23, the aberration curves of d and g lines, namely, each aberration curve of spherical aberration, astigmatism, distortion, and comma aberration when the imaging lens according to Example 8 focuses on the object at infinity are illustrated. In FIG. 24, the aberration curves of the d and g lines, that is, each aberration curve of spherical aberration, astigmatism, distortion, and comma aberration when the imaging lens according to Example 8 focuses on the object at infinity while its imaging magnification is about 1/20 (photographing distance≈500 mm) are illustrated.

In these aberration curves in FIGS. 23 and 24, a broken line in spherical aberration represents a sine condition, a solid line in astigmatism represents a sagittal line, and a broken line therein represents a meridional line respectively. The g and d shown in spherical aberration, astigmatism, and coma aberration represent the g and d lines respectively. The above representations are also applied to the aberration curves according to the other Examples.

Example 9

FIG. 25 illustrates Example 9 of the ninth embodiment according to the present invention and shows the longitudinal plane of the lens configuration of the optical system of the imaging lens.

That is, the optical system according to Example 9 of the present invention includes, as shown in FIG. 25, from the object side to imaging side: a first lens L1, a second lens L2, an optical aperture stop AD, a third lens L3, a fourth lens L4, a fifth lens L5, a sixth lens L6, a seventh lens L7, in order. The third lens L3 and the fourth lens L4 are cemented as a cemented lens so that the optical system has a configuration of six groups of seven lenses.

Regarding the configuration of the lens group, the first lens group Gr1 having a positive refractive power includes from the first lens L1 to the fourth lens L4, the second lens group Gr2 having a positive refractive power includes the fifth lens L5 and the sixth lens L6, and the third lens group Gr3 having a negative refractive power includes the seventh lens L7. That is, an optical system of the imaging lens as shown in FIG. 25 has the first lens group Gr1 including the aperture stop AD in the middle part, the second lens group Gr2, and the third lens group Gr3 from the object side to the imaging side in order.

In detail, the first lens group Gr1 includes, from the object side to the imaging side: the first lens L1 of the negative meniscus lens having an aspheric and concave surface on the object side; the second lens L2 of the biconvex positive lens having a curvature on the imaging side which is larger than that on the object side; the third lens L3 of the biconcave negative lens having a curvature on the object side which is larger than that on the imaging side; the fourth lens L4 of the biconvex positive lens having a curvature on the imaging side which is larger than that on the object side, in order. The first lens group Gr1 has a positive refractive power. The third lens L3 and the fourth lens L4 in the first lens group Gr1 are closely cemented and form a cemented lens having two lenses.

Herein, the aperture stop AD is provided between the second lens L2 and the third lens L3 in the first lens group Gr1.

The second lens group Gr2 includes, from the object side to the imaging side: the fifth lens L5 of the negative meniscus lens having a concave surface on the object side; and the sixth lens L6 of the biconvex positive lens having an aspheric surface and a curvature on the imaging side which is larger than that on the object side, in order. The second lens group Gr2 has a positive refractive power. The fifth lens L5 and the sixth lens L6 in the second lens group Gr2 are not cemented and include an air distance as a so-called air lens between the lenses.

The third lens group Gr3 has a negative refractive power and includes only the seventh lens L7 of the negative meniscus lens having a concave surface on the object side.

In addition, similar to Examples 1-8, a back insertion glass BG is inserted behind these first lens group Gr1, second lens group Gr2 and third lens group Gr3, in other words, on the imaging side.

The first lens group Gr1 including the aperture stop AD, second lens group Gr2 and third lens group Gr3 are just about supported integrally by an appropriate supporting frame at least for a while being used, except that the second lens group Gr2 is used as a focusing lens.

That is, when focusing on the object at the limited distance from the imaging distance infinity, a focusing is performed integrally by moving the second lens group Gr2 which includes the fifth lens L5 from the imaging side to the object side along with an optical axis, as a focusing lens.

In FIG. 25, similar to Examples 1-8 (FIGS. 1, 4, 7, 10, 13, 16, 19 and 22), each surface number of each optical surface in the optical system of the imaging lens is indicated. Each reference number in FIG. 25 is applied per each example in order to avoid a complex description caused by the increase of the number of digits of the reference number. Therefore, if the common reference number is used in FIGS. 1, 4, 7, 10, 13, 16, 19, 22, 28 and so on, it does not always describe the same configuration as Examples corresponding to those.

In Example 9, a focal length of entire system f, open F number F and half viewing angle ω[°] are f=26.0 [mm], F=2.56 and ω=28.6[°], respectively. Optical property of a curvature radius (paraxial curvature radius with regards to aspheric surface) R, surface distance D of the adjacent surfaces, refractive index Nd, abbe number vd, and so on, of the optical surfaces of each optical element according to Example 9 are shown in the following Table 33.

TABLE 33

OPTICAL PROPERTY

| SURFACE NUMBER | R | D | Nd | vd | REMARKS | |
|---|---|---|---|---|---|---|
| 1* | −16.362 | 1.00 | 1.8467 | 23.77 | L1 | Gr1 |
| 2 | −67.915 | 0.10 | | | | |
| 3 | 30.544 | 2.50 | 1.883 | 40.8 | L2 | |
| 4 | −20.7579 | 0.10 | | | | |
| 5 | INF | 4.74 | | | AD | |
| 6 | −10.198 | 0.80 | 1.5955 | 39.24 | L3 | |
| 7 | 54.454 | 3.11 | 1.883 | 40.8 | L4 | |
| 8 | −14.721 | D8 | | | | |
| 9 | −14.435 | 0.80 | 1.80809 | 22.76 | L5 | Gr2 |
| 10 | −25.787 | 2.43 | | | | |
| 11 | 128.626 | 3.44 | 1.85135 | 40.1 | L6 | |
| 12* | −18.8376 | D12 | | | | |
| 13 | −17.1852 | 1.20 | 1.72151 | 29.23 | L7 | Gr3 |
| 14 | −495.639 | 10.12 | | | | |
| 15 | INF | 1.3 | 1.5168 | 64.2 | BG | |
| 16 | INF | — | | | | |

In Table 33, a lens surface having the surface number with [* asterisk] is aspheric. [INF] represents infinity (∞). These are also applied to Examples 10.

That is, in Table 33, the first surface of the optical surface on the imaging side of the first lens L1 indicated with [*] and the twelfth surface of the optical surface on the imaging side of the sixth lens L6 have aspheric surfaces respectively. An aspheric surface coefficient (aspheric surface parameter) of Condition 11 is as shown in the following Table 34.

TABLE 34

ASPHERIC SURFACE COEFFICIENT

| | SURFACE NUMBER | |
|---|---|---|
| COEFFICIENT | 1 | 12 |
| K | 0.16027 | 1.86379 |
| C4 | −1.0812E−05 | 8.4020E−05 |
| C6 | −8.7470E−07 | −1.3126E−07 |
| C8 | 2.3190E−08 | 1.0935E−08 |
| C10 | −2.8310E−10 | −1.2076E−10 |
| C12 | 0.0000E+00 | 7.0820E−13 |

In Example 9, similar to Examples 1-8, because the second lens group Gr2 of the cemented lens of the fourth lens L4 and the fifth lens L5 is moved as the focusing lens when focusing, a variable distance D8 between the fourth lens L4 in the first lens group Gr1 and the fifth lens L5 in the second lens group Gr2, and a variable distance D12 between the sixth lens L6 in the second lens group Gr2 and the seventh lens L7 in the third lens group Gr3 shown in Table 33 will change as shown in the following Table 35, when the object distance is changed to infinity (INF) and the imaging magnification of 1/20 (photographing distance≈500 mm) in accordance with change in the magnification.

TABLE 35

VARIABLE DISTANCE

| | D8 | D12 |
|---|---|---|
| INF | 3.62 | 2.78 |
| 1/20 | 2.15 | 4.12 |

The values corresponding to the above-described Conditional Expressions 1 to 10 in Example 9 are as shown in the following Table 36, except that the values in Conditional Expressions 2 and 5 are calculated with the imaging magnification β=1/20.

TABLE 36

VALUE IN CONDITIONAL EXPRESSION

| (1) | L/Y' | 2.70 |
|---|---|---|
| (2) | |(AX1 − AX2)/β| | 1.00 |
| (3) | f2/f | 1.14 |
| (4) | |f2n/f2p| | 2.15 |
| (5) | |ΔDf/β| | 30.11 |
| (6) | R2o/R2i | 0.77 |
| (7) | Nd2n ≥ 1.7 | 1.808 |
| | Nd2p ≥ 1.7 | 1.851 |
| (8) | f1/f3 | −0.94 |
| (9) | LD1/LD3 | 0.61 |
| (10) | SD > 3.0 [mm] | 4.84 |

Accordingly, the values according to the above-described Conditional Expressions 1 to 10 in Example 9 are within the range of respective expressions and satisfy Conditional Expressions 1 to 10.

In addition, in FIG. 26, the aberration curves of d and g lines, namely, each aberration curve of spherical aberration, astigmatism, distortion, and comma aberration when the imaging lens according to Example 9 focuses on the object at infinity are illustrated. In FIG. 27, the aberration curves of the d and g lines, that is, each aberration curve of spherical aberration, astigmatism, distortion, and comma aberration when the imaging lens according to Example 9 focuses on the object at infinity while its imaging magnification is about 1/20 (photographing distance≈500 mm) are illustrated.

In these aberration curves in FIGS. 26 and 27, a broken line in spherical aberration represents a sine condition, a solid line in astigmatism represents a sagittal line, and a broken line therein represents a meridional line respectively. The g and d shown in spherical aberration, astigmatism, and coma aberration represent the g and d lines respectively. The above representations are also applied to the aberration curves according to the other Examples.

Example 10

FIG. 28 illustrates Example 10 of the tenth embodiment according to the present invention and shows the longitudinal plane of the lens configuration of the optical system of the imaging lens.

That is, the optical system according to Example 10 of the present invention includes, as shown in FIG. 28, from the object side to imaging side: a first lens L1, a second lens L2, an optical aperture stop AD, a third lens L3, a fourth lens L4, a fifth lens L5, a sixth lens L6, and a seventh lens L7, in order. The third lens L3 and the fourth lens L4 are cemented as a cemented lens so that the optical system has a configuration of six groups of seven lenses.

Regarding the configuration of the lens group, the first lens group Gr1 having a positive refractive power includes from the first lens L1 to the fourth lens L4, the second lens group Gr2 having a positive refractive power includes the fifth lens L5 and the sixth lens L6, and the third lens group Gr3 having a negative refractive power includes the seventh lens L7. That is, an optical system of the imaging lens as shown in FIG. 28 has the first lens group Gr1 including the aperture stop AD in the middle part, the second lens group Gr2 and the third lens group Gr3 from the object side to the imaging side in order.

In detail, the first lens group Gr1 includes, from the object side to the imaging side: the first lens L1 of the negative meniscus lens having a concave surface on the object side; the second lens L2 of the biconvex positive lens having a curvature on the object side which is larger than that on the imaging side; the third lens L3 of the biconcave negative lens having a curvature on the object side which is larger than that on the imaging side; the fourth lens L4 of the biconvex positive lens having a curvature on the imaging side which is larger than that on the object side, in order. The first lens group Gr1 has a positive refractive power. The third lens L3 and the fourth lens L4 in the first lens group Gr1 are closely cemented and form a cemented lens having two lenses.

Herein, the aperture stop AD is provided between the second lens L2 and the third lens L3 in the first lens group Gr1.

The second lens group Gr2 includes, from the object side to the imaging side: the fifth lens L5 of the negative meniscus lens having an aspheric and concave surface on the object side; and the sixth lens L6 of the positive meniscus lens having a convex surface on the imaging side, in order. The second lens group Gr2 has a positive refractive power. The fifth lens L5 and the sixth lens L6 in the second lens group Gr2 are not cemented and include an air distance as a so-called air lens between the lenses.

The third lens group Gr3 has a negative refractive power and includes only the seventh lens L7 of the negative meniscus lens having a concave surface on the object side.

In addition, similar to Examples 1-9, a back insertion glass BG is inserted behind these first lens group Gr1, second lens group Gr2 and third lens group Gr3, in other words, on the imaging side.

The first lens group Gr1 including the aperture stop AD, second lens group Gr2 and third lens group Gr3 are just about supported integrally by an appropriate supporting frame at least for a while being used, except that the second lens group Gr2 is used as a focusing lens.

That is, when focusing on the object at the limited distance from the imaging distance infinity, a focusing is performed by integrally moving the second lens group Gr2 which includes the fifth lens L5 from the imaging side to the object side along with an optical axis, as a focusing lens.

In FIG. 28, similar to Examples 1-9 (FIGS. 1, 4, 7, 10, 13, 16, 19, 22 and 25), each surface number of each optical surface in the optical system of the imaging lens is indicated. Each reference number in FIG. 28 is applied per each example in order to avoid a complex description caused by the increase of the number of digits of the reference number. Therefore, if the common reference number is used in FIGS. 1, 4, 7, 10, 13, 16, 19, 22, 25 and so on, it does not always describe the same configuration as Examples corresponding to those.

In Example 10, a focal length of entire system f, open F number F and half viewing angle ω[°] are f=25.8 [mm], F=2.57 and ω=29.3[°], respectively. Optical property of a curvature radius (paraxial curvature radius with regards to aspheric surface) R, surface distance D of the adjacent surfaces, refractive index Nd, abbe number vd, and so on, of the optical surfaces of each optical element according to Example 10 are shown in the following Table 37.

TABLE 37

OPTICAL PROPERTY

| SURFACE NUMBER | R | D | Nd | vd | REMARKS | |
|---|---|---|---|---|---|---|
| 1 | −24.638 | 1.00 | 1.8467 | 23.78 | L1 | Gr1 |
| 2 | −56.773 | 0.10 | | | | |
| 3 | 23.646 | 1.99 | 1.883 | 40.8 | L2 | |
| 4 | −51.2484 | 0.10 | | | | |
| 5 | INF | 5.06 | | | AD | |
| 6 | −11.210 | 0.80 | 1.7174 | 29.5 | L3 | |
| 7 | 22.009 | 3.26 | 1.883 | 40.8 | L4 | |
| 8 | −14.557 | D8 | | | | |
| 9* | −24.916 | 1.10 | 1.85135 | 40.1 | L5 | Gr2 |
| 10 | −34.428 | 2.35 | | | | |
| 11 | −32.004 | 3.41 | 1.83481 | 42.72 | L6 | |
| 12 | −13.2031 | D12 | | | | |
| 13* | −9.0181 | 1.20 | 1.68893 | 31.16 | L7 | Gr3 |
| 14 | −21.6262 | 6.5 | | | | |
| 15 | INF | 1.3 | 1.5168 | 64.2 | BG | |
| 16 | INF | — | | | | |

The * (asterisk) in Table 37 represents an aspheric surface and the numerical value of coefficient of the aspheric surface is indicated as follows.

That is, in Table 37, the ninth surface of the optical surface on the object side of the fifth lens L5 indicated with [*] and the thirteenth surface of the optical surface on the object side of the sixth lens L6 have aspheric surfaces respectively. An aspheric surface coefficient (aspheric surface parameter) of Condition 11 is as shown in the following Table 38. Herein, similar to Examples 1-9 (Tables 2, 6, 10, 14, 18, 22, 26, 30 and 34), [En] in the aspheric surface coefficient represents an exponent of ten, that is, [×10$^n$]. For example, [E−05] indicates [×10$^{-5}$].

TABLE 38

ASPHERIC SURFACE COEFFICIENT

| | SURFACE NUMBER | |
|---|---|---|
| COEFFICIENT | 9 | 13 |
| K | 2.33367 | −0.45715 |
| C4 | −1.0755E−04 | 1.0513E−04 |
| C6 | −4.8804E−07 | 3.1308E−08 |
| C8 | −4.1467E−09 | 1.3567E−09 |
| C10 | −1.1084E−12 | −4.6189E−13 |
| C12 | −2.7718E−13 | 0.0000E+00 |

D8 and D12 in Table 39 change as follows when the imaging magnification is changed.

In Example 10, similar to Examples 1-9, because the second lens group Gr2 of the cemented lens of the fifth lens L5 and the sixth lens L6 is moved as the focusing lens when focusing, a variable distance D8 between the fourth lens L4 in the first lens group Gr1 and the fifth lens L5 in the second lens group Gr2, and a variable distance D12 between the sixth lens L6 of the second lens group Gr2 and the seventh lens L7 in the third lens group Gr3 shown in Table 37 will change as shown in the following Table 39, when the object distance is changed infinity (INF) and the imaging magnification of 1/20 (photographing distance≈500 mm) in accordance with change in the magnification.

TABLE 39

VARIABLE DISTANCE

|  | D8 | D12 |
|---|---|---|
| INF | 3.69 | 4.20 |
| 1/20 | 2.16 | 5.73 |

The values corresponding to the above-described Conditional Expressions 1 to 10 in Example 10 are as shown in the following Table 40, except that the values in Conditional Expressions 2 and 5 are calculated with the imaging magnification β=1/20.

TABLE 40

VALUE IN CONDITIONAL EXPRESSION

| (1) | L/Y' | 2.57 |
|---|---|---|
| (2) | |(AX1 − AX2)/β| | 1.38 |
| (3) | f2/f | 1.14 |
| (4) | |f2n/f2p| | 4.50 |
| (5) | |ADf/β| | 29.40 |
| (6) | R2o/R2i | 1.89 |
| (7) | Nd2n ≥ 1.7 | 1.851 |
|  | Nd2p ≥ 1.7 | 1.835 |
| (8) | f1/f3 | −1.04 |
| (9) | LD1/LD3 | 0.60 |
| (10) | SD > 3.0 [mm] | 5.16 |

Accordingly, the values according to the above-described Conditional Expressions 1 to 10 in Example 10 are within the range of respective expressions and satisfy Conditional Expressions 1 to 10.

In addition, in FIG. 29, the aberration curves of d and g lines, namely, each aberration curve of spherical aberration, astigmatism, distortion, and comma aberration when the imaging lens according to Example 10 focuses on the object at infinity are illustrated. In FIG. 30, the aberration curves of the d and g lines, that is, each aberration curve of spherical aberration, astigmatism, distortion, and comma aberration when the imaging lens according to Example 10 focuses on the object at infinity while its imaging magnification is about 1/20 (photographing distance≈500 mm) are illustrated.

In these aberration curves in FIGS. 29 and 30, a broken line in spherical aberration represents a sine condition, a solid line in astigmatism represents a sagittal line, and a broken line therein represents a meridional line respectively. The g and d shown in spherical aberration, astigmatism, and coma aberration represent the g and d lines respectively. The above representations are also applied to the aberration curves according to the other Examples.

Eleventh Embodiment

Next, a description of an imaging device according to the eleventh embodiment of the present invention in which the imaging lens described in Examples 1-10 of the first to tenth embodiments of the present invention is used as an imaging optical system will be given with reference to FIGS. 31A-33.

Figure 31A:
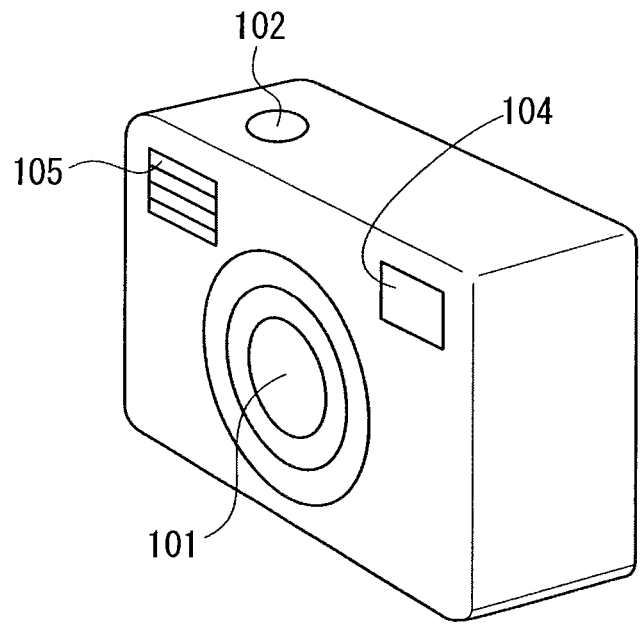
FIGS. 31A and 31B are perspective views schematically illustrating external configurations of a digital camera as an imaging device according to the eleventh embodiment of the present invention as viewed from foreside thereof i.e., from the object side.
Figure 31B:
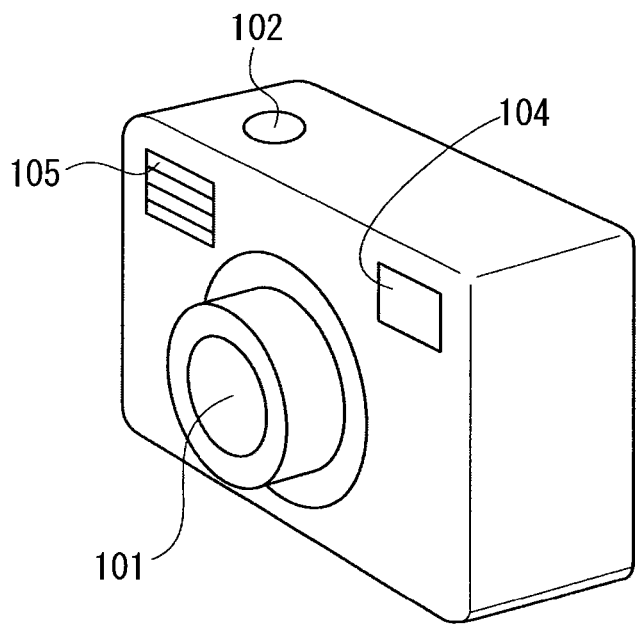
Figure 32:
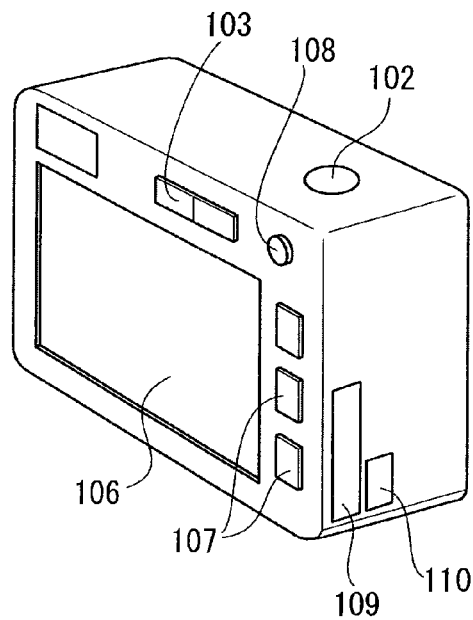
FIG. 32 schematically illustrates a perspective view of the digital camera shown in FIGS. 31A and 31B as viewed from the rear side thereof i.e., from the photographer's side.
Figure 33:
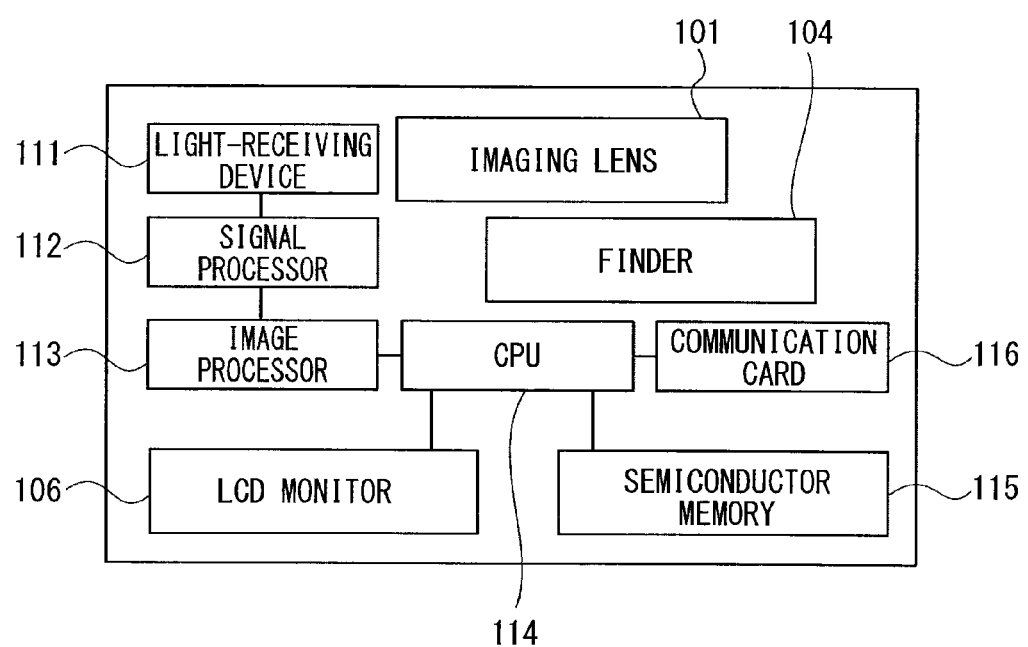
FIG. 33 is a block chart schematically illustrating a function of the digital camera shown in FIGS. 31A, 31B and 32.

FIGS. 31A and 31B schematically illustrate the external configuration of a digital camera as an imaging device according to the eleventh embodiment of the present invention as seen from the subject side (namely object side in front). FIG. 31A is a perspective view illustrating a condition in which a photographing lens using an imaging lens according to each embodiment of the present invention is collapsed in the body of the digital camera. FIG. 31B is a perspective view illustrating a condition in which the photographing lens is extended from the body of the digital camera. FIG. 32 schematically illustrates a perspective view of the digital camera as viewed from the rear side thereof i.e., from the photographer's side. FIG. 33 is a block chart schematically illustrating a function of the digital camera.

Herein, a digital camera as an imaging device is only described, however, not only an imaging device which is exclusively used for imaging such as a video camera and a film camera but also a mobile information terminal device such as a mobile phone and a PDA (personal data assistant), and furthermore, a mobile terminal device as a so-called smart phone and various information devices including a tablet device often contain a function of imaging which is equivalent to that of a digital camera and so on. Such information devices include similar functions and configurations to a digital camera and so on although the appearances thereof are slightly different. Therefore, the imaging lens according to the present invention can be applied to such information devices.

As shown in FIGS. 31A-32, a digital camera includes: an imaging lens 101, a shutter button 102, a zoom button 103, a finder 104, an electric flash 105, an LCD monitor 106, an operation button 107, a power button 108, a memory card slot 109, a communication card slot 110 and so on. Furthermore, as shown in FIG. 33, the digital camera also includes: a light-receiving device 111, a signal processor 112, an image processor 113, a central processing unit (CPU) 114, a semiconductor memory 115, an information card 116 and so on.

The digital camera includes the imaging lens 101, the light-receiving device 111 as an area sensor such as a CMOS (complementary metal-oxide-semiconductor) or a CCD (charge-coupled device), and so on. The camera has a configuration such that an optical image of the photographing target, namely an object is imaged by the imaging lens 101 as an imaging optical system and is read by the light-receiving device 111. The imaging lens according to the first to tenth embodiments of the present invention described in Examples 1-10 is used as the imaging lens 101.

The output of the light-receiving device 111 is converted to digital image information after being processed by the signal processor 112 controlled by the central processing unit 114. The image information digitized by the signal processor 112 is further processed by the image processor 113 which is controlled by the central processing unit 114. Then, after a certain image process, the image information is recorded in the semiconductor memory 115 such as a non-volatile memory. In this instance, a memory card loaded in the memory card slot 109 can be used as the semiconductor memory 115. The semiconductor memory built in the digital camera can be also used. On the LCD monitor 106, the image in photographing can be displayed and the image recorded in the semiconductor memory 115 can be also displayed.

The image recorded in the semiconductor memory 115 can be transmitted to outside through the communication card 116 which is loaded in the communication card slot 110.

The imaging lens 101 is collapsible as shown in FIG. 31A, namely it is buried into the body of the digital camera when it is carried. When a user turns on the power switch 108, the lens barrel is extended as shown in FIG. 31B, and the imaging lens 101 is extended from the camera body. A so-called digital zooming method where the cutout range of the subject image is changed so that the magnification is changed can be performed by controlling the zoom button 103. In this regard, it is appropriate that the magnification of the optical system of the finder 104 can be changed according to the variation in an effective angle of view.

In many cases, a focusing is performed by the half-press of the shutter button 102. When the shutter button 102 is further pressed to full-press, a photographing is performed, then, the above-described processes are performed.

In order to display the image recorded in the semiconductor memory 115 on the LCD monitor, or to transmit the image outside through the communication card 116 and so on, an operation button 107 is controlled as predetermined. The semiconductor memory 115, the communication card 116 and so on are used while being loaded in an exclusive slot or a generalized slot such as the memory card slot 109, the card slot 110 and so on.

When the lens barrel of the imaging lens 101 is collapsed, each of groups of the imaging lens is not always lined on the optical axis. For example, if the second lens group Gr2 is extracted from the optical axis and is housed to be parallel with the first lens group Gr1 when the photographing lens is collapsed, a miniaturization of the digital camera can be achieved furthermore.

The imaging lens according to the embodiments of present invention is an inner focus type optical system having a high performance and a miniaturized body while it is wide angle, bright and capable of focusing at a high speed. The imaging lens includes seven or fewer lenses such as, from the object side to the imaging side, a first lens group having a positive refractive power, a second lens group Gr2 having a positive refractive power and a third lens group having a negative refractive power, in order. Wherein, the first lens group Gr1 includes one or more lenses having a negative refractive power and a lens having a positive refractive power, the second lens group Gr2 includes a lens having a negative refractive power and a lens having a positive refractive power and the third lens group Gr3 includes one lens having a negative refractive power and a concave surface on the object side. An aperture stop is provided in the first lens group Gr1. The second lens group Gr2 is moved as the focusing lens from the imaging side to the object side when focusing on the object from infinity to a close range.

Although the embodiments of the present invention have been described above, the present invention is not limited thereto. It should be appreciated that variations may be made in the embodiments and the aspects described by persons skilled in the art without departing from the scope of the present invention.

What is claimed is:

1. An imaging lens comprising, in order from an object side to an imaging side:
    a first lens group having a positive refractive power;
    a second lens group having a positive refractive power; and
    a third lens group having a negative refractive power, wherein
    the first lens group includes a first lens having a negative refractive power and a second lens having a positive refractive power, an aperture stop being disposed in the first lens group,
    the second lens group includes one lens having a negative refractive power and one lens having a positive refractive power,
    the third lens group includes one lens having negative refractive power and a concave surface on the object side,
    the second lens group is moved away from the imaging side toward the object side as a focusing lens when focusing from a position at infinity to a position closer than infinity,
    the first lens group does not move while focusing,
    the following conditional expression is satisfied:

$2.3 < L/Y' < 2.8$, where a distance between an object side surface of a lens disposed at a most object side in the first lens group and an imaging surface is L, and a maximum image height is Y' and the imaging lens has seven or fewer lenses which constitute an entire system of an optical system.

2. The imaging lens according to claim 1, wherein the following conditional expression is satisfied:

$0.9 < f2/f < 1.5$, where a focal length of the second lens group is f2 and a focal length of the whole system of the optical system is f when a photographing distance is infinity.

3. The imaging lens according to claim 1, wherein the following conditional expression is satisfied:

$1.1 < |f2n/f2p| < 4.6$, where a focal length of the lens having a negative refractive power in the second lens group is f2n and a focal length of the lens having a positive refractive power in the second lens group is f2p.

4. The imaging lens according to claim 1, wherein the following conditional expression is satisfied:

$11.7 < |\Delta Df/\beta| < 32.3$, where a moving distance in millimeters of the second lens group corresponding to a focusing performance when focusing on an object from a photographing distance infinity is $\Delta Df$ and an imaging magnification while focusing on the object is $\beta$.

5. The imaging lens according to claim 1, wherein the following conditional expression is satisfied:

$0.7 < R2o/R2i < 2.0$, where a curvature radius R of an object side surface of the lens disposed at a most object side in the second lens group is R2o and a curvature radius R of an imaging side of the lens disposed at a most imaging side in the second lens group is R2i.

6. The imaging lens according to claim 1, wherein the second lens group consists of one cemented lens.

7. The imaging lens according to claim 1, wherein the second lens group comprises an air distance between the one lens having a negative refractive power and the one lens having a positive refractive power.

8. The imaging lens according to claim 7, wherein the following conditional expressions are satisfied:

$1.7 \leq (Nd2n)$, and $1.7 \leq (Nd2p)$, where a refractive index of the one lens having a negative refractive power in the second lens group is Nd2n and a refractive index of the one lens having a positive refractive power in the second lens group is Nd2p.

9. The imaging lens according to claim 1, wherein
    the first lens group and the third lens group are fixed and do not move while focusing: and
    the following conditional expression is satisfied:

$-1.1 < f1/f3 < -0.6$, where a focal length of the first lens group is f1 and a focal length of the third lens group is f3.

10. The imaging lens according to claim 1, wherein the following conditional expression is satisfied:

$0.5 < LD1/LD3 < 0.9$, where a maximum effective diameter of a lens having a largest diameter in the first lens group is LD1 and a maximum effective diameter of a lens having a largest diameter in the third lens group is LD3.

11. The imaging lens according to claim 1, wherein
a space between the lenses in the first lens group is provided, and
the following conditional expression is satisfied:

$SD > 3.0$, where a length in millimeters of the space in the optical axis direction is SD.

12. An imaging device comprising:
an imaging lens that provides imaging on an electronic sensor and having seven or fewer lenses which constitute an entire system of an optical system comprising, in order from an object side to an imaging side:
a first lens group having a positive refractive power,
a second lens group having a positive refractive power, and
a third lens group having a negative refractive power, wherein
the first lens group includes a first lens having a negative refractive power and a second lens having a positive refractive power, an aperture stop being disposed in the first lens group,
the second lens group includes one lens having a negative refractive power and one lens having a positive refractive power,
the third lens group including one lens having negative refractive power and a concave surface on the object side,
the second lens group is moved away from the imaging side toward the object side as a focusing lens when focusing from a position at infinity to a position closer than infinity,
the first lens group does not move while focusing, and
the following conditional expression is satisfied:

$2.3 < L/Y' < 2.8$, where a distance between an object side surface of a lens disposed at a most object side in the first lens group and an imaging surface is L, and a maximum image height is Y'.

13. An information device comprising an imaging function and using the imaging lens according to claim 1 as an imaging optical system.

14. The imaging lens according to claim 1, wherein the lens disposed at the most object side in the first lens group is the first lens.

15. The imaging device according to claim 12, wherein the lens disposed at the most object side in the first lens group is the first lens.

16. The imaging lens according to claim 1, wherein the lens disposed at the most object side in the first lens group is the second lens.

17. The imaging lens according to claim 12, wherein the lens disposed at the most object side in the first lens group is the second lens.

* * * * *